(12) United States Patent  
Mrad et al.

(10) Patent No.: US 11,321,640 B2  
(45) Date of Patent: May 3, 2022

(54) DISTRIBUTING A USER INTERFACE FOR ACCESSING FILES

(71) Applicant: NoStatik Media S.A., La Marsa (TN)

(72) Inventors: Ramzi Mrad, Brussels (BE); Khaled Frad, la Marsa (TN)

(73) Assignee: NoStatik Media S.A.

( * ) Notice: Subject to any disclaimer, the term of this patent is extended or adjusted under 35 U.S.C. 154(b) by 0 days.

(21) Appl. No.: 16/531,919

(22) Filed: Aug. 5, 2019

(65) Prior Publication Data

US 2019/0354901 A1 Nov. 21, 2019

Related U.S. Application Data

(63) Continuation of application No. 15/338,039, filed on Oct. 28, 2016, now Pat. No. 10,373,080.

(51) Int. Cl.
*G06F 3/06* (2006.01)
*G06Q 10/00* (2012.01)
*G06F 16/00* (2019.01)

(52) U.S. Cl.
CPC ............... *G06Q 10/00* (2013.01); *G06F 3/06* (2013.01); *G06F 3/0605* (2013.01); *G06F 3/067* (2013.01);
(Continued)

(58) Field of Classification Search
CPC .... G06Q 10/10; G06Q 10/101; G06Q 10/103; G06Q 10/00; G06F 3/0605; G06F 3/0622; G06F 3/0643; G06F 3/06; G06F 3/067; G06F 16/00; G06F 40/10; G06F 21/62; G06F 16/90; G06F 2221/214; G06F 2221/072; G06F 16/958
(Continued)

(56) References Cited

U.S. PATENT DOCUMENTS 5,315,504 A * 5/1994 Lemble .................. G06Q 10/10
700/90
6,154,753 A * 11/2000 McFarland ............ G06Q 10/10
715/221

(Continued)

OTHER PUBLICATIONS

Mallat et al., Method of Enriching Queries by Contextual Information to Approve of Information Retrieval System in Arabic, IEEE 2016, pp. 1-6. (Year: 2016).*

(Continued)

*Primary Examiner* — Sanchita Roy
(74) *Attorney, Agent, or Firm* — Fish & Richardson P.C.

(57) ABSTRACT

In general, the subject matter described in this disclosure can be embodied in methods, systems, and program products for defining a navigation user interface that is to be presented by multiple client devices. A representation of the navigation user interface is presented. User input specifies a first collection of files that are to be accessible to users of the multiple client devices upon selection of a first element from the presentation of the navigation user interface. User input specifies a second collection of files that are to be accessible upon selection of a second element from the presentation of the navigation user interface. User input specifies multiple individuals to which the navigation user interface is to be displayed, and the navigation user interface is provided for display on devices assigned to the multiple individuals.

22 Claims, 46 Drawing Sheets

(52) U.S. Cl.
CPC .......... *G06F 3/0622* (2013.01); *G06F 3/0643* (2013.01); *G06F 16/00* (2019.01)

(58) Field of Classification Search
USPC ........................................................ 715/753
See application file for complete search history.

(56) References Cited

U.S. PATENT DOCUMENTS

| | | | |
|---|---|---|---|
| 6,546,393 B1 | 4/2003 | Khan | |
| 6,684,369 B1 | 1/2004 | Bernardo et al. | |
| 6,792,572 B1 * | 9/2004 | Frohlick | G06Q 10/10 715/236 |
| 7,020,663 B2 | 3/2006 | Hay et al. | |
| 7,167,844 B1 | 1/2007 | Leong et al. | |
| 8,065,628 B2 | 11/2011 | Oshiro | |
| 9,811,673 B2 | 11/2017 | Velasco | |
| 10,212,170 B1 * | 2/2019 | Canavor | H04L 63/102 |
| 10,699,025 B2 * | 6/2020 | von Muhlen | G06F 16/185 |
| 2002/0184255 A1 * | 12/2002 | Edd | G06F 16/958 715/205 |
| 2005/0188332 A1 | 8/2005 | Kolman | |
| 2008/0134344 A1 | 6/2008 | McBrearty | |
| 2009/0203415 A1 | 8/2009 | Falciglia | |
| 2010/0153866 A1 | 6/2010 | Sharoni | |
| 2010/0242085 A1 * | 9/2010 | Dutta | G06Q 10/10 726/1 |
| 2012/0059906 A1 | 3/2012 | Ciancio-Bunch | |
| 2013/0218829 A1 * | 8/2013 | Martinez | G06Q 10/10 707/608 |
| 2013/0246901 A1 * | 9/2013 | Massand | G06Q 10/10 715/229 |
| 2014/0015827 A1 | 1/2014 | Rapoport | |
| 2014/0019868 A1 | 1/2014 | Varian | |
| 2014/0189592 A1 | 7/2014 | Benchenaa | |
| 2014/0201138 A1 * | 7/2014 | Dorman | G06F 16/178 707/610 |
| 2014/0258418 A1 * | 9/2014 | Subramani | H04L 67/1095 709/205 |
| 2015/0058235 A1 | 2/2015 | Kahan | |
| 2015/0127628 A1 | 5/2015 | Rathod | |
| 2016/0125376 A1 | 5/2016 | Beatty | |
| 2016/0249106 A1 | 8/2016 | Lachwani | |
| 2017/0103230 A1 * | 4/2017 | O'Brien | G06F 16/93 |
| 2017/0289234 A1 | 10/2017 | Andreou | |
| 2017/0329780 A1 | 11/2017 | Salowitz | |
| 2018/0268319 A1 | 9/2018 | Guo | |

OTHER PUBLICATIONS

Esteva et al., Islander: An Electronic Institutions Editor, ACM 2002, pp. 1045-1052. (Year: 2002).
Pei et al., "Mining Access Patterns Efficiently from Wed Logs," Springer 2000, pp. 1-12, 2000.

* cited by examiner

| Name | Start date | End date | Time zone | State | Participation | Actions |
|---|---|---|---|---|---|---|
| Conformation Read Training | --- | --- | UTC | Pending | 0 | ⊘ ✕ |
| hjhgjh | --- | --- | UTC | Pending | 0 | ⊘ ✕ |
| hkftgjh | 2016-03-18 13:23 | --- | UTC | Pending | 0 | ⊘ ✕ |
| sadfadsf | --- | --- | UTC | Running | 0 | ⊘ ✕ |
| gjhgj | --- | --- | UTC | Pending | 0 | ⊘ ✕ |
| sajdkfldksj | --- | --- | UTC | Pending | 0 | ⊘ ✕ |
| gjhfgj | --- | --- | UTC | Pending | 0 | ⊘ ✕ |

Showing 1 to 7 of 7 rows

© 2016 Symmetryk GmbH. All rights reserved

DISTRIBUTING A USER INTERFACE FOR ACCESSING FILES

CLAIM OF PRIORITY

This application claims priority under 35 USC § 120 to U.S. patent application Ser. No. 15/338,039, filed on Oct. 28, 2016, the entire contents of which are hereby incorporated by reference.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

This document generally relates to various techniques for distributing a user interface for accessing files.

BACKGROUND

Users of computing devices may access information in various ways. In some examples, an individual may use their computing device to view files that are already stored on the computing device due to the individual having previously transferred the files to that computing device. In some examples, the computing device may be connected to the internet, and the individual may use the computing device to browse web pages and select files to view over the internet.

SUMMARY

This document describes techniques, methods, systems, and other mechanisms for distributing a user interface for accessing files.

As additional description to the embodiment described below, the present disclosure describes the following embodiments.

Defining and Distributing a Navigation User Interface.

Embodiment 1 is directed to a computer-implemented method. The method comprises receiving, by a computing system, an indication that a first computing device received user input that defined a navigation user interface that is to be presented by multiple client devices, with the user input that defined the navigation user interface having specified that the navigation user interface is to include a first selectable interface element and a second selectable interface element. The method comprises providing, by the computing system and for receipt by the first computing device, first information that is configured to cause the first computing device to present a representation of the navigation user interface that was defined at the first computing device. The method comprises receiving, by the computing system, an indication that the first computing device received user input that specified a first collection of files to be accessible to users of the multiple client devices upon selection of the first selectable interface element from a presentation of the navigation user interface. The method comprises receiving, by the computing system, an indication that the first computing device received user input that specified a second collection of files to be accessible to users of the multiple client devices upon selection of the second selectable interface element the presentation of the navigation user interface. The method comprises providing, by the computing system and for receipt by the first computing device, data that identifies a plurality of individuals that are candidates for display of the navigation user interface. The method comprises receiving, by the computing system, an indication that the first computing device received user input that specified multiple different individuals, from among a presentation of the plurality of individuals, to which the navigation user interface is to be displayed, and in response identifying devices that are assigned to accounts of the specified multiple individuals, wherein the identified devices include the multiple client devices, wherein the specified multiple different individuals include a first individual that has an account to which a first client device is assigned and a second individual that has an account to which a second client device is assigned. The method comprises providing, by the computing system and for receipt by each of the multiple client devices, second information that is configured to cause each of the multiple client devices to each: (i) present the navigation user interface that was defined by the user input at the first computing device, including presentation of the first interface element and the second interface element, (ii) provide user access to the first collection of files in response to user input at the respective client device that selects the first selectable interface element, and (iii) provide user access to the second collection of files in response to user input at the respective client device that selects the second selectable interface element.

Embodiment 2 is the computer-implemented method of embodiment 1. The method further comprises receiving, by the computing system, an indication that the first computing device received user input that selected the first selectable interface element. The method further comprises providing, by the computing system and for receipt by the first computing device, information that is configured to cause the first computing device to present, as a result of the first computing device receiving user input that selected the first selectable interface element, an interface through which the first computing device received the user input that specified the first collection of files. The method further comprises receiving, by the computing system, an indication that the first computing device received user input that selected the second selectable interface element. The method further comprises providing, by the computing system and for receipt by the first computing device, information that is configured to cause the first computing device to present, as a result of the first computing device receiving user input that selected the second selectable interface element, an interface through which the first computing device received the user input that specified the second collection of files.

Embodiment 3 is the computer-implemented method of embodiment 1, wherein receiving the indication that the first computing device received user input that defined the navigation user interface includes receiving an indication that the first computing device received user input that specified a first size and shape for the first interface element. It also includes receiving an indication that the first computing device received user input that specified a second size and shape for the second interface element, wherein the first size and shape for the first interface element differs from the second size and shape for the second interface element.

Embodiment 4 is the computer-implemented method of embodiment 3 wherein the user input that specified the first size and shape for the first selectable interface element includes user input that interacted with a display of the first selectable interface element to resize the first selectable interface element; and the user input that specified the second size and shape for the second selectable interface element includes user input that interacted with a display of the second selectable interface element to resize the second selectable interface element.

Embodiment 5 is the computer-implemented method of embodiment 1, wherein receiving the indication that the first computing device received user input that defined the navigation user interface includes: receiving an indication that the first computing device received user input that specified a first user-specified title and a first user-specified color for the first selectable interface element; and receiving an indication that the first computing device received user input that specified a second user-specified title and a second user-specified color for the second selectable interface element. The first user-specified title differs from the second user-specified title. The first user-specified color differs from the second user-specified color.

Embodiment 6 is the computer-implemented method of embodiment 1. The method further comprises providing, by the computing system and for receipt by the first computing device, information that is configured to cause the first computing device to present a collection of graphical elements that respectively represent different navigation user interfaces that are to be presented on various groups selected from plurality of client devices, including the navigation user interface. The method further comprises receiving, by the computing system, an indication that user input at the first computing device selected a particular graphical element from among the collection of graphical elements, wherein the particular graphical element is assigned to the navigation user interface. The method further comprises providing, by the computing system and for receipt by the first computing device, information that is configured to cause the first computing device to present, in response to the first computing device receiving the user input that selected the particular graphical element, accessibility to various interfaces displays, including the navigation user interface, with which user input is able to (i) add and remove selectable interface elements to the navigation user interface, (ii) add files to and remove files from the first collection of files, (iii) add files to and remove files from the second collection of files, and (iv) add individuals to and remove individuals from the specified multiple different individuals to which the navigation user interface is to be displayed.

Embodiment 7 is the computer-implemented method of embodiment 6. The method further comprises receiving, by the computing system, an indication that the first computing device received (i) user input to remove the second selectable interface element from the navigation user interface and (ii) user input to add a third selectable interface element to the navigation user interface. The method further comprises providing, by the computing system and for receipt by each of the multiple client devices after the second information has already been provided for receipt by each of the multiple client devices, third information that is configured to cause each of the multiple client devices to present the navigation user interface with the first selectable interface element and a third selectable interface elements included in the navigation user interface, and the second selectable interface element excluded from the navigation user interface.

Embodiment 8 is the computer-implemented method of embodiment 1. The method further comprises receiving, by the computing system, an indication that the first computing device received (i) user input to remove a second individual as an individual to which the navigation user interface is to be displayed, and (ii) user input to add a third individual as an individual to which the navigation user interface is to be displayed, wherein a second client device of the multiple client devices is assigned to an account of the second individual, wherein a third client device is assigned to an account of the third individual. The method further comprises providing, by the computing system and for receipt by the second client device, information that is configured to cause the second client device to remove access to the navigation user interface. The method further comprises providing, by the computing system and for receipt by the third client device, information that is configured to cause the third client device present the user interface.

Embodiment 9 is the computer-implemented method of embodiment 1. The method comprises receiving, by the computing system before the second information is provided for receipt by each of the multiple client devices, an indication that user input at the first computing device specified that the navigation user interface is to be accessible at the first client device at a first date. The method comprises receiving, by the computing system before the second information is provided for receipt by each of the multiple client devices, an indication that user input at the first computing device specified that the navigation user interface is to be accessible at the second client device at a second date, wherein the first date is different from the second date, wherein providing the first information for receipt by each of the multiple client devices includes the computing system providing the first information for receipt by the first client device at the first date and providing the first information for receipt by the second client device at the second date.

Embodiment 10 is the computer-implemented method of embodiment 1. The method further comprises receiving, by the computing system, an indication that the first client device presented a first file from among the first collection of files in response to user input at the first client device requesting to access the first file. The method further comprises receiving, by the computing system, an indication that the second client device presented the first file from among the first collection of files in response to user input at the second client device requesting to access the first file. The method further comprises receiving, by the computing system, an indication that the first computing device received user input requesting to view a level of accesses of the first file by the multiple client devices. The method further comprises providing, by the computing system and for receipt by the first computing device, information that is configured to cause the first computing device to present an indication that the first client device accessed the first file and that the second client device accessed the first file.

Embodiment 11 is the computer-implemented method of embodiment 1. The method further comprises receiving, by the computing system, an indication that the first client device presented a first screen of a first file in response to user input at the first client device requesting to navigate through screens of the first file. The method further comprises receiving, by the computing system, an indication that the second client device presented the first screen of the first file and a second screen of the first file in response to user input at the second client device requesting to navigate through screens of the first file. The method further comprises receiving, by the computing system, an indication that the first computing device received user input requesting to view a level of accesses of the screens of the first file by the multiple client devices. The method further comprises providing, by the computing system and for receipt by the first computing device, information that is configured to cause the first computing device to present (i) an indication that the first client device and the second client device presented the first screen of the first file, and (ii) an indication that the first client device presented the second screen of the first file to the exclusion of the second device presenting the second screen of the first file.

Embodiment 12 is the computer-implemented method of embodiment 1. The method further comprises receiving, by the computing system, a first screenshot that the first client device captured in response to user input at the first client device to capture a screenshot. The method further comprises receiving, by the computing system, a second screenshot that the first client device captured in response to user input at the first client device to capture a screenshot. The method further comprises receiving, by the computing system, an indication that the first computing device received user input requesting to view screenshots that the first client device captured in response to user input requests at the first client device to capture screenshots. The method further comprises providing, by the computing system and for receipt by the first computing device, information that is configured to cause the first computing device to present the first screenshot and the second screenshot that were captured at the first client device.

Embodiment 13 is directed to one or more computer-readable devices including instructions that, when executed by one or more processors, cause performance of the method of any of embodiments 1-12.

Creating a Presentation-Creation Product.

Embodiment 1 is a computer-implemented method that comprises receiving, by a computing system, an indication that a first computing device received user input to specify a name for a first presentation-creation product. The method comprises receiving, by the computing system, an indication that the first computing device received user input that adds multiple assets to be available for use in the first presentation-creation product, the multiple assets including a first image and a second image. The method comprises providing, by the computing system and for receipt by the first computing device, information that is configured to cause the first computing device to visually specify the multiple assets that were added for use in the first presentation-creation product. The method comprises receiving, by the computing system, an indication that the first computing device received user input creating multiple slides for the first presentation-creation product, wherein the user input specified that at least one of the multiple assets to include as part of each of the multiple slides. The method comprises providing, by the computing system and for receipt by the first computing device, information that is configured to cause the first computing device to present a slide-selection screen that includes a graphical representation of the multiple slides. The method comprises receiving, by the computing system, an indication that the first computing device received user input that interacted with the slide-selection screen to select a first group of slides to comprise a first presentation. The method comprises receiving, by the computing system, an indication that the first computing device received user input that interacted with the slide-selection screen to select a second group of slides to comprise a second presentation. The method comprises providing, by the computing system and for receipt by a first client device, information that is configured to cause the first client device to: (i) present a selectable interface element that identifies the first presentation-creation product and that has the name that was specified by user input at the first computing device, (ii) in response to selection of the selectable interface element that identifies the first presentation-creation product, concurrently present a first selectable interface element that is associated with the first presentation and a second selectable interface element that is associated with the second presentation, (iii) in response to selection of the first selectable interface element that is associated with the first presentation, present an initial slide of the first presentation; and (iv) in response to selection of the second selectable interface element that is associated with the second presentation, present an initial slide of the second presentation.

Embodiment 2 is the computer-implemented method of embodiment 1. The method comprises receiving, by the computing system, an indication that the first computing device received user input that assigned a first portion of the multiple slides to a first section of slides, and user input that assigned a second portion of the multiple slides to a second section of slides, wherein the slide-selection screen that is provided by the first computing device visually presents the first section of slides and the second section of slides as being distinct from another. The information that the computing system provides for receipt by the first client device is configured to cause the first client device to present a menu that includes a selectable option that identifies the first section of slides and a selectable option that identifies the second section of slides, and in response to user selection of the first option, cause the first client device to filter out presentation of slides other than those in the first section of slides.

Embodiment 3 is the computer-implemented method of embodiment 1. The method comprises receiving, by the computing system, an indication that the first client device received user input to create a new presentation through use of the multiple slides created for the first presentation-creation product. The method comprises providing, by the computing system and for receipt by the first client device, information that is configured to cause the first client device to present a presentation-creation interface that presents the multiple slides that were created for the first presentation-creation product at the first computing device. The method comprises receiving, by the computing system, an indication that the first client device received user input that specified: (i) a group of the multiple slides, (ii) an order to slides in the group of multiple slides, and (iii) a presentation name for the group of the multiple slides having the specified order.

Embodiment 4 is the computer-implemented method of embodiment 3. The method comprises receiving, by the computing system, an indication that the first computing device received user input that identified a subset of the multiple slides as being mandatory sides. The presentation-creation interface that is presented at the first client device presents the multiple slides with the subset of the multiple slides as being pre-selected.

Embodiment 5 is the computer-implemented method of embodiment 1. The method comprises receiving, by the computing system, an indication that the first computing device received user input that adds, as one of the multiple assets that are to be available for use in the first presentation-creation product, a reference asset, including user specification of a description for the reference asset and user specification of another asset of the multiple assets to which the reference asset is to link when selected with user input. The method comprises receiving, by the computing system, an indication that the first computing device received user input to create a first slide, of the multiple slides, with the user input specifying that the first slide is to include the reference asset. The information that the computing system provides for receipt by the first client device is configured to cause the first client device to present the reference asset as a result of user input selecting an interface element to toggle presentation of the reference asset while the first slide is being presented by the first client device.

Embodiment 6 is the computer-implemented method of embodiment 1. The method comprises receiving, by the computing system, an indication that the first client device received user input that adds, as one of the multiple assets that are to be available for use in the first presentation-creation product, a HyperText Markup Language (HTML) asset that specifies an HTML file. The method comprises receiving, by the computing system, an indication that the first computing device received user input to create a first slide, of the multiple slides, including user specification that the HTML asset is to be included as part of the first slide. The information that the computing system provides for receipt by the first client device is configured to cause the first client device to (i) present a web page generated from the HTML file as a background of the first slide, and (ii) modify the background of the first slide in response to user interaction with a user interface element that is defined by the HTML file.

Embodiment 7 is the computer-implemented method of embodiment 1. The method comprises receiving, by the computing system, an indication that the first computing device received user input that interacted with the slide-selection screen to select a secondary slide for a particular one of the slides in the first group of slides. The information that the computing system provides for receipt by the first client device is configured to cause the first client device to present the secondary slide overlaid the particular one of the slides in the first group of slides in response to user input at the first client device that selects an interface element for activating presentation of the secondary slide over the particular one of the slides, while the particular one of the slides is being presented.

Embodiment 8 is the computer-implemented method of embodiment 1. The first presentation includes the first slide, the second slide, and a third slide of the multiple slides. The information that the computing system provides for receipt by the first client device is configured to cause the first client device to concurrently present a representation of the first slide, a representation of the second slide, and a representation of the third slide as the first client device presents the first slide of the first presentation.

Embodiment 9 is the computer-implemented method of embodiment 1. The first group of slides to comprise the first presentation includes a first slide of the multiple slides and a second slide of the multiple slides, but does not include a third slide of the multiple slides. The second group of slides to comprise the second presentation does not include the third slide, but includes the first slide and the second slide.

Embodiment 10 is one or more computer-readable devices including instructions that, when executed by one or more processors, causes performance of the method of any of embodiments 1-9.

Distributing a Document Subject to an Approval Process.

Embodiment 1 is directed to a computer-implemented method. The method comprises receiving, by a computing system, an indication that a first computing device received user input that selected a first document, from among a group of multiple documents that are subject to an approval process by an approval computing system, as a document to add to a collection of assets, the assets in the collection of assets being available for presentation on client devices that are remote from the computing system and the approval computing system. The method comprises providing, by the computing system, information that is configured to cause the first computing device to identify assets in the collection of assets, including an indication that the first document is included in the collection of assets. The method comprises providing, by the computing system and for receipt by the first computing device, information that is configured to cause the first computing device to present a status of multiple documents that are subject to the approval process, including: (i) an indication that the first document is currently unapproved, and (ii) an indication that a second document is current approved. The method comprises receiving, by the computing system, an indication that the first computing device received user input that specified multiple users to which the computing system is to distribute the first document upon the approval computing system indicating that the first document has been approved, wherein the multiple users includes a first user and a second user. The method comprises receiving, by the computing system and from the approval computing system, an indication that the first document has been approved. The method comprises providing, by the computing system and for receipt by a first client device that is assigned to an account of the first user, in response to the computing system receiving the indication that the first document has been approved, the first document. The method comprises providing, by the computing system and for receipt by a second client device that is assigned to an account of the second user, in response to the computing system receiving the indication that the second document has been approved, the second document.

Embodiment 2 is directed to the computer-implemented method of embodiment 1. The method comprises providing, by the computing system and for receipt by the first computing device in response to the computing system receiving from the approval computing system the indication that the first document has been approved, information that is configured to cause the first computing device to update the status of the multiple documents that are subject to the approval process to include an indication the first document is currently approved.

Embodiment 3 is directed to the computer-implemented method of claim 1. The method comprises receiving, by the computing system, an indication that user input at the first computing device specified that the first document is to be accessible through a page of a user interface. The method comprises providing, by the computing system and for receipt by the first client device, information that is configured to cause the first client device to present the user interface through which the first document is to be accessible.

Embodiment 4 is directed to the computer-implemented method of embodiment 1. The information that the computing system provides and that is configured to cause the first computing device to identify the assets in the collection of assets includes: (i) the indication that the first document is included in the collection of assets, including an indication that the first document is subject to the approval process; (ii) the indication that the second document is included in the collection of assets, including an indication that the second document is subject to the approval process; and (ii) an indication that a third document is included in the collection of assets, including an indication that the third document is not subject to the approval process.

Embodiment 5 is directed to the computer-implemented method of embodiment 1. The computing system provided the first document for receipt by the first client device without receipt of user input that specified that the computing system was to provide the first document for receipt by the first client device, after the computing system received the indication that the first document had been approved.

Embodiment 6 is directed to the computer-implemented method of embodiment 1. The method comprises receiving, by the computing system and from the approval computing system after the first document has been approved and has provided for receipt by the first client device, an indication that a new version of the first document is available. The method comprises providing, by the computing system and for receipt by the first client device in response to the computing system having received the indication that the new version of the first document is available, the new version of the first document.

Embodiment 7 is directed to the computer-implemented method of embodiment 6. The method comprises receiving, by the computing system and from the approval computing system, an indication that the new version of the first document is no longer approved. The method comprises providing, by the computing system and for receipt by the first client device in response to the computing system receiving the indication that the new version of the first document is no longer approved, information that is configured to cause the first client device to remove access to the new version of the first document.

Embodiment 8 is directed to the computer-implemented method of embodiment 7. The method comprises receiving, by the computing system and from the first computing device, an indication that user input at the first computing device selected automated deletion from client devices of documents that transition from being approved to being no longer approved. The computing system provides the information that is configured to cause the first client device to remove access to the new version of the first document in response to the computing system having received the indication that the user input at the first computing device selected automated deletion from client devices of documents that are no longer approved. The computing system is configured to not cause the first client device to remove access to the new version of the first document in response to the computing system having received an indication that the user input at the first computing device did not select automated deletion from client devices of documents that are no longer approved.

The details of one or more implementations are set forth in the accompanying drawings and the description below. Other features, objects, and advantages will be apparent from the description and drawings, and from the claims.

DESCRIPTION OF DRAWINGS

FIGS. 3-4B show user interfaces with which a user is able to manage individuals that are candidates for receiving navigation user interfaces.

FIG. 5 shows a user interface with which a user is able to create a library of assets that may be used to design navigation user interfaces and that may be accessed through use of navigation user interfaces.

FIGS. 6-10 show user interfaces with which a user can modify navigation user interfaces or create a new navigation user interfaces.

FIG. 19 shows a page at which a user can identify documents that have to be validated.

FIG. 21 shows how the social network user interface appears on the client devices.

FIGS. 22-28 shows user interfaces from which to make presentation-creation products.

FIGS. 29-32 shows how the presentation-creation products appear on client devices.

FIGS. 36-37 show a user interface for creating a survey.

FIG. 39 shows how the results of the survey are presented after the survey questions are distributed to the client devices and users take the surveys.

Like reference symbols in the various drawings indicate like elements.

DETAILED DESCRIPTION

Figure 1:
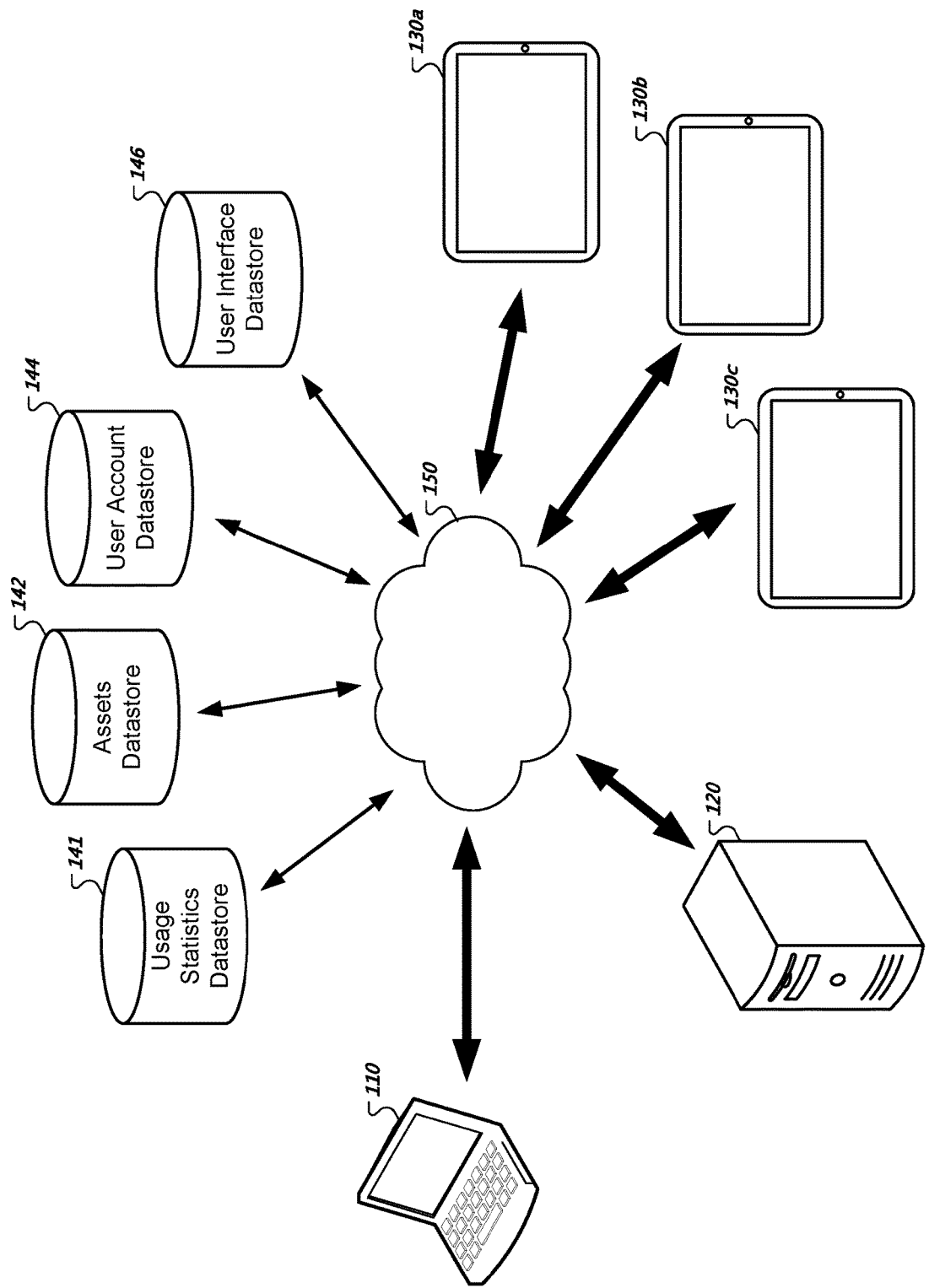
FIG. 1 shows a diagram of an example system for distributing a user interface for accessing files.

This document generally describes various techniques for distributing a user interface for accessing files. In various examples, an individual may use the system described throughout this disclosure to design a user interface that will be provided for display by multiple client devices and with which users of the client devices may access files that were specified by the individual. This disclosure refers to such a user interface as a "navigation user interface" for reference purposes. Information for generating the navigation user interface, along with the files that can be accessed using the navigation user interface, may be transferred from a server system to the client devices while the client devices are online, but may remain accessible when the client devices are offline. As such, users of the client devices may be able to interact with the navigation user interface to access the multiple files even when the client devices are without internet access.

An individual may design multiple such navigation user interfaces through use of a web site (sometimes referred to as a web application) that is hosted by a computing system that may be remote from a computing device at which the individual accesses the web site. The individual can specify recipients to which the navigation user interfaces are to be distributed. When client devices that are assigned to those recipients come online, the computing system may transmit information for generating those user interfaces to the client devices. Some of the client devices may be able to present multiple such navigation user interfaces.

Such a system may be particularly helpful in situations in which an organization may desire to control the information that is accessible to users of the client devices and monitor use of that information. An example situation is with pharmaceutical companies and their sales representatives. Laws and regulations may prohibit the type of documents that sales representatives are able to show to medical professionals, such as doctors. Pharmaceutical companies may want to not only control which documents are accessible on electronic devices carried by their representatives, but may wish to track usage of these documents.

In an example scenario presented in this disclosure, a pharmaceutical company may distribute tablet client devices to sales representatives, and those representatives may use the tablets to review information on various medications and present that information to medical professionals. Because the information on the tablets is being shown to third parties, the company desires to not only control the files that are accessible through use of the client device, but also the user interface through which company representatives are able to access those files. In fact, each tablet may be able to present multiple such user interfaces, for example, each being for a different medication. The employee at the pharmaceutical company may be able to designate which sales representatives are to receive which of multiple user interfaces, and times at which the user interfaces are to be distributed.

As discussed in greater detail below, one of the files that may be accessible through a navigation user interface may be a presentation that was designed by an employee of the pharmaceutical company through use of the web site. In other words, the web site may enable a company employee to quickly create presentations through a multi-step process: developing a list of assets (e.g.; images and videos) from which to create slides, creating slides using the assets, assigning the slides to various sections, and then creating one or more presentations. The one or more presentations that are generated from a particular collection of slides may be transmitted to a client device as a group, and that client device may then permit a user to view the one or more presentations.

As also discussed in greater detail below, the navigation user interface may provide access to documents that require approval by a remote computing system. For example, some documents may be involved in a vetting process by which a group of individuals (e.g., people in a different department at an organization) review and update a document to ensure that it is accurate and does not violate certain laws or regulations. Once the document is approved, the computing system that distributes the navigation user interface may receive an indication that the document has been approved. At that time, the computing system may automatically send the approved document to the client devices that are hosting the navigation user interface. In response, the client devices may update their navigation user interface to permit access to the newly-approved document (a link to the document may not previously have-appeared in the navigation user interface, or that may have been non-selectable, may become active). The computing system may also send out updated versions of documents as those updated versions are approved, and can cause client devices to remove access documents that have been unapproved.

These features, and others are described in additional detail with reference to the figures.

FIG. 1 shows a diagram of an example system for distributing a user interface for accessing files. The system includes a computing device 110 at which an individual can design various navigation user interfaces and assign assets to those user interfaces. The navigation user interfaces may be designed through use of a web site that is provided by computing system 120, which communicates with the computing device 110 over a communication network 150, such as the internet. Information that specifies the design of the user interfaces may be stored in user interface datastore 146.

The computing system 120 may provide the navigation user interfaces for receipt by client devices 130a-c. User account datastore 144 may assign these client devices to user accounts. The assets that computing system 120 may distribute to the client devices 130a-c may be stored in or referenced by the assets datastore 142. Usage statistics datastore 141 may store statistics that identify user interaction with client devices 130a-c to access certain assets and screens-thereof.

The functioning of the system that is shown in FIG. 1 is discussed in greater detail with reference to other figures. The diagram shown in FIG. 1 is intended to aid discussion of the mechanisms that are referred to in this disclosure, but the disclosure is not meant to be limited to this description.

Figure 2:
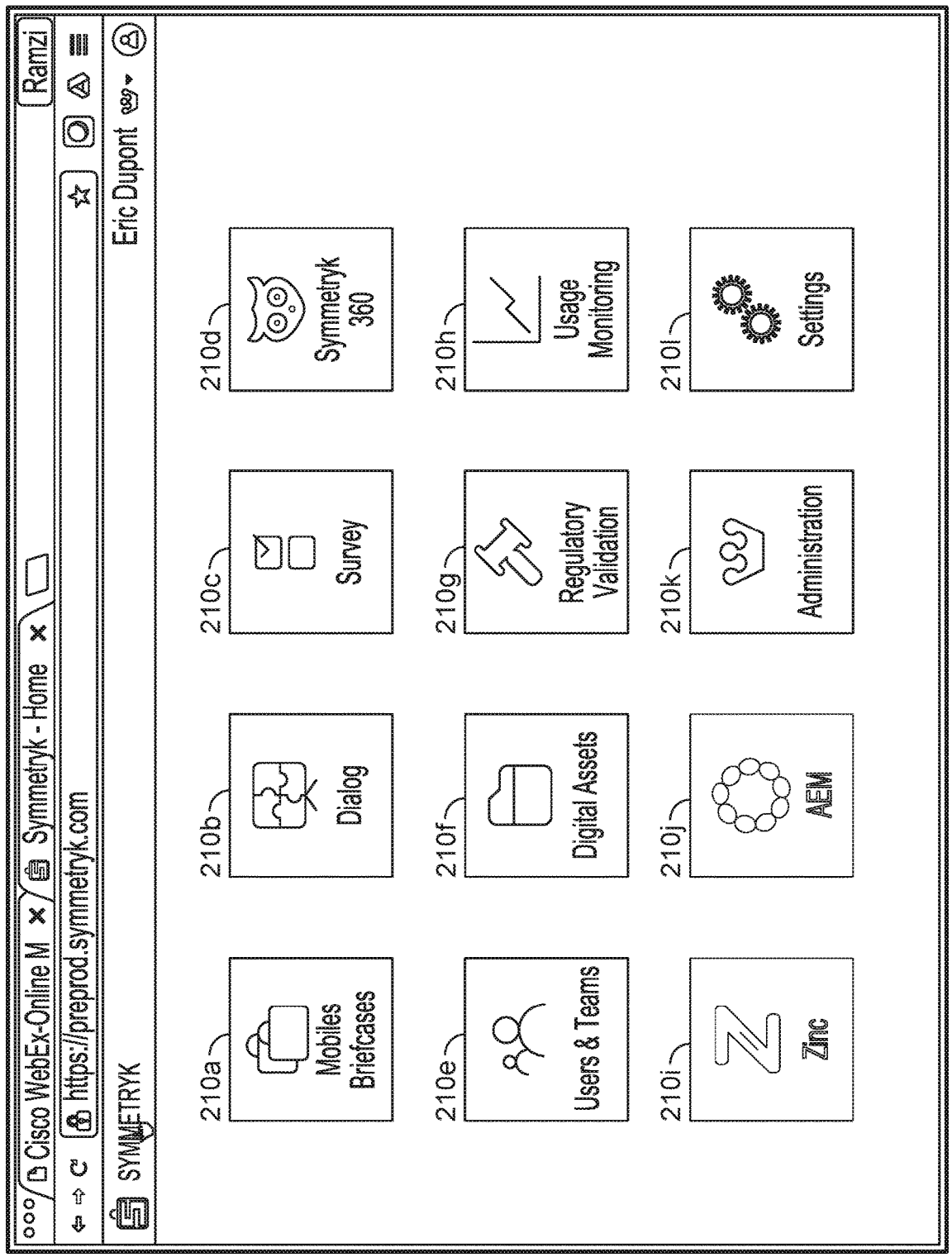
FIG. 2 shows an introductory user interface of a system for designing and distributing navigation user interfaces.

FIG. 2 shows an introductory user interface of a system for designing and distributing navigation user interfaces. The introductory user interface that is presented in FIG. 2 may be provided by a web browser at computing device 110. A user of that computing device may have launched a web browser application program and entered a URL for the web page that is shown in FIG. 2, or selected a bookmark that is directed to the URL. In response, the computing device 110 may send a request over the internet to a remote server system (e.g., computing system 120) for resources that correspond to the URL. The computing device 110 may receive responsive resources (e.g., an HTML file, script code, images), from which a web browser application program at the computing device 110 may render the web page that is presented in FIG. 2.

The web page that is shown in FIG. 2 may be an introductory webpage to a website, and that introductory webpage may be presented to a user that has logged onto the website (e.g., using a login name and credentials for a user account). The web page includes multiple icons 210a-l that a user can select to cause the web browser to navigate to a display of a user interface for the respective icon. For example, a user may tap a portion of a touchscreen at which the icon is displayed, or click a mouse over a display of the icon, to cause the computing device 110 to send a request for resources corresponding to a different web page, to receive the responsive resources, and then to generate a display of a web page from the responsive resources. In some implementations, all or some user interface changes at computing device 110 may involve sending resource requests to computing system 120 and receiving resources responsive thereto. In this illustration, the user selects the "Users & Teams" icon 210e to cause the web browser to navigate to the user interface that is presented in FIG. 3.

Figure 3:
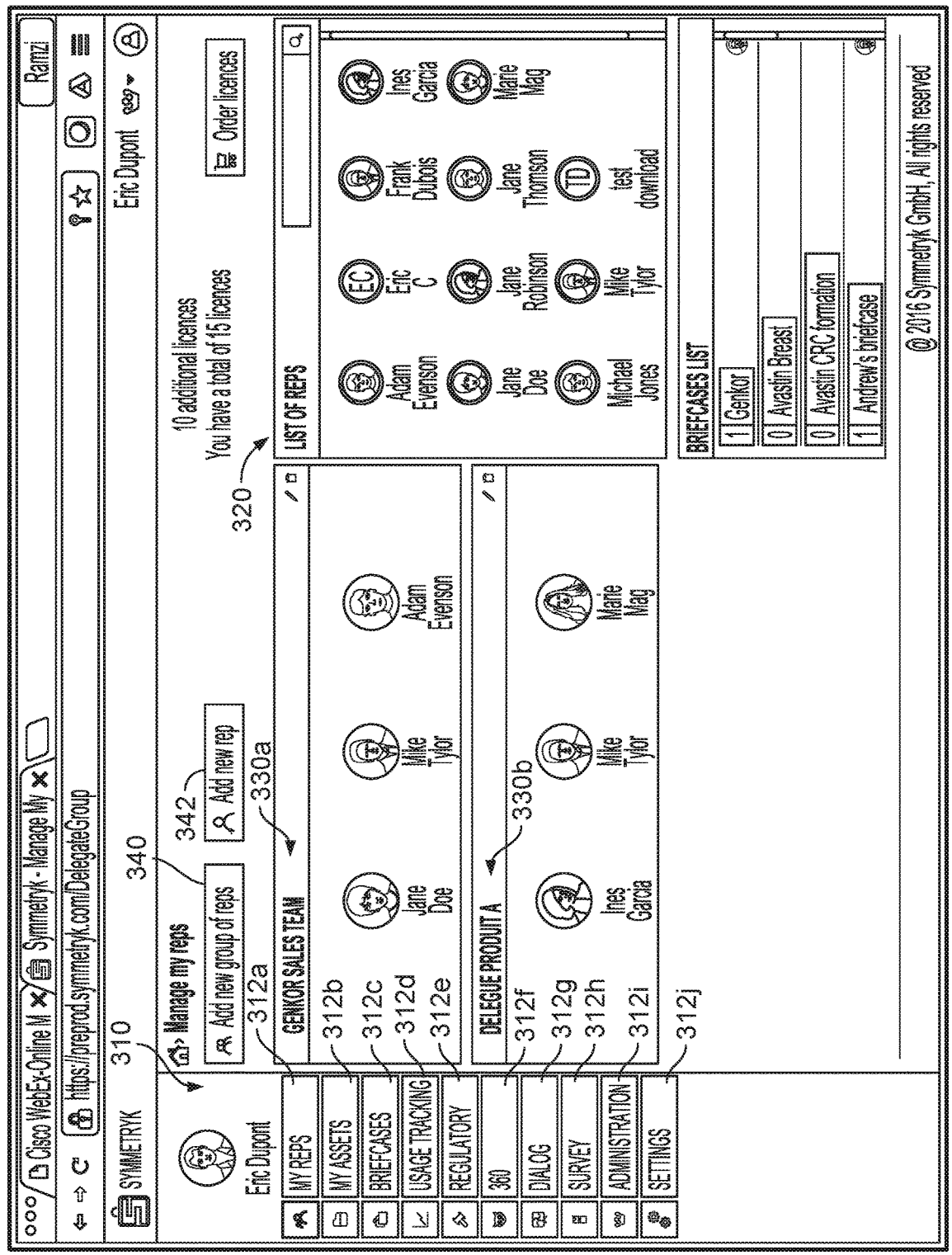

FIG. 3 shows a user interface with which a user is able to manage individuals that are candidates for receiving navigation user interfaces. In this example, sidebar 310 includes user interface elements 312a-j that correspond to the icons 210a-l that were presented in FIG. 2. Here, the "My Reps" user interface element 312a is highlighted to indicate that the user is currently at the representatives webpage. The sidebar 310 may appear in many of the pages of the website, to aid user navigation.

The right side of the web page includes a list of representatives portion 320. This portion indicates all users (e.g., user accounts) that may be modifiable by an account of the user that logged in (here Eric Dupont). In various implementations, the user that logged in may be a manager or marketer at a pharmaceutical company, and the individuals that are shown at the right portion of the screen may be sales representatives that work for the company.

A user of the webpage may form groups of representatives. For example, this webpage shows a "Genkor Sales Team" group 330*a* and a "Delegue Product A" group 330*b*. Each displayed group may include icons for the representatives that are members of that group. Representatives may belong to multiple groups, and a representative that is shown in a group may still appear in the list of representatives 320. A user of the webpage may add a representative to a group of individuals, for example, by selecting an icon for a representative in the list of representatives 320 and dragging and dropping that icon in a region presented for an existing group.

A user may add a new group by selecting the "Add new group of reps" selectable interface element 340. In response, the system may generate a pop-up box that includes a field with which a user can specify a name for a new group. In response, the computing system may generate a label for the new group in the web page of FIG. 3, and enable dragging and dropping new users to that group.

A user may add a new representative to the list of representatives 320 by selecting the "Add new rep" user interface element 342. In response, the computing device may present a pop up box that includes fields for entering a first name, a lost name, an email address, a password, and an avatar/icon to visually represent the user. The user can then select a "create" interface element in the pop up box to add the new representative to the list of representatives 320. The system can also import multiple users through synchronization with a company directory (e.g., a synchronization with an address book).

Figure 4A:
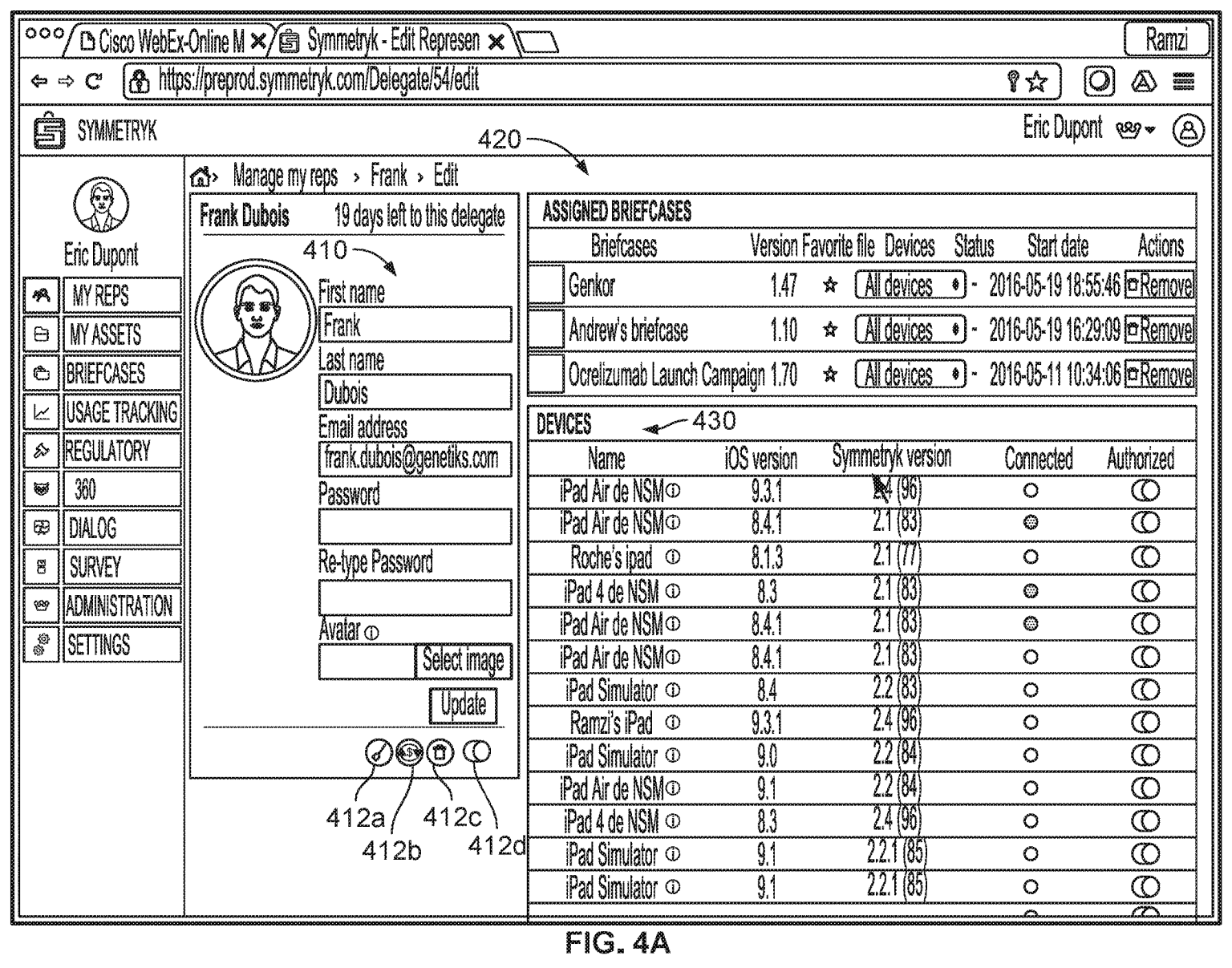
Figure 4B:
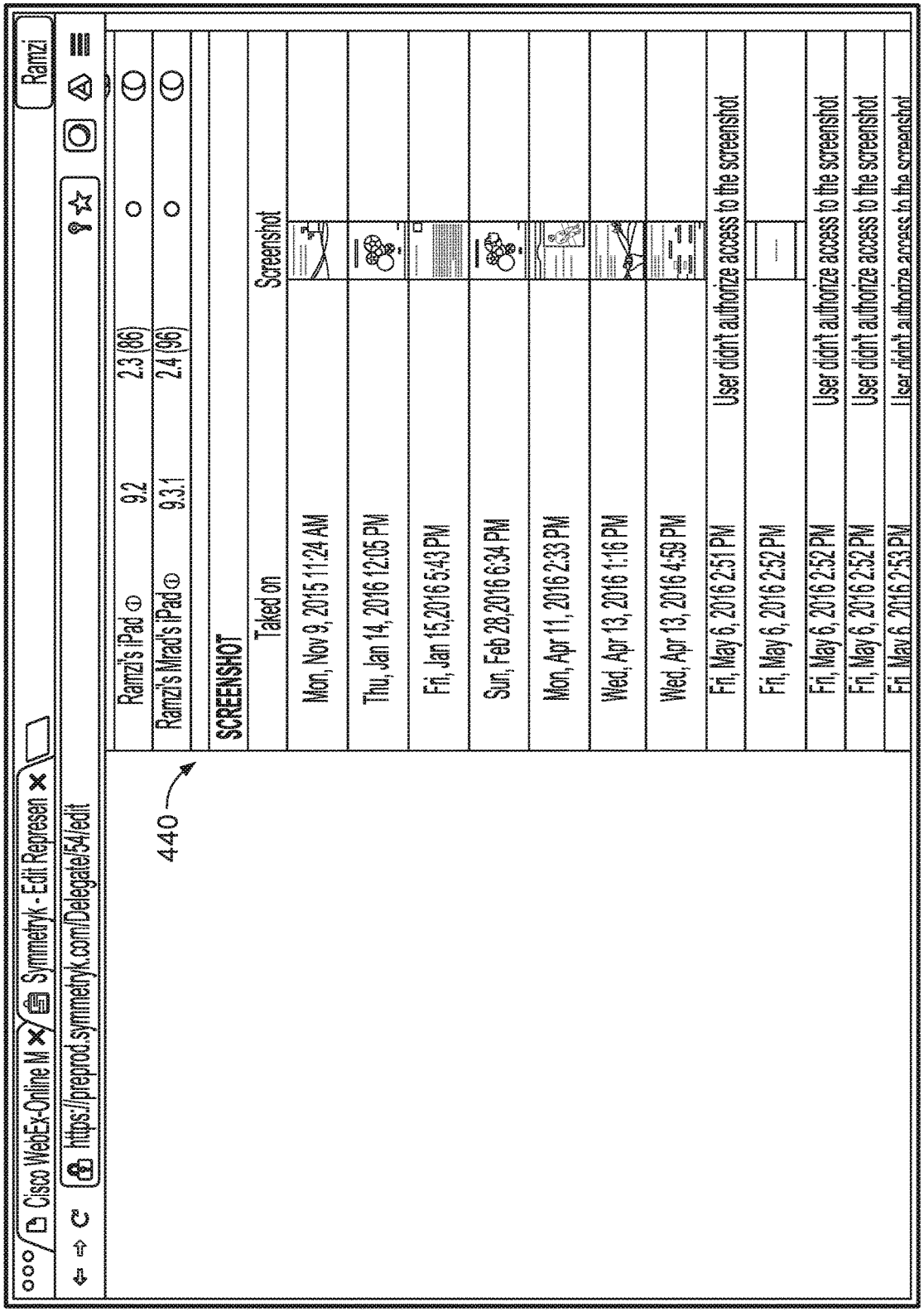

A user can select an interface element to cause navigation to the web page that is shown in FIGS. 4A-B. This web page enables a user to edit a representative's first name, last name, email address, password, and avatar/icon through interaction with user interface elements 410 (e.g., editable text fields). Under those elements are icons 412*a-d* with which a user can clear data for the representative (icon 412*a*), update a license for the representative (icon 412*b*), delete the representative (icon 412*c*), and deactivate the representative (icon 412*d*).

The top-right portion of the web page includes an "Assigned Briefcases" section 420 that lists the briefcases (referred to herein as navigation user interfaces) to which a user is assigned. These briefcases will be discussed in additional detail in other portions of this disclosure, but in this illustration it is apparent that representative Frank Dubois is assigned to three Briefcases: "Genkor," "Andrew's briefcase," and "Ocrelizumab Lunch Campaign." The web page shows the version of the briefcase and includes a pull-down menu with which the user can see which of Frank's devices are authorized to view the particular briefcase. For each briefcase, there is also a region that displays a status icon that represents the status of each briefcase for each device (once a device has been selected from the pull-down menu). A gray element indicates that he device has never connected to the internet to retrieve the briefcase and is not synced to include the briefcase. A Blue element indicates that the device has connected to the internet to retrieve the briefcase and has the latest documents downloaded.

The start date for each briefcase indicates the first time that the briefcase was synced to that user (or a particular device for that user). The "Remove" user interface element allows a user to remove a representative's access to a particular briefcase.

Further down the web page is a devices section 430. This section lists all of the devices that are assigned to the representative and with which the representative can view briefcases that are assigned to him. In some examples, only a single device may be assigned to the representative, although this example shows multiple devices. For each device, the web page displays a name of the device, a version of the operating system, and whether that device is currently connected to the server systems that provide updated files and briefcases. The user of the webpage can select a toggle interface element to add and remove authorization for a particular device to access briefcases and content.

FIG. 4B shows a bottom portion of the web page that was shown in FIG. 4A. The bottom portion includes a list of screenshots 440, which shows screenshots that were captured on one or more client devices assigned to the representative. For example, the first time a client device may receive input to capture a screenshot, the client device may prompt the device user (e.g., the sales representative) whether the device is permitted to capture the screenshot and transmit it to the server system. Should the representative authorize transmission, each screenshot captured by the system may be transmitted and stored at the server system (e.g., computing system 120), to be presented on the web page that is shown in FIG. 4B. Should the representative decline capture and transmission of the screenshot, the client device may transmit an indication that transmission was declined, and the web page that is shown in FIG. 4B may state "User didn't authorize access to the screenshot" for that particular screenshot.

Figure 5:
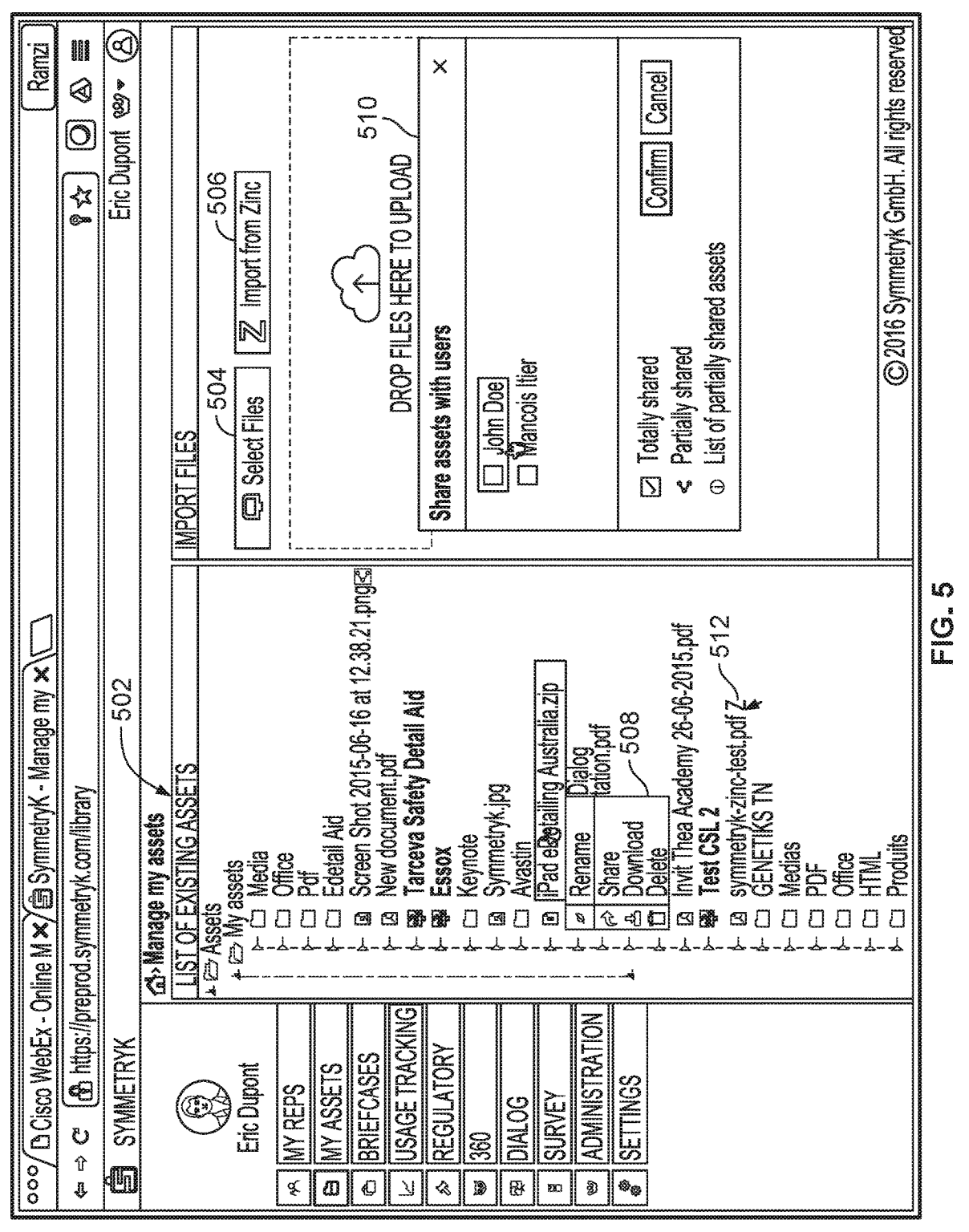

FIG. 5 shows a user interface with which a user is able to create a library of assets that may be accessed through use of navigation user interfaces. In this illustration, and as shown by the sidebar to the left of the web page, the user has clicked on a "My Assets" interface element. As a result, the web browser has displayed a list of assets 502. That list includes various assets (e.g., files such as documents) and folders that include assets therein.

Users can add files to the library by selecting a "Select Files" interface element 504. In response, the computing system may display of a dialog box from which a user may be able to select one or more files from the user's computer or from a remote system (e.g., a system accessed via the internet). Upon selection, the files may appear in the list of assets 502.

A user can also add a file by selecting an "Import from Zinc" interface element 506. In response, the computing system may display a dialog box from which a user may be able to select one or more files that are subject to approval by an approval system (as described in greater detail with respect to FIGS. 34A-C and 35).

Among those assets that are already included in the list of assets 502, the user interface may include a "Z" icon next to any documents that are assets that were imported from the zinc system (e.g., document 512). Those assets that are created with the DIALOG system (described later in this document) may be shaded blue.

A user may also select each asset (e.g., by clicking with a mouse or selecting with touch) to cause the webpage to present a pop-up box 508. From that pop-up box 508, the user is able to rename a file, share a file, download a file to their computer, and delete a file. Should the user select the "Share" interface element, the web page may display dialog box 510. That dialog box may include multiple individuals to which the user is permitted to share the asset (e.g., by clicking a check box next to each representative, where the list of representatives may be those from the list of representatives portion 320 (FIG. 3).

Figure 6:
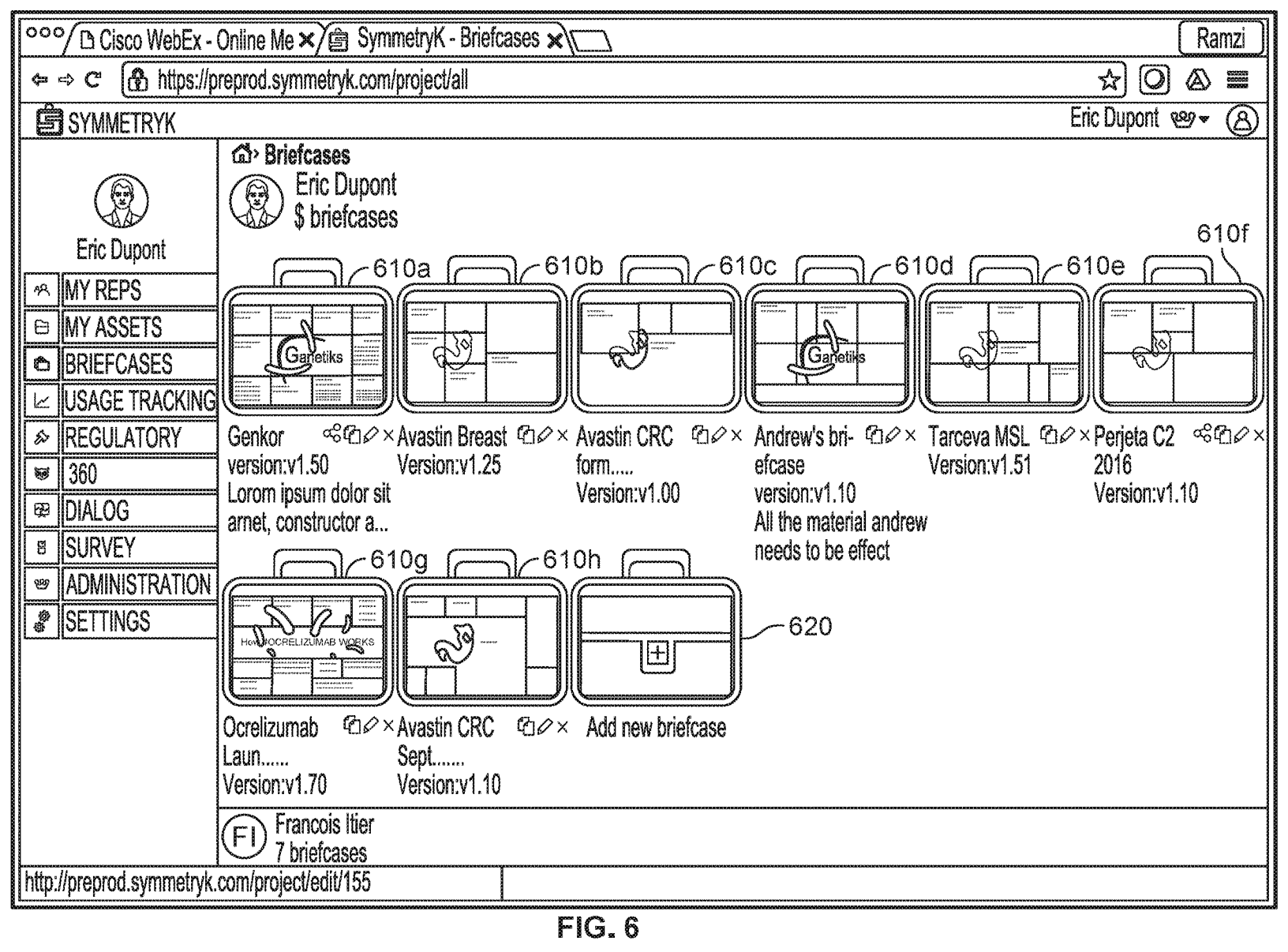

FIG. 6 shows a user interface with which a user can modify a navigation user interface or create a new navigation user interface. A navigation user interface may be a user interface that is created for display by another device, and through which that other device can navigate to subpages to access files. In this example, a user has selected the "Briefcases" interface element in the sidebar of the web page that is shown in FIG. 6. In response, a request may be sent to computing system 120 that in return provides resources to client device 110 for generating the display that is provided in FIG. 6. (Each of the displays that are provided on client device 110 throughout this disclosure may be generated through a similar client-server communication model.)

The web page includes a collection of interface elements 610a-h that identify previously-created navigation user interfaces. A user can edit a previously-created navigation user interface by selecting its respective interface element. The web page also includes an interface element 620 that can be selected to create a new navigation user interface.

Figure 7:
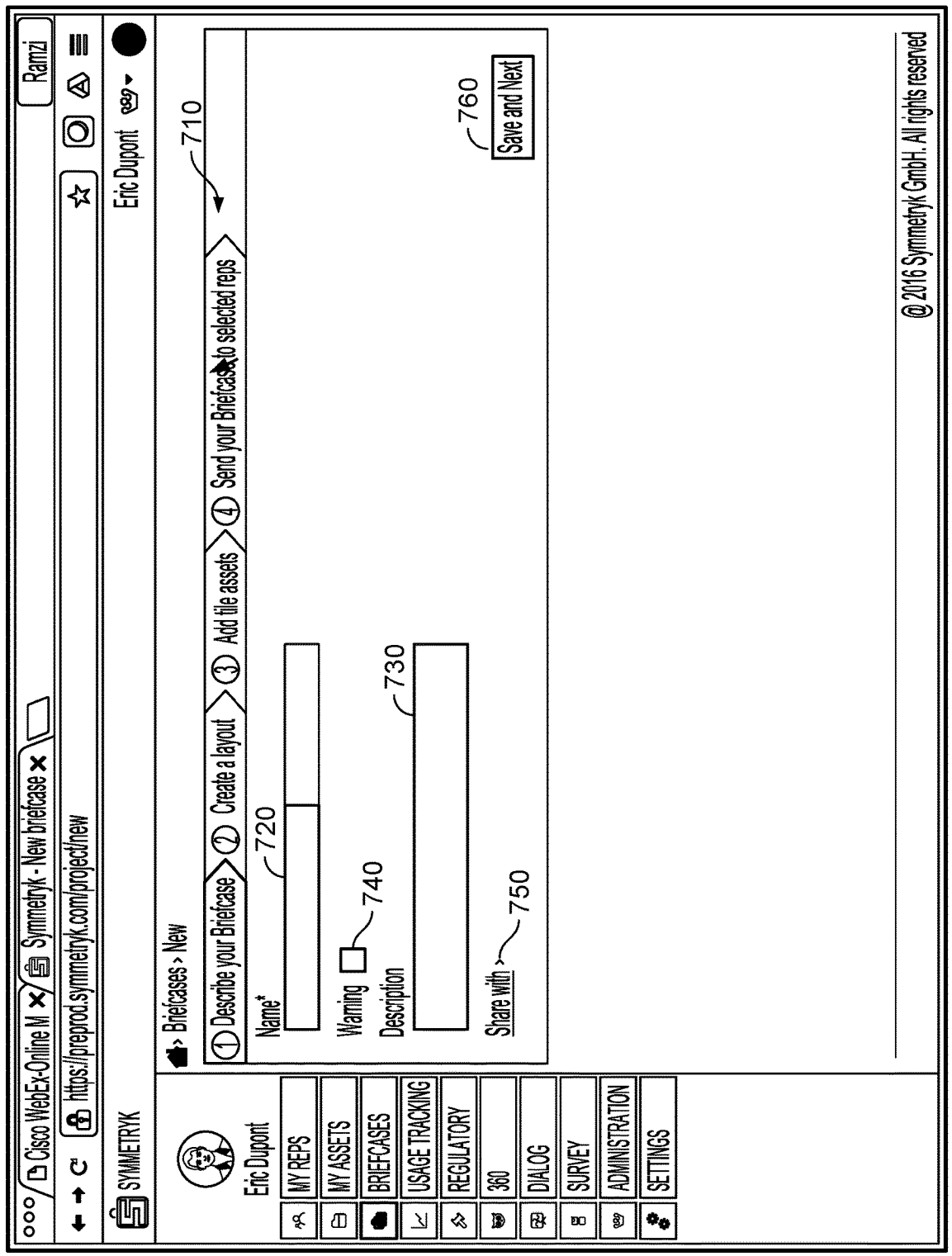

In response to selection of the new navigation user interface element 620, the web browser at the client device 110 may present the web page that is shown in FIG. 7. The web page that is shown in FIG. 7 may indicate at section 710 that there are four steps to creating a navigation user interface, and that the user is currently at a first step. At this page, the user can specify a name for the navigation user interface through text entry field 720 and a description for the navigation user interface through text entry field 730. The user can also select a "Warning" element 740. Selecting the warning element 740 can indicate that the navigation user interface that is about to be created may include non-approved materials, and therefore when an individual opens the newly-created navigation user interface on their client device (e.g., one of devices 130a-c, sometimes referred to herein as just device 130), the client device may present a warning that the navigation user interface may present non-approved materials.

Selecting the "Share with" element 750 allows a user of the computing device 110 to designate other users of devices similar to computing device 110 to which the navigation user interface is to be shared (e.g., there may be multiple marketers at a pharmaceutical company that are creating navigation user interfaces for field representatives). Selection of the share with element 750 may cause the webpage to present a dialog box that allows a user to select not only particular users to which the navigation user interface should be shared, but also whether those users have "Edit" access and "Delete" access.

Figure 8:
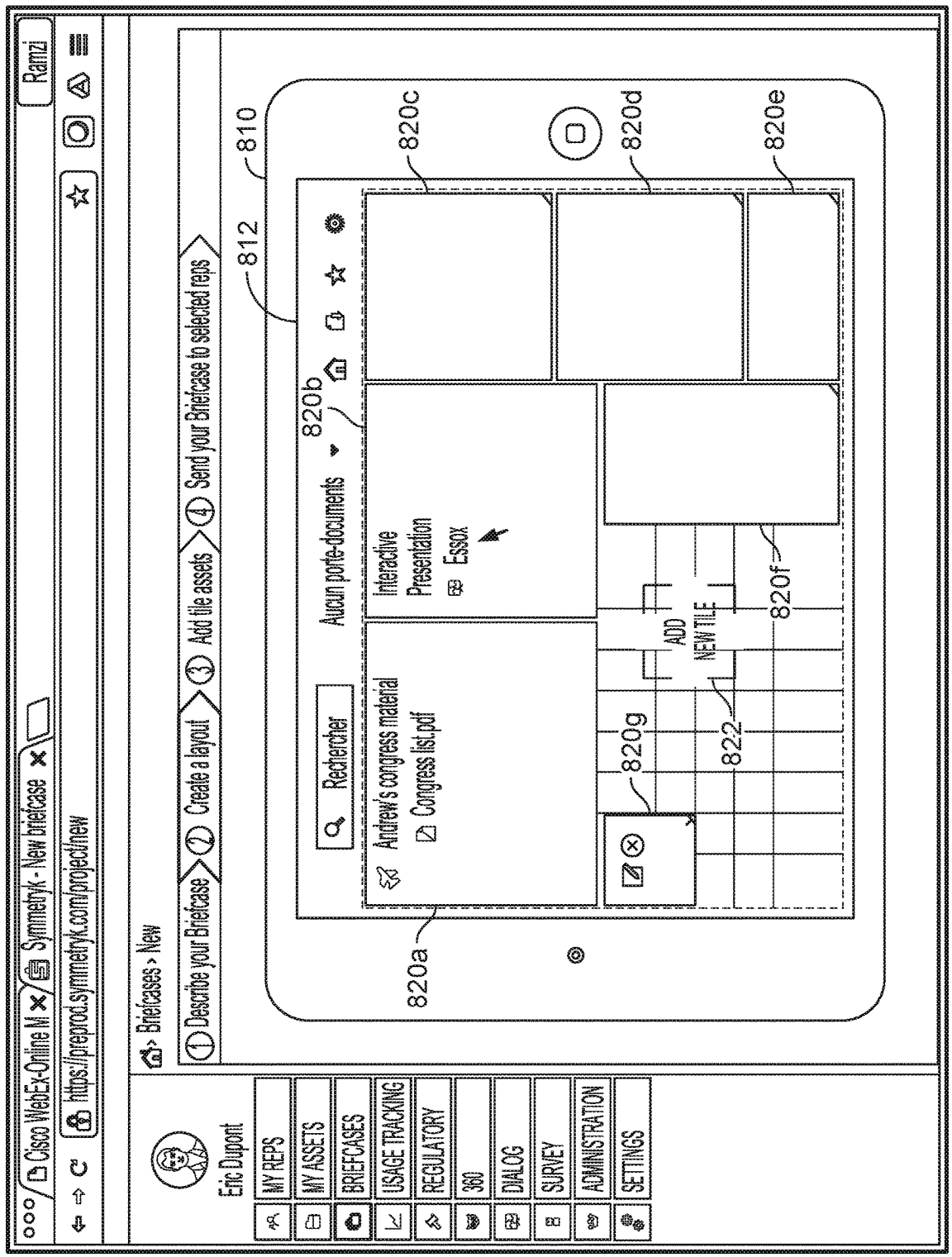

In response to selection of the 'Save and Next' element 760, the computing device 110 may present the user interface that is shown in FIG. 8. Using the web page that is shown in FIG. 8, an individual is able to define the appearance of the navigation user interface. For example, this web page includes a representation of how the user interface may look on any client device 130a-c to which the navigation user interface is to be provided. Indeed, the web page includes an outline 810 of an example client device tablet computer that includes a display region 812 that represents the screen of the client device (dimensioned the same as the screen on the actual client device), and within which a user is able to specify the features of the navigation user interface that may be presented on the client device.

In this example, the navigation user interface (e.g., the interface shown within display region 812) includes seven selectable interface elements 820a-g, which the figures (and this disclosure at times) refers to as "tiles" of the user interface. The size and shape of each of these tiles may have been created by user input at the computing device 110. For example, the user may have selected the user interface at a particular location (e.g., at the "Add New Tile" element 822) to create a new selectable tile, and then may drag that tile to define a size and shape of the interface element. In other words, selecting the Add New Tile element 822 may cause the computing system to present an additional tile, after which the user input drag the tile to a new position, and additional user input may drag a side or corner of the tile to change its size and dimensions. In effect, the user may drag a corner of the newly-created tile to stretch it in various directions. Once the tile has been created, a user may again select the tile to drag it around to a new location on the display. In various examples, the tiles may snap to predetermined locations in a grid, and may not be able to overlap other tiles in the display region 812 (at least not permanently, such that the overlap would appear when the navigation user interface is presented for display by a client device). In various examples, the computing system may require that the entire display region 812 be filled with tiles before the display region 812 can be presented by a client device.

Upon mouseover or contact with a tile, the computing device 110 may present icons that allow a user to either remove or edit the tile (e.g., as shown by the edit and delete icons presented on tile 820g). In response to selection of the edit interface element, the computing system may present a dialog box at which a user is able to provide a name for the tile, a description for the tile, a background color for the tile, and an optional icon to be displayed by the tile. In FIG. 8, the selectable element 820a includes the user-defined title "Andrew's congress material". Any user-specified description may appear in smaller text below this title. Below that description may be the list of assets (here just "Congress list.pdf"). In this example, there is an asset already added (presumably because this screenshot shows a user editing a previously-created navigation user interface).

Figure 9:
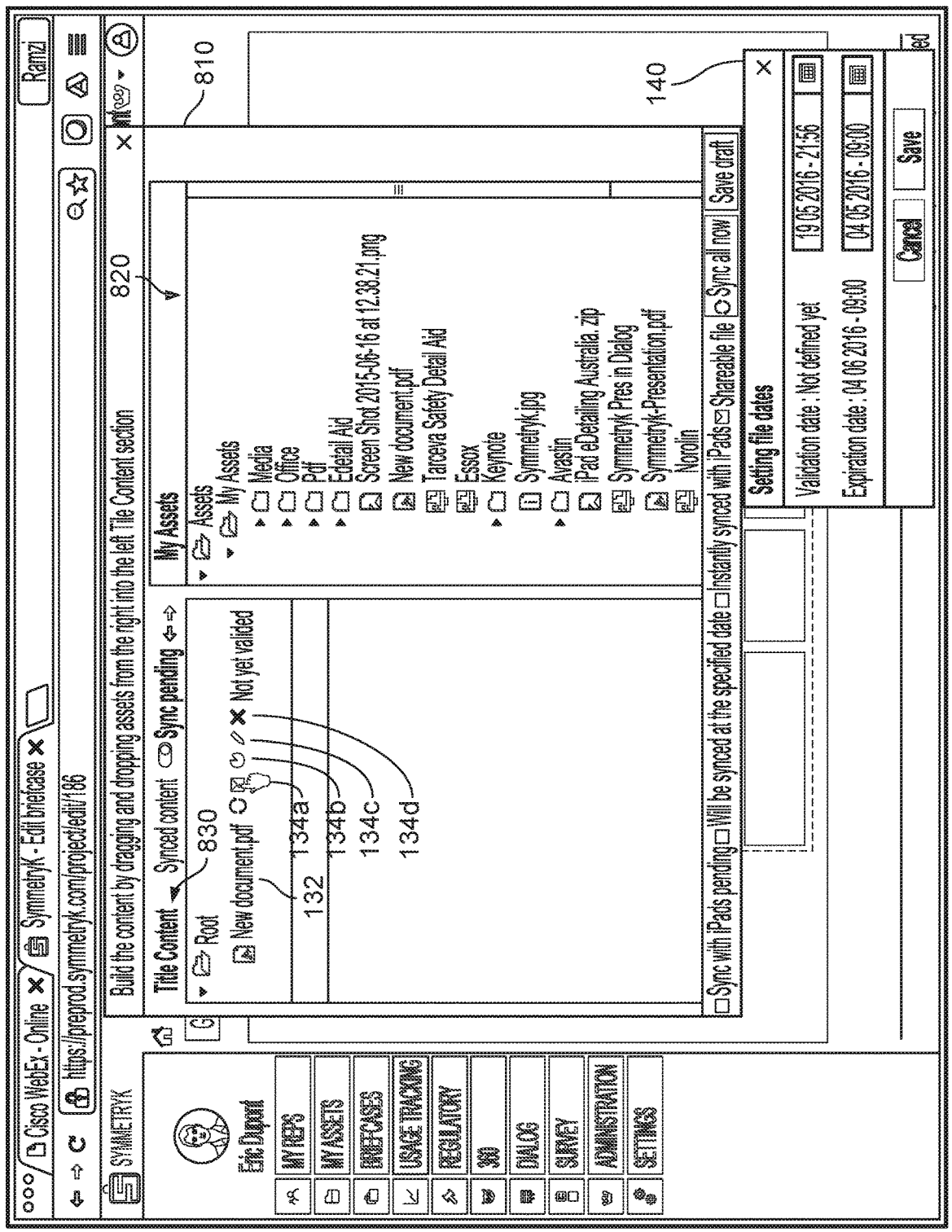

FIG. 9 shows a user interface for adding assets to a tile. The computing device 110 may show this user interface in response to a user selecting an "Add tile assets" element from the web page shown in FIG. 8 (or other web pages that include that interface element). In response, the web browser may present another representation 812 of the navigation user interface, except that this time when a user selects a tile it causes the web browser to present a dialog box 810 from which a user is able to assign one or more assets to the selected tile. In this example, the dialog box includes a list of assets 820 that may represent those assets that were defined through the assets interface that is presented in FIG. 5. A user may drag one or more of these assets to the "Tile Content" region 830 of the dialog box 810 to assign those assets to the selected tile. The assigned assets may display below the title of the tile, as illustrated for selectable element 820 in FIG. 8, and may be accessible to an end user of a client device 130 to which the navigation user interface is ultimately provided.

For those assets that are added to the tile (e.g., asset 132), the user can set multiple settings. For example, selecting an email icon 134a enables a user to specify whether a representative that is accessing the file through a client device 130 is able to email or otherwise share the file with other devices. An edit icon 134*c* enables a user to edit a name of the file. A remove icon 134*d* enables a user to remove the document from the selectable element.

A sync icon 134*b* enables a user to specify when the file should be synced with a client device and when that file is to expire. In response to selection of this icon, the computing device 110 may present the dialog box 140. This dialog box may include fields that enable a user to specify a validation or start date and time, and an expiration date and time. With these dates specified, the computing system 120 may not provide the file to any of the client devices 130*a-c* until that date and time has arrived. The client devices 130*a-c* may include code that prevents users from viewing the file after the expiration date has been reached (and the file may disappear from display in its respective tile).

Selecting the "Sync all now" button may cause the computing device 110 to send an indication to the computing system 120 that the assets for the tile are to be synced to any of the client devices 130*a-c* to which the briefcase has been designated (at least for those assets that do not have a validation date that is set in the future). This tile-by-tile syncing can be particular helpful when a user edited a navigation user interface to add or remove assets from a particular tile. In a similar manner, a user may add or remove tiles themselves, or the appearances of tiles in real time even after the navigation user interface has been deployed to remote client devices 130*a-c*.

Figure 10:
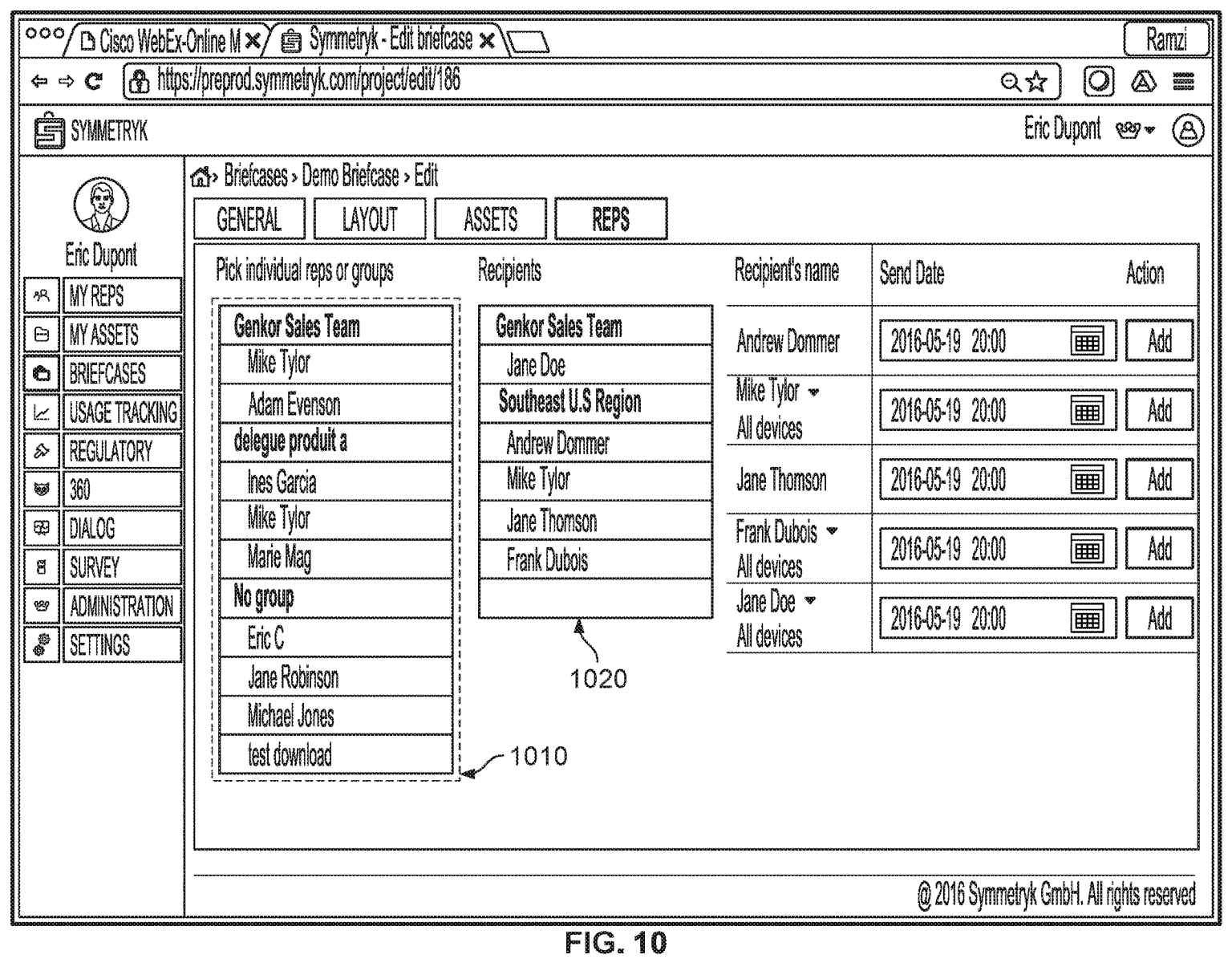

FIG. 10 shows a user interface at which an individual can assign a navigation user interface for display by one or more recipients. This user interface may be navigated to by user selection of the "Reps" interface element in various displays. In this example, a list of potential recipients 1010 is presented to the left side of the page. This list may present those individuals that were specified at the "My Reps" web page that is shown in FIG. 3 (although the list may differ slightly here because screenshots of the user interfaces may have been taken during different sessions).

In this example, the groups that are specified in the web page at FIG. 3 (e.g., see groups 330*a* and 330*b*) may be presented separately than those representatives that are shown in the list of representatives 320 (FIG. 3) but are not found in any group. A user may add one or more of the potential recipients to the list of designated recipients 1020, for example, by selecting a particular individual (with a mouse click or a tap on a touch screen on that person's name) or by selecting an entire group of individuals (with a mouse click or a tap on that group's name).

Those individuals that have been added to the designated recipients list are also shown to the right of the screen, where a user can specify the send date, and then click an "Add" interface element to add that user as a confirmed recipient for the navigation user interface. Once the user has been added as a confirmed recipient for the navigation user interface, the next time that the user's client device 130 logs onto the internet and syncs with the computing system 120 (assuming that date is after the "Send Date" that is specified in the web page of FIG. 10), the client device may download the navigation user interface. This process may occur without the user of the client device specifically selecting the navigation user interface for download. It may just appear in their list of navigation user interfaces. Should the navigation user interface change (e.g., through user interaction with the interfaces presented in FIGS. 6-10), the client device 130 may update its navigation user interface when it syncs with computing system 120.

In this way, an individual that is designing or updating a navigation user interface can specify different dates for different individuals to receive the navigation user interface (see FIG. 10), and can specify different dates for different files to be distributed to designated recipients (see FIG. 9). As such, some users may have access to the navigation user interface on their client devices 130*a-c* before other users, and even once some or all users have access to the navigation user interface, one or more files may remain unavailable until a later date.

Figure 11:
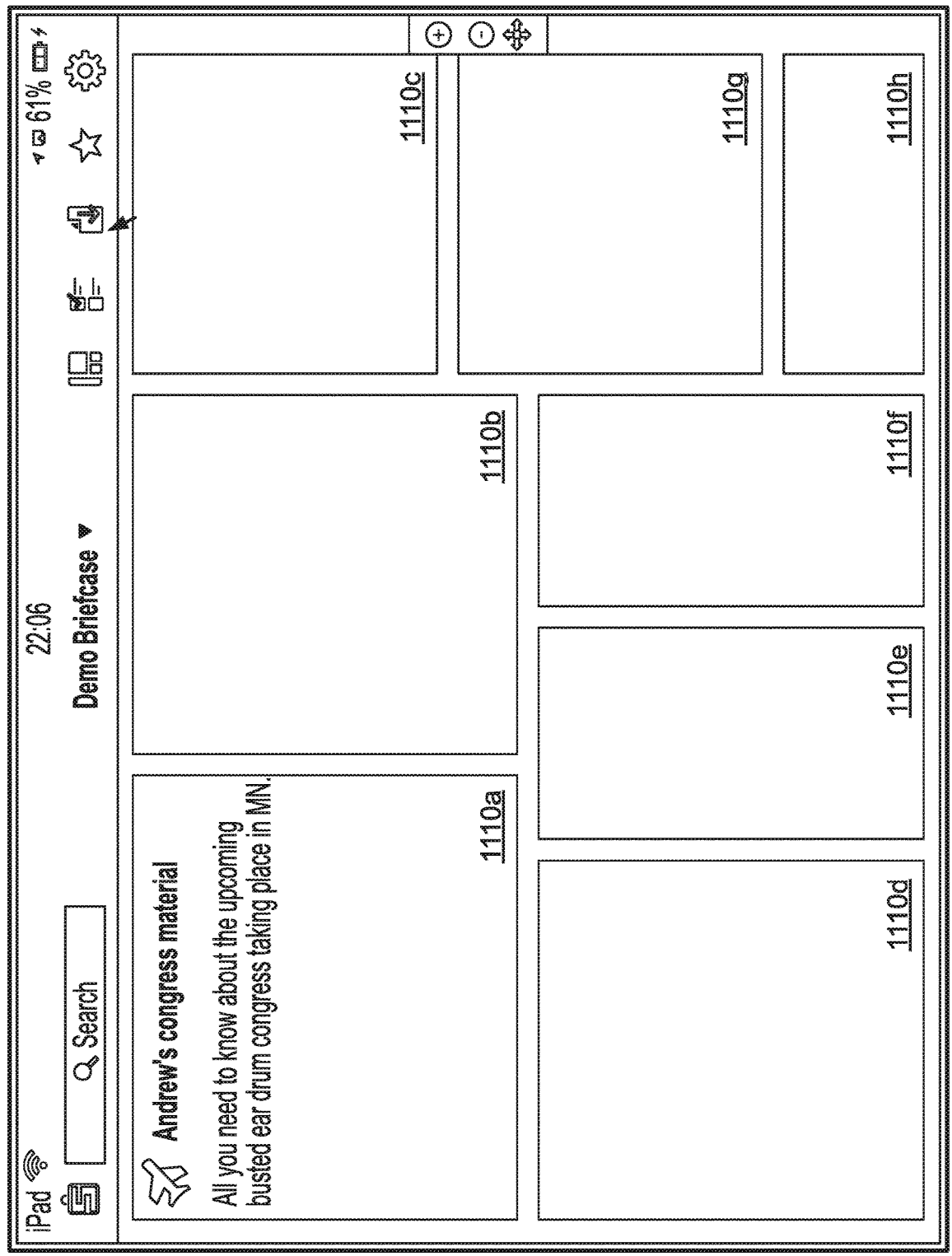
FIGS. 11-14 show navigation user interfaces as they are presented on a client device.

FIG. 11 shows the navigation user interface as it is presented on a client device 130. This example shows what a tablet client device may present after a user selects an icon to launch the application program form a home screen of the tablet. The application program that generated the display (and receives updates in the form of navigation user interfaces), may have been downloaded from an application marketplace and may not be part of the operating system. The first screen that is presented upon launching the application program may be that for a navigation user interface, such as that shown in FIG. 11 for the "Demo Briefcase." If there are no navigation user interfaces assigned to the user, then the screen may appear empty (e.g., as a gray screen).

In this example, the display presents selectable interface elements (tiles) 1110*a-h* that a user of the client device can select, which causes device navigation to respective subpages. The selectable interface elements may not be resizable or modifiable on the client devices 130*a-c*, as they may be when designed through user input at computing device 110. The tiles in this example are not fully designed, as only tile 1110*a* includes a title and a description that was specified by a user of the computing device 110.

Figure 12:
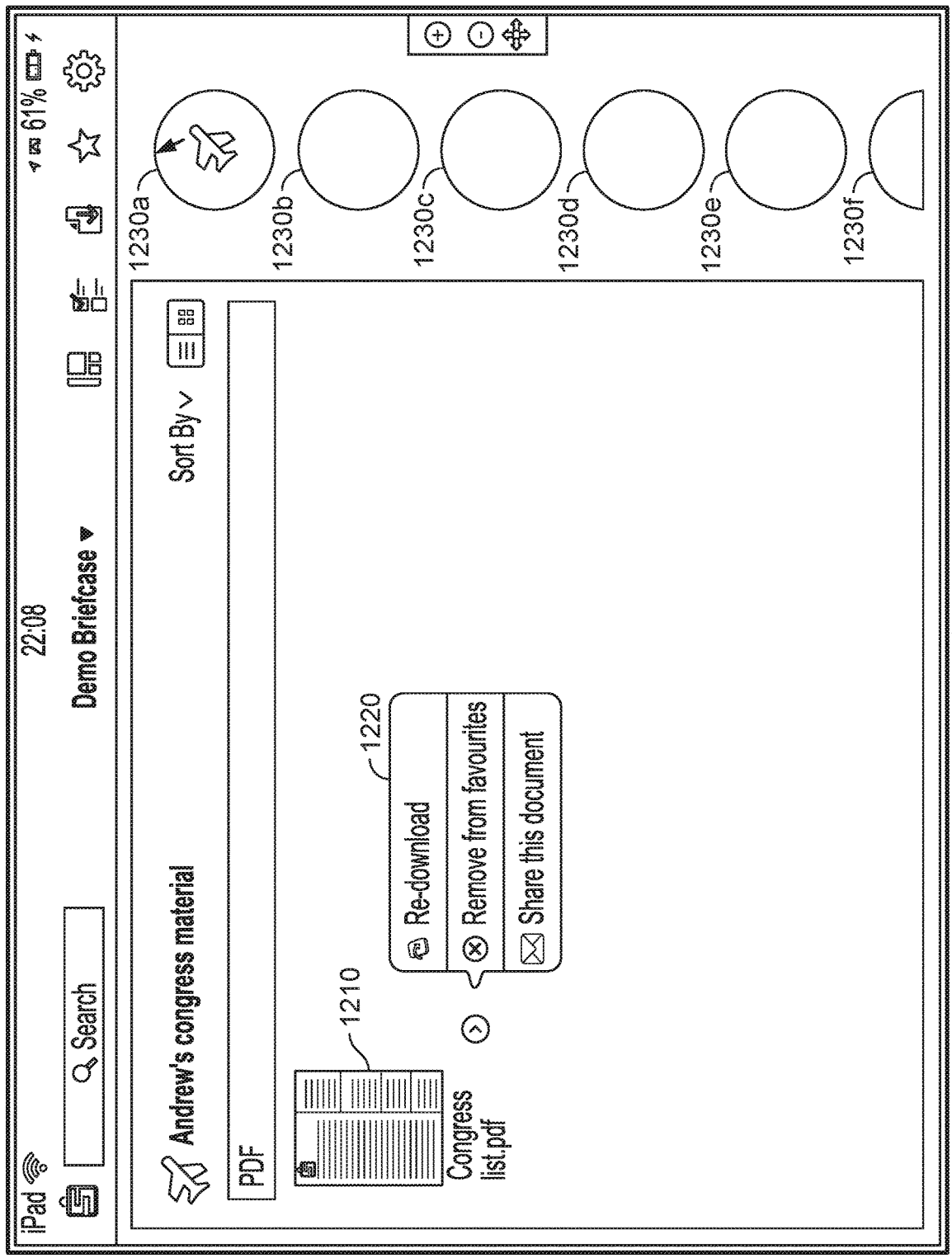

Upon user selection of tile 1110*a*, the client device may navigate to a display of a sub-page of the navigation user interface (such as that shown in FIG. 11) that shows certain assets that are assigned to that tile. For example, the user interface in FIG. 12 shows a "Congress list.pdf" file 1210 that user input can select. Upon selection of the user input, the client device may display the content of the file (e.g., the pages of the PDF) in full screen mode or substantially full-screen mode through a viewer application program. A user can also provide input to view the content of the file in its native application rather than through the viewer application program. A user can also provide input to view a list of secondary options 1220 for any given file. That list of secondary options 1220 may allow a user to re-download a file, add that file to a favorites list (or remove if already added), and share the document, for example, with email if permitted through the corresponding setting that is modifiable at the user interface that shown in FIG. 9.

The user interface that is shown in FIG. 12 may also present multiple icons 1230*a-f* that allow navigation to subpages for respective tiles 1110*a-f*. In other words, a user does not need to navigate back to the overview page for the navigation user interface (e.g., that shown in FIG. 11) to navigate to a different sub-page and view files that are accessible through interaction with that sub-page.

Figure 13:
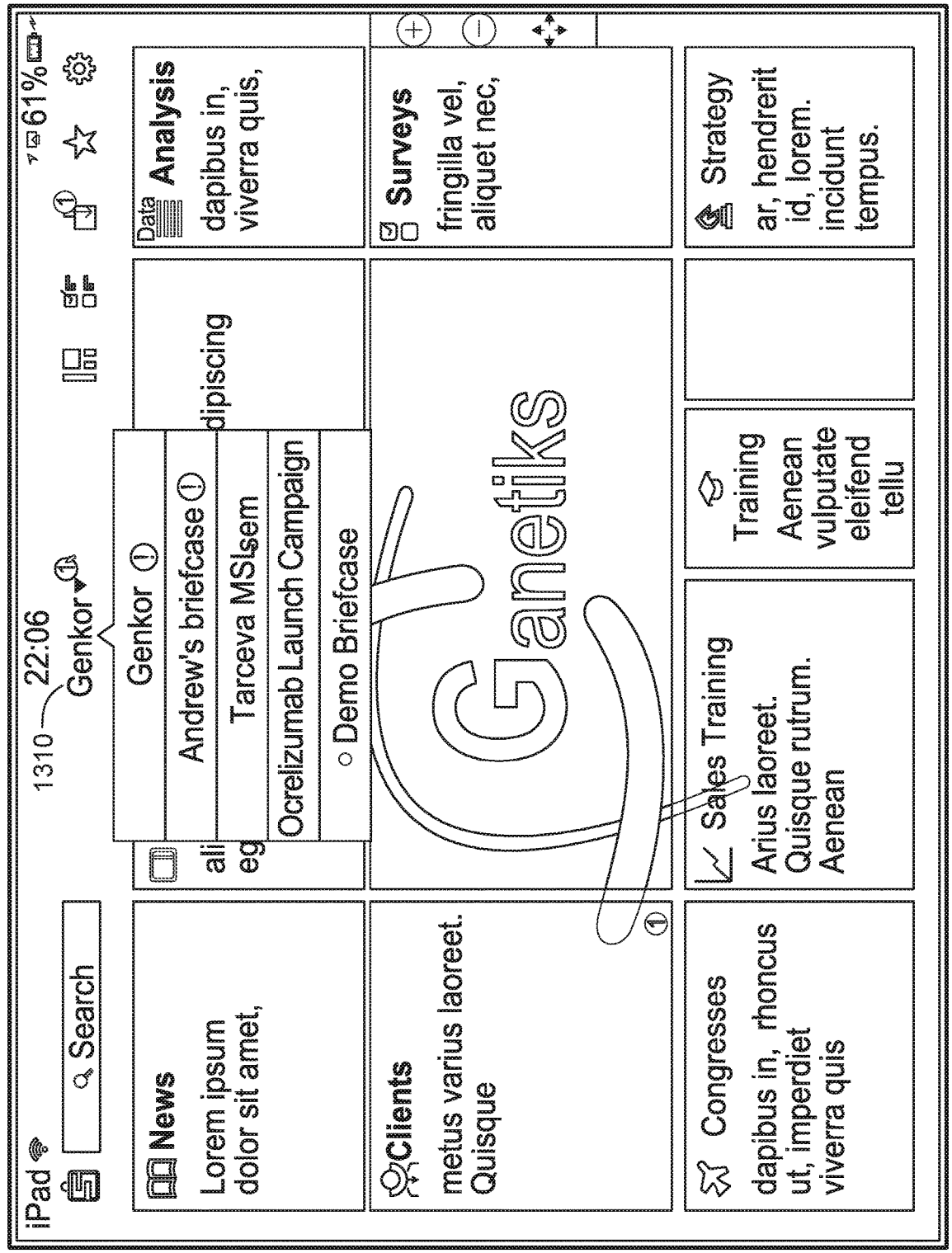

FIG. 13 shows an overview page for another navigation user interface, this one being the "Genkor" navigation user interface. A user of a client device may have navigated to this user interface through user interaction with a "Genkor" element in the navigation user interface drop-down list 1310 that is presented at the top of the display. That drop-down list 1310 may present all navigation user interfaces that have been assigned to the recipient that was associated with the client device (e.g., through interaction with the page that is shown in FIG. 10 and similar pages for other navigation user interfaces design pages).

As may be apparent, the navigation user interface that is shown in FIG. 13 includes tiles that show more content (e.g., titles and descriptions) than those in FIG. 10. Indeed, each of the tiles includes an icon at the top of the tile (typically the upper left), that was specified through user interaction with the web page shown in FIG. 8 (e.g., a dialog box that appears when a user selects to edit a tile). These tiles may be those that are shown in the icons 1230*a*-*f* that appear in FIG. 12 (and FIG. 14, to be described below).

Figure 14:
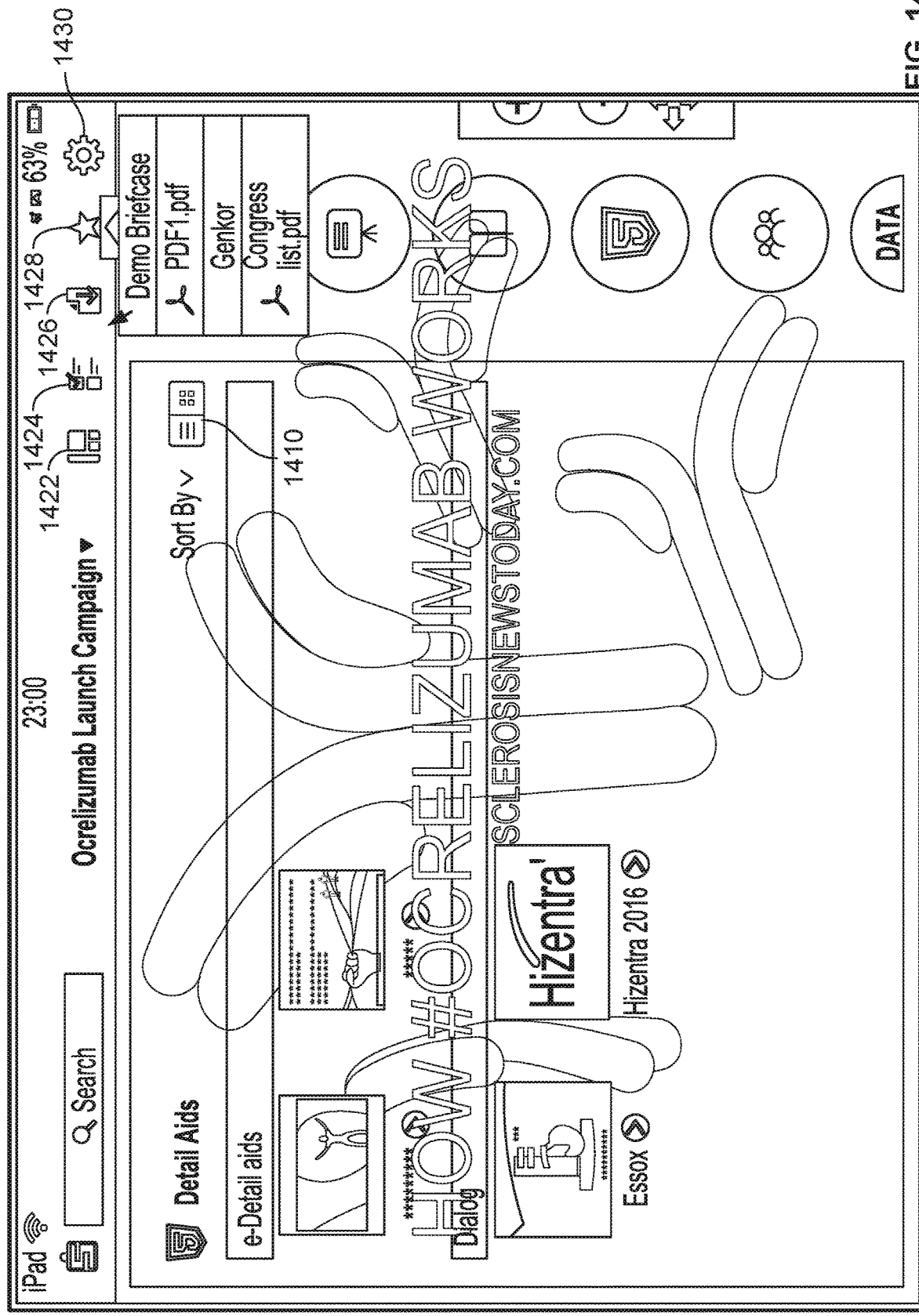

User selection of a tile (e.g., one titled "Detail Aids" which is hidden behind the drop-down list 1310, may cause user navigation to the interface that is presented in FIG. 14. This sub-page shows multiple files that are assigned to that tile, and that a user can select to view (or potentially share, if settings permit, or add or remove from "Favorites"). User input can also prompt the client device change the display from an icon view to a list view through user interaction with element 1410. The elements to the right side each include an icon that allows direct navigation to other sub pages.

At the top right of the overview page for each navigation user interface and each subpage are five selectable elements. Element 1422 is an element that toggles display between the currently-selected subpage and the overview page for the current navigation user interface. If at an overview page, selection of element 1422 may cause navigation to the last-presented subpage. Element 1424 is an element that causes a display of a list of surveys in a drop-down list upon user selection.

Element 1426 is an element that, upon user selection, causes the client device to perform a batch download of all files that are queued at the computing system 120 for download to the client device. For instance, while the client device may automatically download the latest versions of navigation user interfaces (e.g., without user input that specifically requests download of such user interfaces), the client device may not download all or some of the assets that are presented on the sub pages of each navigation user interface. To perform this download, user input may have to select element 1426, which may download all such assets that are queue for-download for the particular navigation user interface, or for all navigation user interfaces.

Element 1428, when selected, causes the client device to present a drop-down list of assets that were bookmarked, with the bookmarked assets separated with labels that identify the navigation user interface (briefcase) to which they belong. Element 1430 is an element that provides access to various settings, for example, to change a password, re-sync the client device with any updated navigation user interfaces from the network, and provide an ability to log out of a user account. In some examples, there is an additional element at the top that is hidden and that may be shown in response to a user swiping the elements 1422-1428 to the side. This additional element may provide user access to the social network screens that are discussed throughout this document.

Figure 15A:
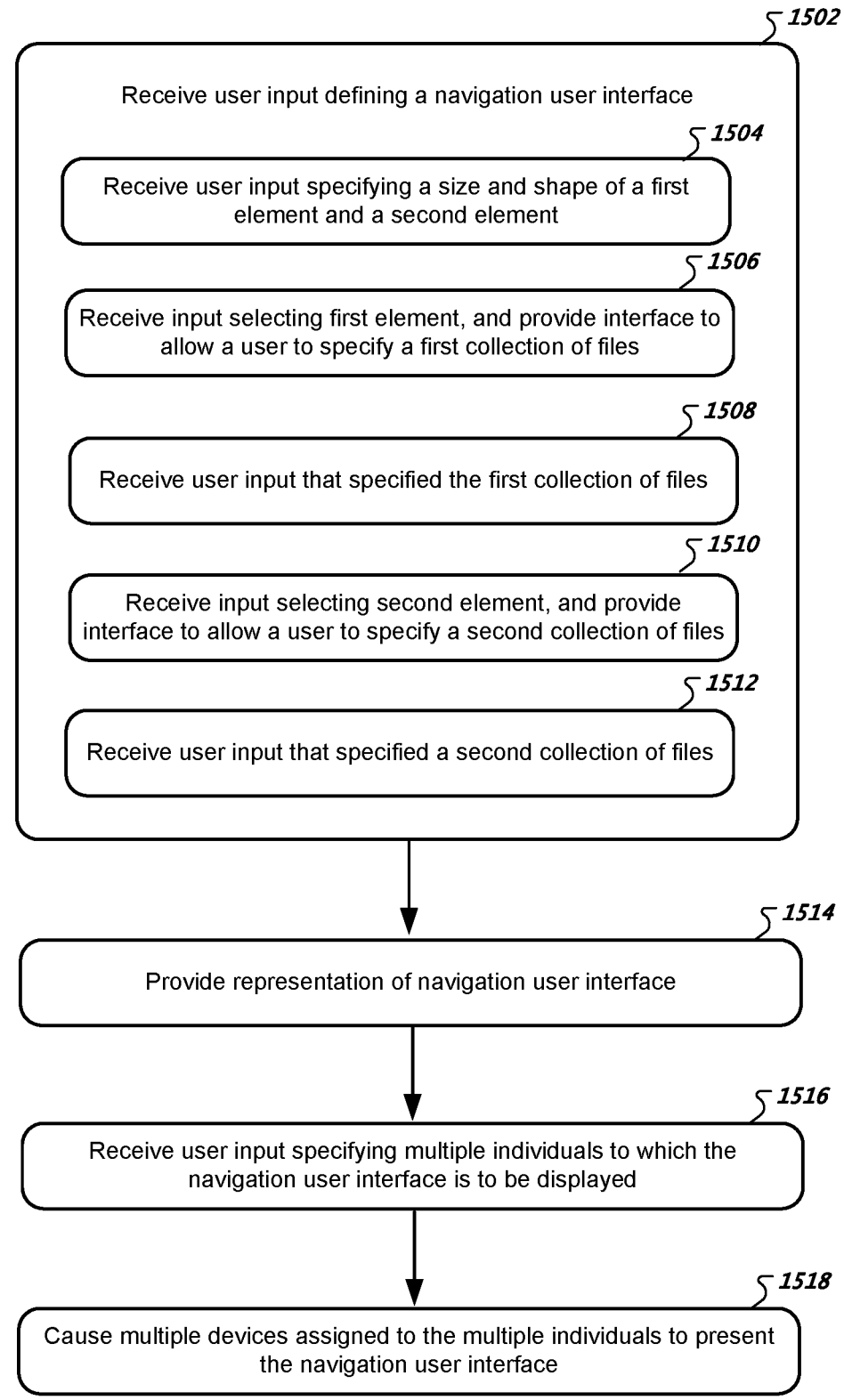
FIGS. 15A-B show a flowchart of a process for defining and providing a navigation user interface.
Figure 15B:
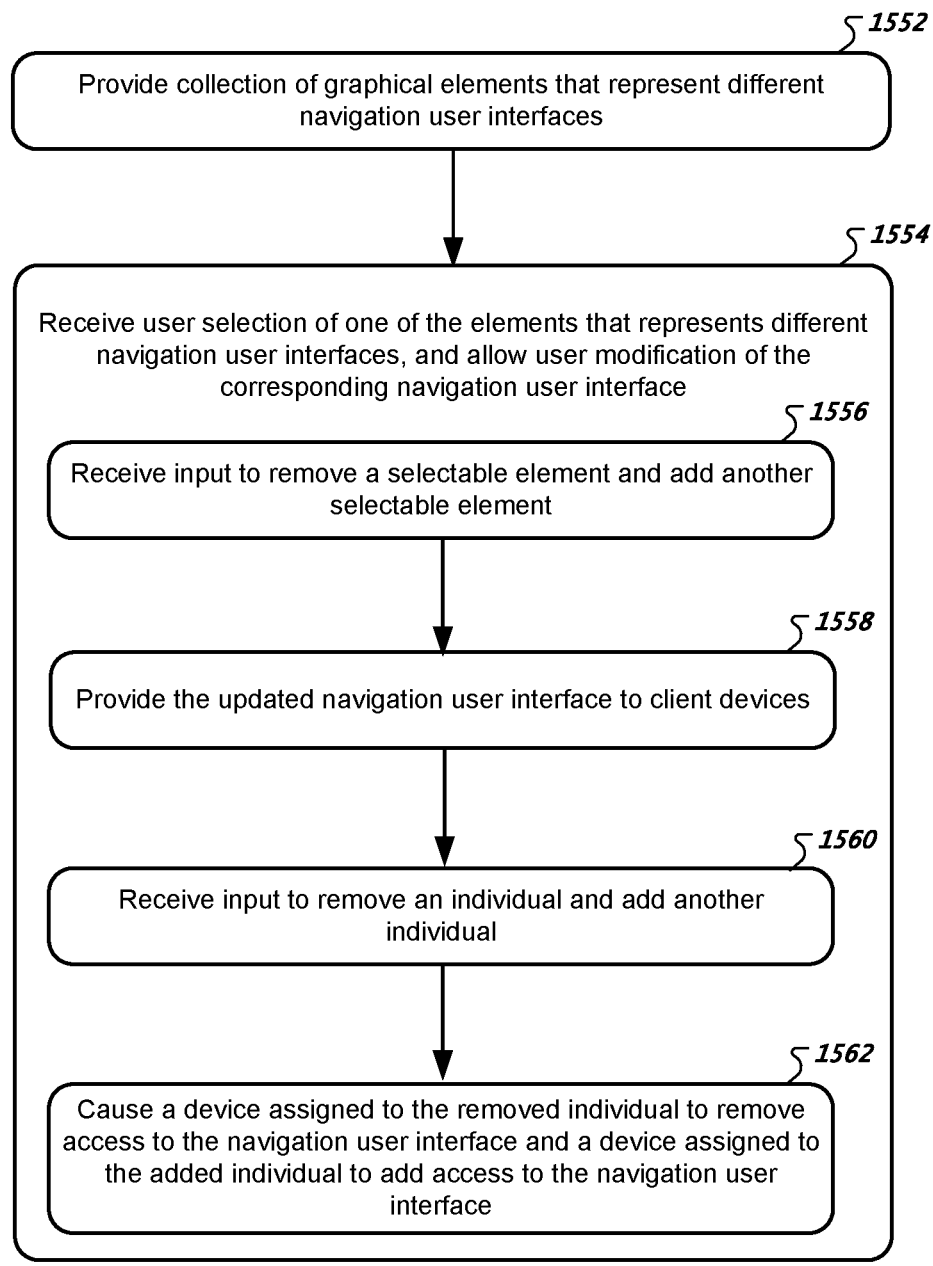

FIGS. 15A-B show a flowchart of a process for defining and providing a navigation user interface.

At box 1502, a computing device receives user input that defines a navigation user interface that is to be presented by multiple client devices. For example, the computing device 110 may define the navigation user interface through user interaction with the displays of FIGS. 8 and 9. The definition may include receiving user input that specifies a size and shape of a first selectable element and a second selectable element (box 1504). For example, a user may add the selectable elements 820*a*-*e* to the display and resize those elements, as discussed throughout this document.

Some portions of this disclosure may refer to a computing system receiving an indication that user input was provided at a computing device to perform certain actions. This disclosure may refer to the computing system 120 receiving an indication (e.g., an internet request or communication) that the user input was provided at computing device 110. Although not repeated throughout this description exhaustively, it should be understood that most or all user inputs provided at computing device 110 may cause a communication indicating that the input occurred to be provided for receipt by the computing system 120, and that most or all displays provided by the computing device 110 may be provided as a result of processing information that was provided by the computing system 120, for example, in response to user input at the computing device 110.

At box 1506, the computing device receives user input that selects a first element and in response provides an interface to allow a user to specify a first collection of files. For example, user input may select a tile that is shown in FIG. 9 in order to present the dialog box 810 that is presented in FIG. 9.

At box 1508, the computing device receives user input that specified a first collection of files that are to be accessible by a client device upon selection at that client device of an interface element. For example, the user may specify one or more files using dialog box 810 (FIG. 9) to permit those files to be presented on a client device in response to a user of the client device selecting the corresponding element (e.g., so that the assets would be presented on a subpage, such as that shown in FIG. 14, upon user selection of a tile for the subpage). At boxes 1510 and 1512, similar operations are performed for a different tile.

At box 1514, the computing device provides a representation of the navigation user interface. For example, the user interfaces that are shown in FIGS. 8 and 9 present mock-ups or representations of the navigation user interface as it may be shown on the client device, with the same number of tiles being arranged in the same way and with the same relative dimensions, color, and orientation as they are to be displayed by the client device. Moreover, the tiles may show at least the titles and corner icons that would be shown by the client device.

At box 1516, the computing device receives user input that specifies multiple individuals to which the navigation user interface is to be displayed. For example, user input may designate multiple recipients through user interaction with the user interface that is shown in FIG. 10.

At box 1518, the computing system (e.g., computing system 130, or the combination of the computing system 130 and the computing device 110) causes multiple devices assigned to the multiple individuals to present the navigation user interface. For example, upon the computing system identifying that a client device that is assigned to a user account for one of the multiple individuals is online and connected to the internet (e.g., because the client device sent a request for new content to the computing system), the computing system may provide data to the client device for generating a display of a navigation user interface. As discussed throughout this document, the data may be provided for receipt by a particular user only after a date that is specified through interaction with the FIG. 10 user interface.

At box 1552, the computing device presents a collection of graphical elements that represent different navigation user interfaces. For example, a web browser at client device 110 may present the interface shown in FIG. 6, which includes multiple interface elements 610-g that identify previously-created navigation user interfaces.

At box 1554, the computing device receives selection of a particular one of the graphical elements, which allows a user modification of the corresponding navigation user interface. For example, user input is able to add and remove selectable interface elements to the navigation user interface, add files to and remove files from the collection of files for any of the tiles, and add individuals to and remove individuals from the individuals to which the navigation user interface is to be displayed (e.g., through user interaction with the interfaces that are presented in FIGS. 7-10).

At box 1556, the computing device receives user input to remove a selectable element (e.g., a tile) and add another selectable element (e.g. another tile). For example, assuming that the navigation user interface that is presented in FIG. 8 was complete, a user may remove one tile and add one or more tiles in its place.

At box 1558, the computing system provides the updated navigation user interface to client devices. For example, the computing system 120 may receive indications of the changes that a user made at the computing device 110, and may provide information for receipt by client devices 130a-c that cause the client devices 130a-c to present the updated user interface.

At box 1560, the computing system receives user input to remove an individual as a designated recipient and to add another individual as a designated recipient. For example, user input may interact with the interface that is shown in FIG. 10 to remove and add designated individuals.

At box 1562, the computing system causes a device assigned to one individual to remove access to the navigation user interface and a device assigned to another individual to add access to the navigation user interface. For example, for the individual that was removed from having access to the navigation user interface through interaction with the interface of FIG. 10, the computing system 120 may send an indication to the corresponding client device to remove access to the navigation user interface (e.g., to no longer present the name of the navigation user interface in the drop-down list 1310, shown FIG. 13). For the individual that was added to have access to the navigation user interface, the computing system may send information to the corresponding client device to cause that client device to present the name of the navigation user interface in the drop-down list 1310.

Figure 16:
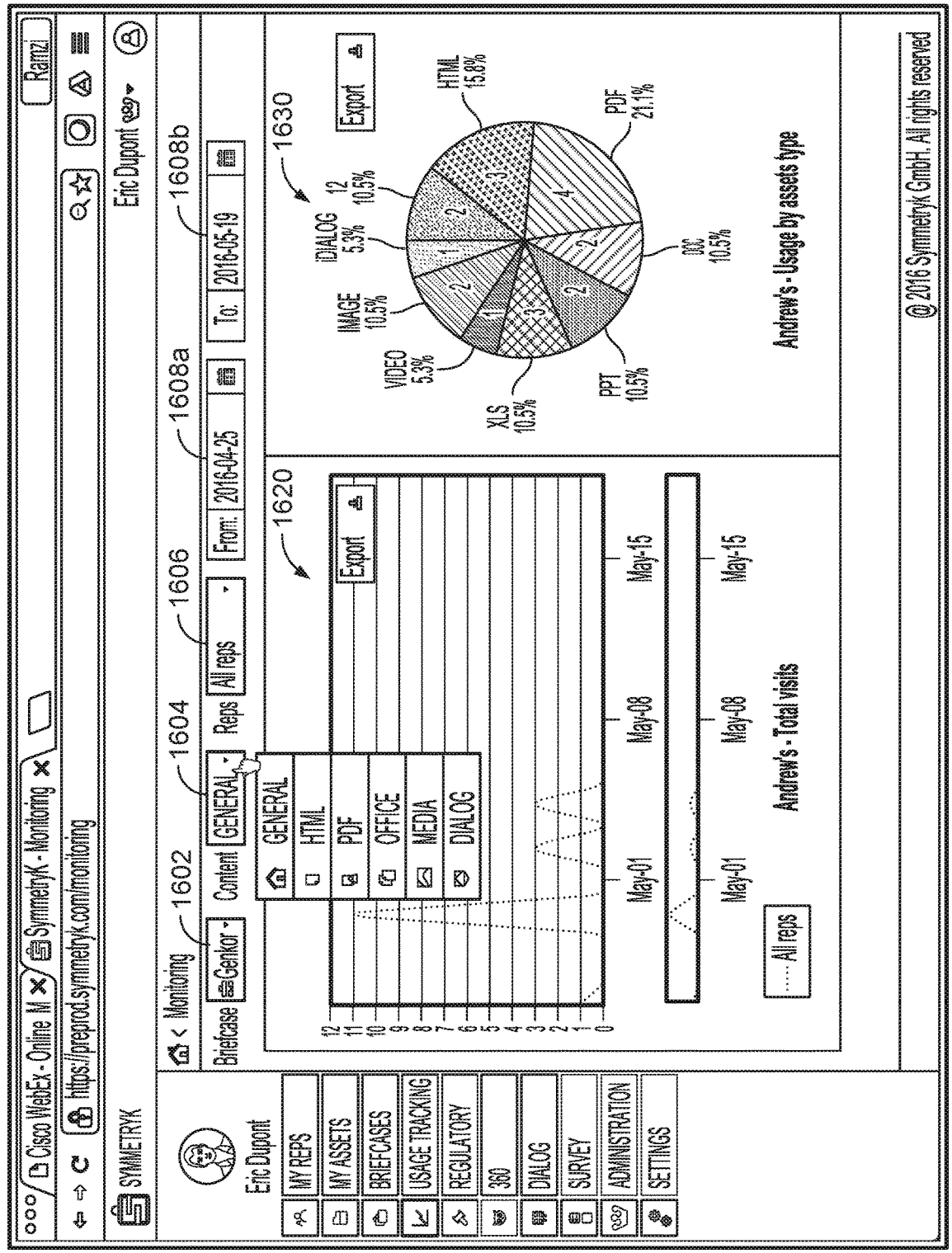
FIGS. 16-18 show user interfaces that display statistical information identifying interaction by users of client devices with certain assets or pages of assets.
Figure 17:
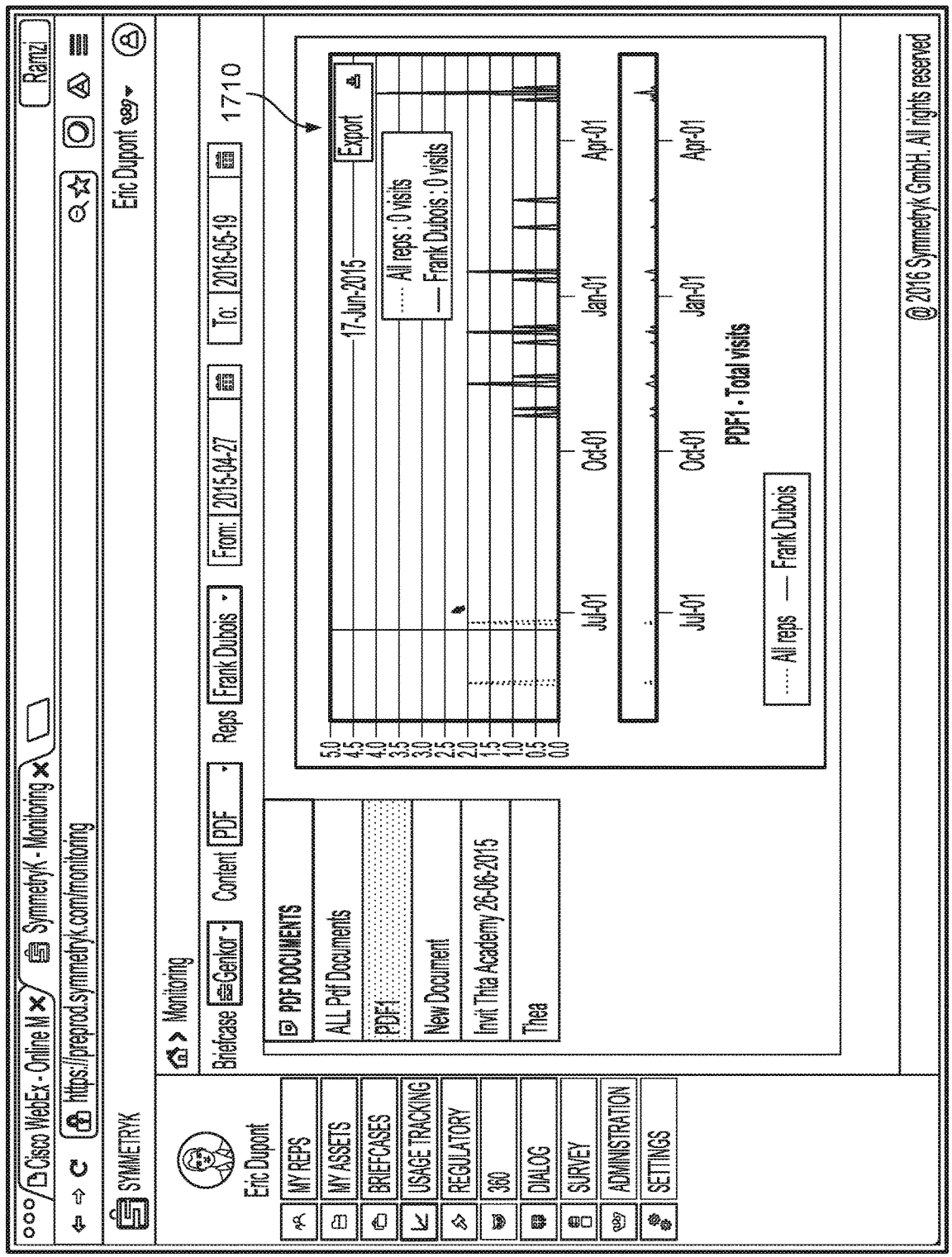
Figure 18:
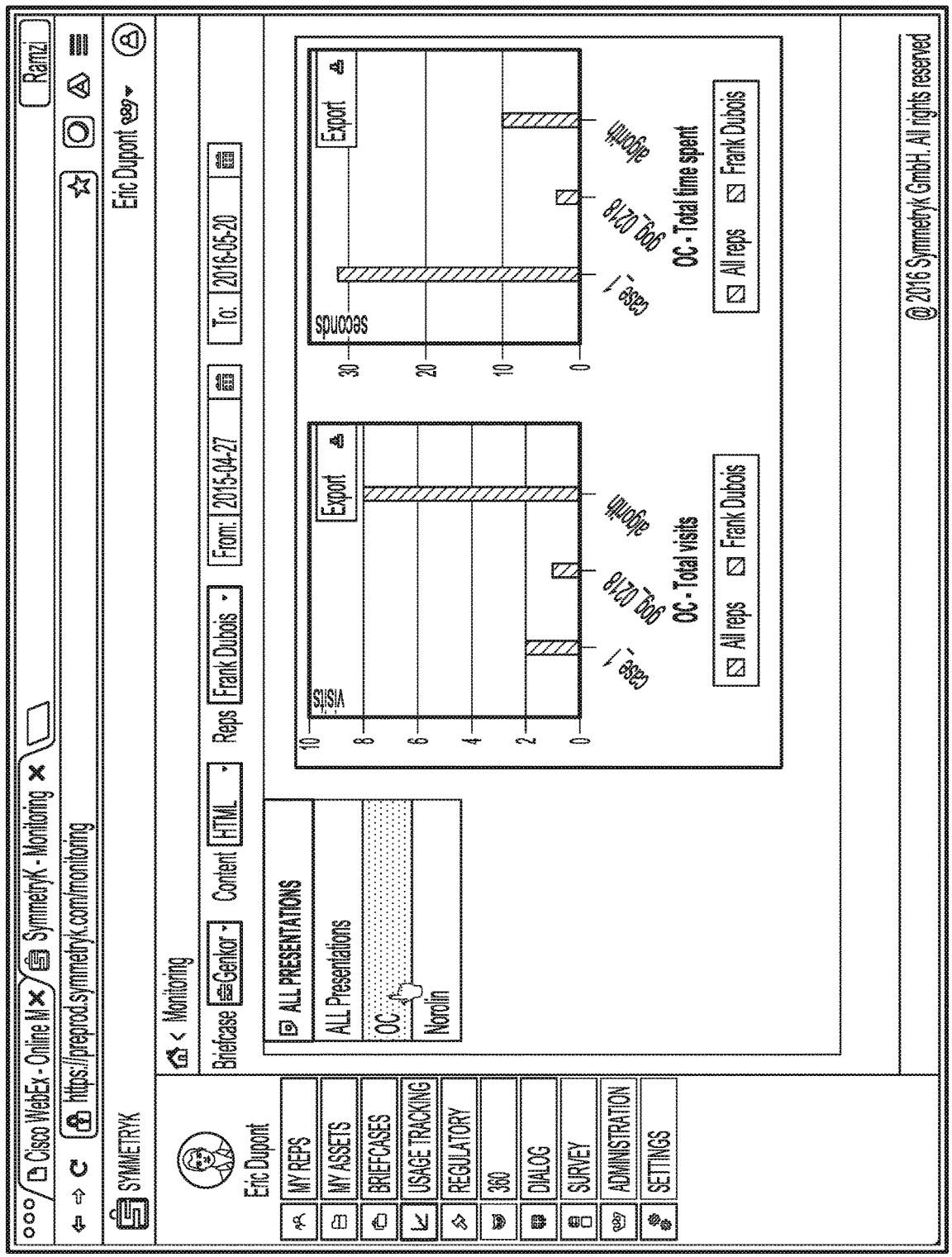

FIGS. 16-18 show user interfaces that display statistical information identifying interaction by users of client devices 130a-c with certain assets or pages of assets. These user interfaces are available through user selection of the "Usage Tracking" element from the sidebar that is presented for most pages. In FIG. 16, a user can select the navigation user interface (e.g., the "Briefcase") from pull-down element 1602; which may present a list of multiple navigation user interfaces on which to view usage statistics. In this example, "Andrew's briefcase" has been selected. A user may then select the type of asset on which to view usage statistics using the pull-down element 1604. The user may then select one of multiple representatives to which the navigation user interface is distributed using the pull-down element 1606. The user may also select a date range between an initial date and an end date using the user interface elements 1608a-b.

The result of these user selections is an identification, from a set of data that may identify all accesses of all types of assets by all representatives for all navigation user interfaces, those selections that fit the criteria specified through use of the interface elements 1602, 1604, 1606, and 1608a-b. This data can be displayed in various forms, and is presented in FIG. 16 as a line graph. 1620 that plots the number of accesses (on the vertical axis) over time (horizontal axis). In this example, it shows that sometime just before May 1, the user "Andrew" accessed general assets (e.g., all assets in some examples) 11 times, and then accessed (e.g., opened) the general assets three times on each of two days in early May. The pie chart 1630 to the right of the page shows overall usage or accesses of assets for all types.

FIG. 17 shows a user interface that is similar to that shown in FIG. 16, except that in FIG. 17 the user has selected to view statistics on PDF assets accessed by Frank Dubois using the Genkor navigation user interface. Since a particular type of asset was selected, the user may be able to select an element to identify either all PDF documents or particular PDF documents. In this example, the user has selected to view just accesses of the document "PDF1." As a result, the line chart 1710 plots accesses of that document over time.

FIG. 18 shows a user interface that is similar to that shown in FIGS. 16 and 17, except that the type of asset selected is an HTML asset. With this type of asset (and others, in various embodiments), the asset may include multiple pages and the computing device 110 may display a first bar-chart 1810 that shows a number of times each of the pages was accessed, and a second bar chart 1820 that shows a total time spent by the respective client device on each of the pages. In this example, it is apparent that although the user visited the "algorithm" page more often than the "case_1" page, the user spent more time on the "case_1" page.

Figure 19:
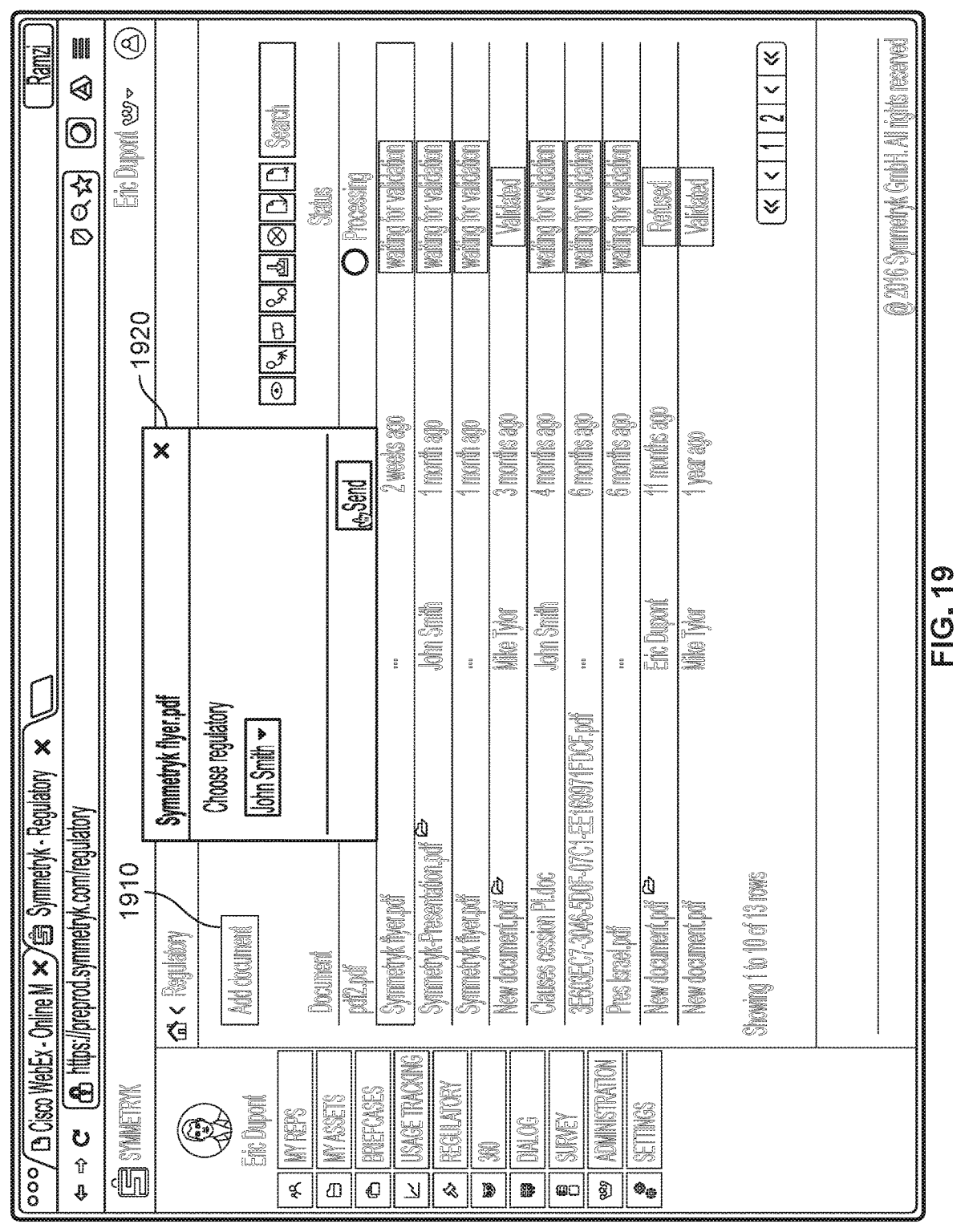

FIG. 19 shows a page at which a user can identify documents that have to be validated. In this example, a user selected the "Add document" element 1910. In response, the computing system presented a dialog box 1920 with which the user was able to identify a document. The user is then able to designate a "regulatory," or person that is to review the document to identify whether it is valid (e.g., using the dialog box 1920).

A user that is designated as a regulatory may be able to review the document and provide input to indicate that the document is either validated or refused. The user interface that is shown in FIG. 19 may indicate each document that the particular user has added (along with potentially other users of the same organization), along with an interface element for each document that indicates whether the document is "Waiting for validation," is "Validated," or is "Rejected." Those documents that are validated may be made available for inclusion in the list of assets (see FIG. 5).

Figure 20:
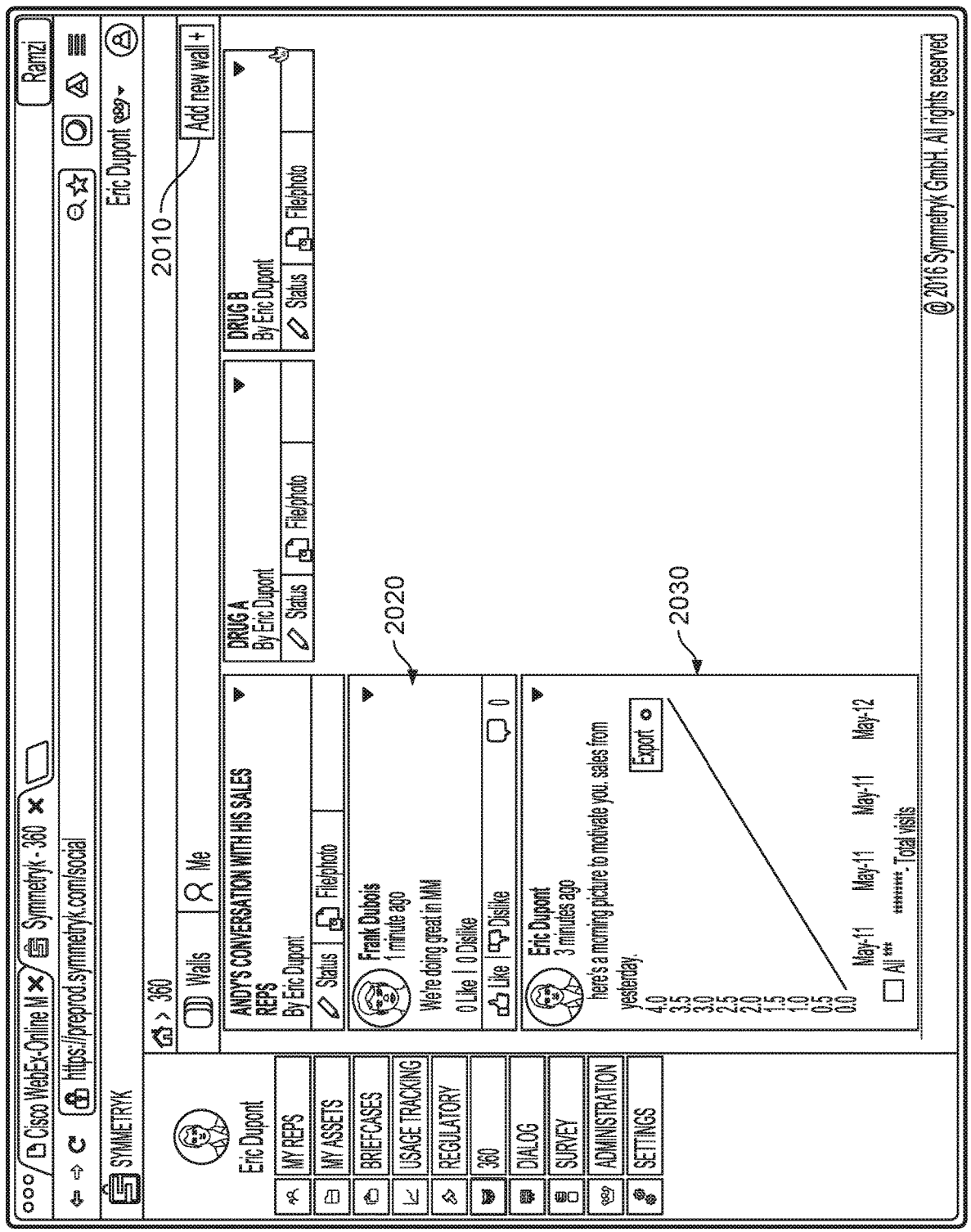
FIG. 20 shows a user interface with which a user at computing device is able to create a social network page.

FIG. 20 shows a user interface with which a user at computing device 110 is able to create a social network page. This example includes three vertical "walls." Each wall may include a stream of zero or more social network posts. The user of the computing device may create a new wall by selecting the "Add new wall +" element 2010. In response, the computing system may add a new wall (a fourth wall in this example). The user may provide input to change a name for the wall, and the wall may indicate the user that created the wall (here Eric Dupont). The user may also add a status post to the wall or a picture. In this example, the wall "Andy's conversation with his sales reps" includes a status update post 2020 that states "We're doing great in MM" and a photo post 2030 that states "here's a morning picture to motivate you. Sales from yesterday." The web page that is shown in FIG. 20 may indicate how many users have liked and disliked certain posts, along with any comments on the posts. The user may provide input to specify which representatives are to be shown which walls. In other words, some walls may only go to certain representatives, so that a representative may see a subset of the walls.

Figure 21:
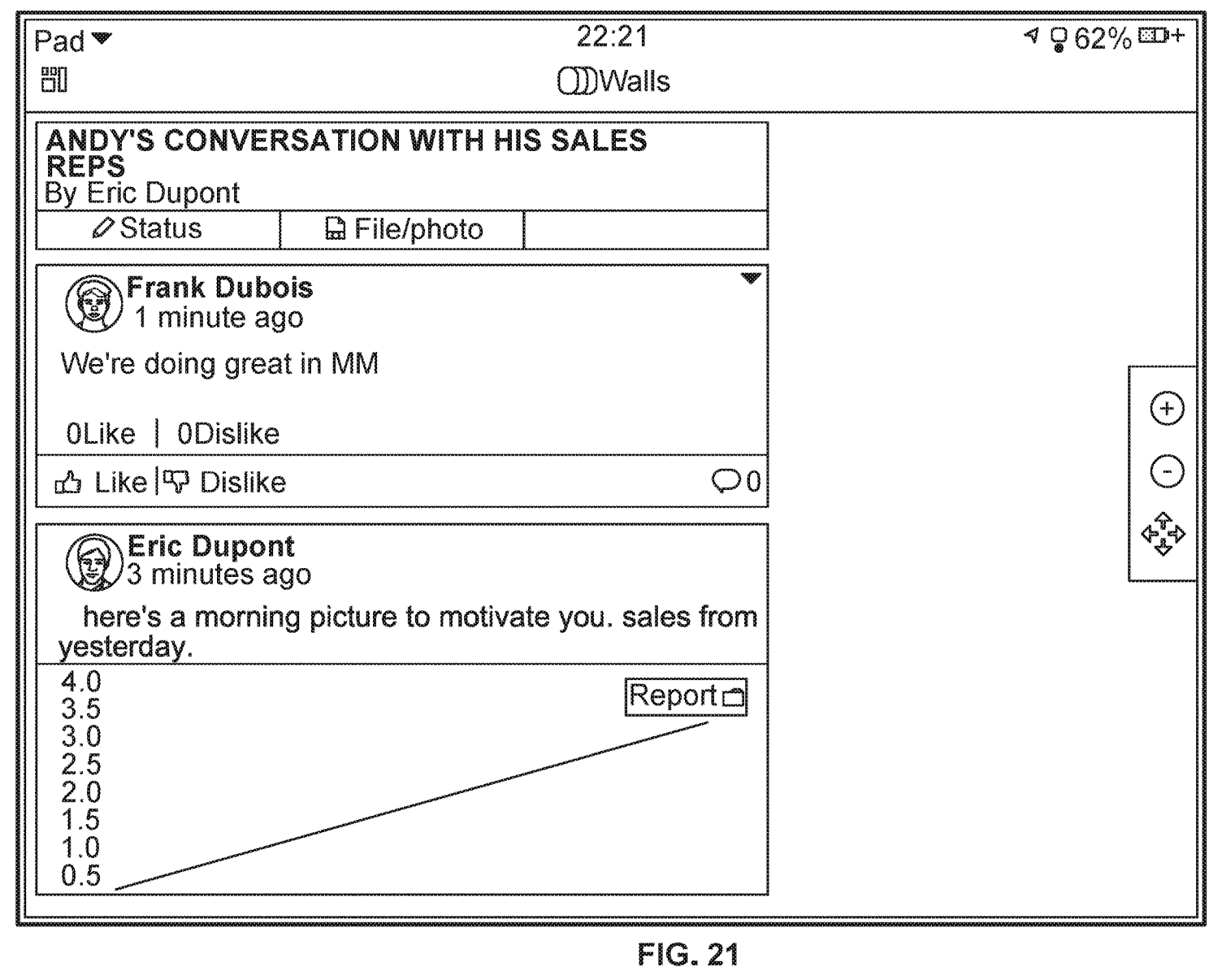

FIG. 21 shows how the social network user interface appears on the client devices (e.g., client devices 130a-c). The user interface that is shown in FIG. 21 may appear as a result of a user selecting an icon at the top of the user interface for a client device (e.g., an icon that appears to the right of icons 1422-1430 in FIG. 14). This user interface only shows a single wall, for example, because the system may not display walls that include no posts, or because the other walls may not have been designated for presentation to the user of the client device.

Figure 22:
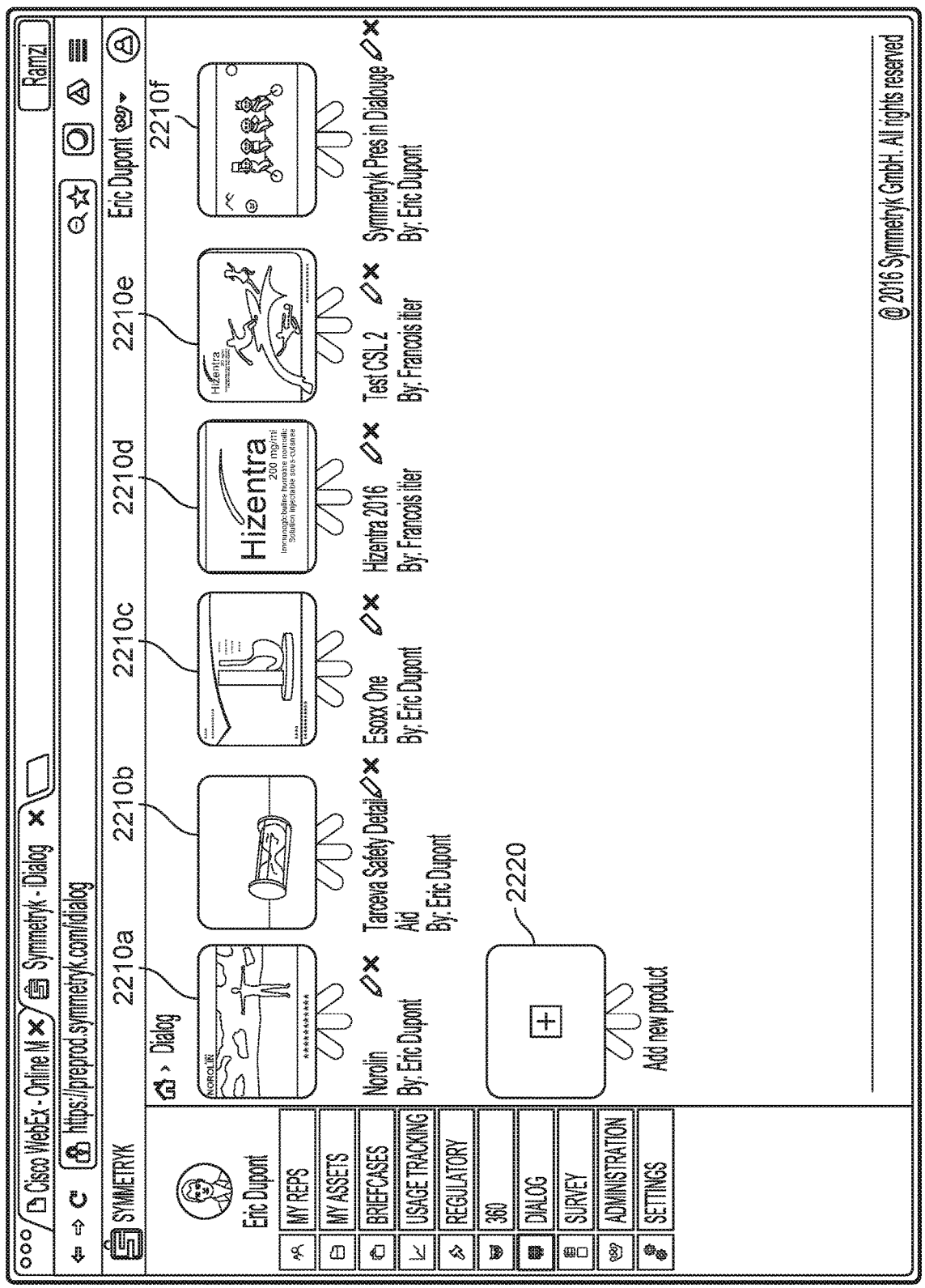

FIG. 22 shows a user interface from which to make a presentation-creation product. This feature is referred to as "Dialog" in the screenshots, and generally provides an ability to create a set of assets and slides from which presentations can be made, and to enable the creation of presentations from those slides. FIG. 22 shows a user interface that includes multiple graphical elements 2210a-f that represent multiple such presentation-creation products. The user interface also includes a graphical element 2220 that a user can select to create a new presentation-creation product.

Figure 23:
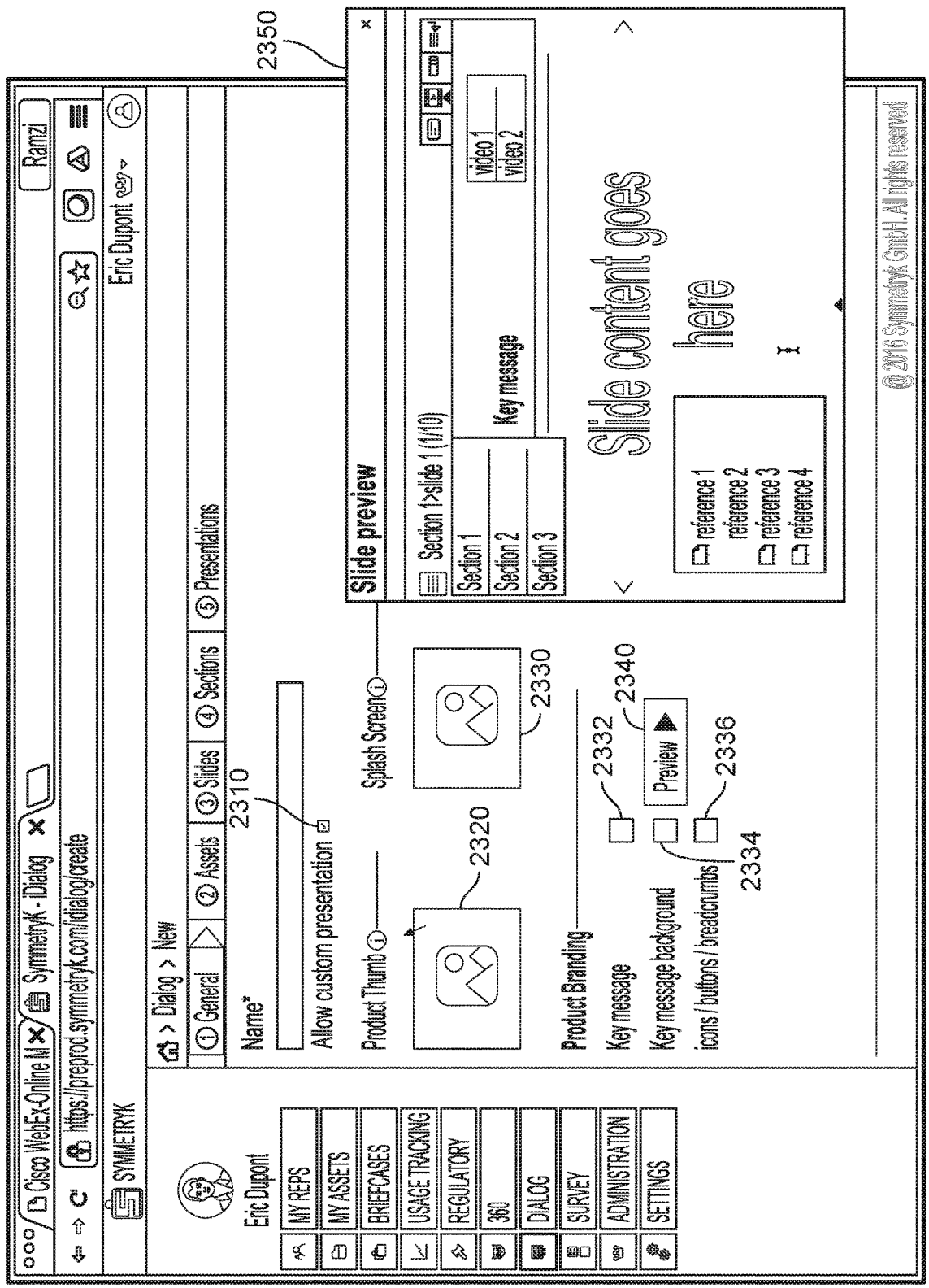

FIG. 23 shows a user interface from which a user defines general characteristics for a presentation-creation product. In this example, a user is able to select a checkbox element 2310 to specify whether users of client devices are allowed to create custom presentations from the collection of slides that are specified for the presentation-creation product (described later in this document). The user can also select a product thumbnail and a splash screen by selecting respective elements 2320 and 2330. The user can select the various template colors for the key message, the key message background, and the icons/buttons/breadcrumbs using the elements 2332, 2334, and 2336, respectively. Upon selection of any one of those items, a color map may appear that allows the user to select the color for the respective items of the slide templates. Upon user selection of the preview element 2340, the slide preview screen 2350 is presented, which shows the template for the slide with the user-specified colors for the respective features.

Figure 24:
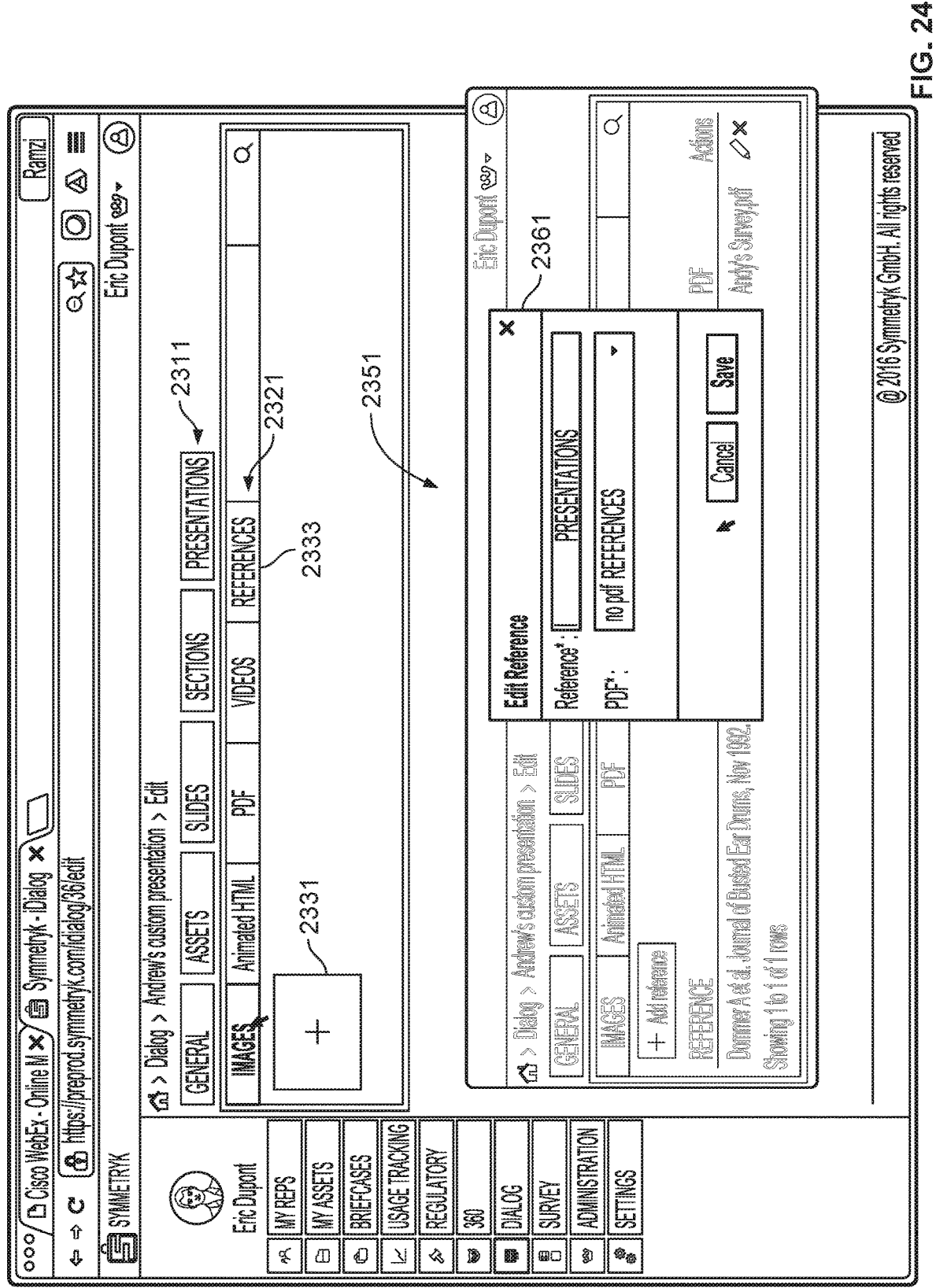

A user may select the "Assets" element from the bar of elements 2311 at the top of the page to navigate to the user interface that is presented in FIG. 24. At this interface, a user may add one or more images, animated HTML documents, PDF documents, videos, and references, by selecting the respective element from the bar of elements 2321 and then selecting an add new asset element (e.g., such as element 2331). In response to selection of element 2331, the user may be able to select an element that was included in the list of assets specified in the user interface of FIG. 5.

The middle portion of FIG. 24 includes a cutout 2351 that shows the user interface that is presented upon selection of the references element 2333. This interface shows that a user has already specified a single reference called "Dommer A et al. Journal of Busted Ear Drums, November 1982." A user has also selected the "Add reference" element, and in response the computing device has presented the dialog box 2361. Through user interaction with this dialog box, a user is able to specify a name for the reference in a text filed, and can specify an optional additional asset (e.g., a PDF file) that is to be presented when the reference is selected upon presentation on a slide.

Figure 25:
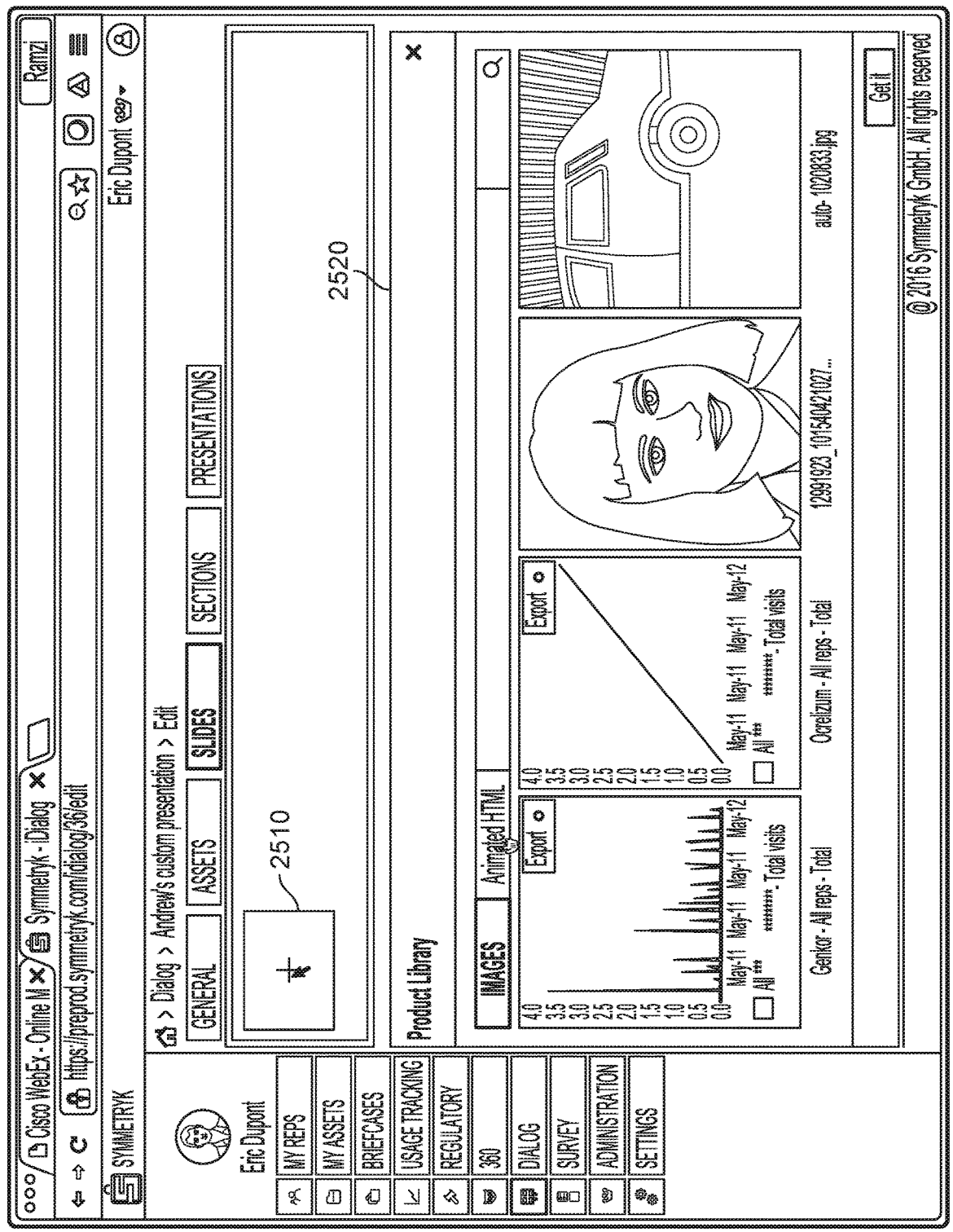

FIG. 25 shows an interface from which a user may view the slides that have been created for a particular presentation-creation product, and may create new slides for such a process. In this illustration, slides have yet to be created, but user input has selected the new slides element 2510. In response, the computing device has presented the dialog box 2520, from which a user is able to select any of multiple images or animated HTML files to display as the backdrop to a slide. The images and animated HTML files that are presented in the dialog box 2520 may be limited to those that were specified in the assets user interface of FIG. 24.

Figure 26:
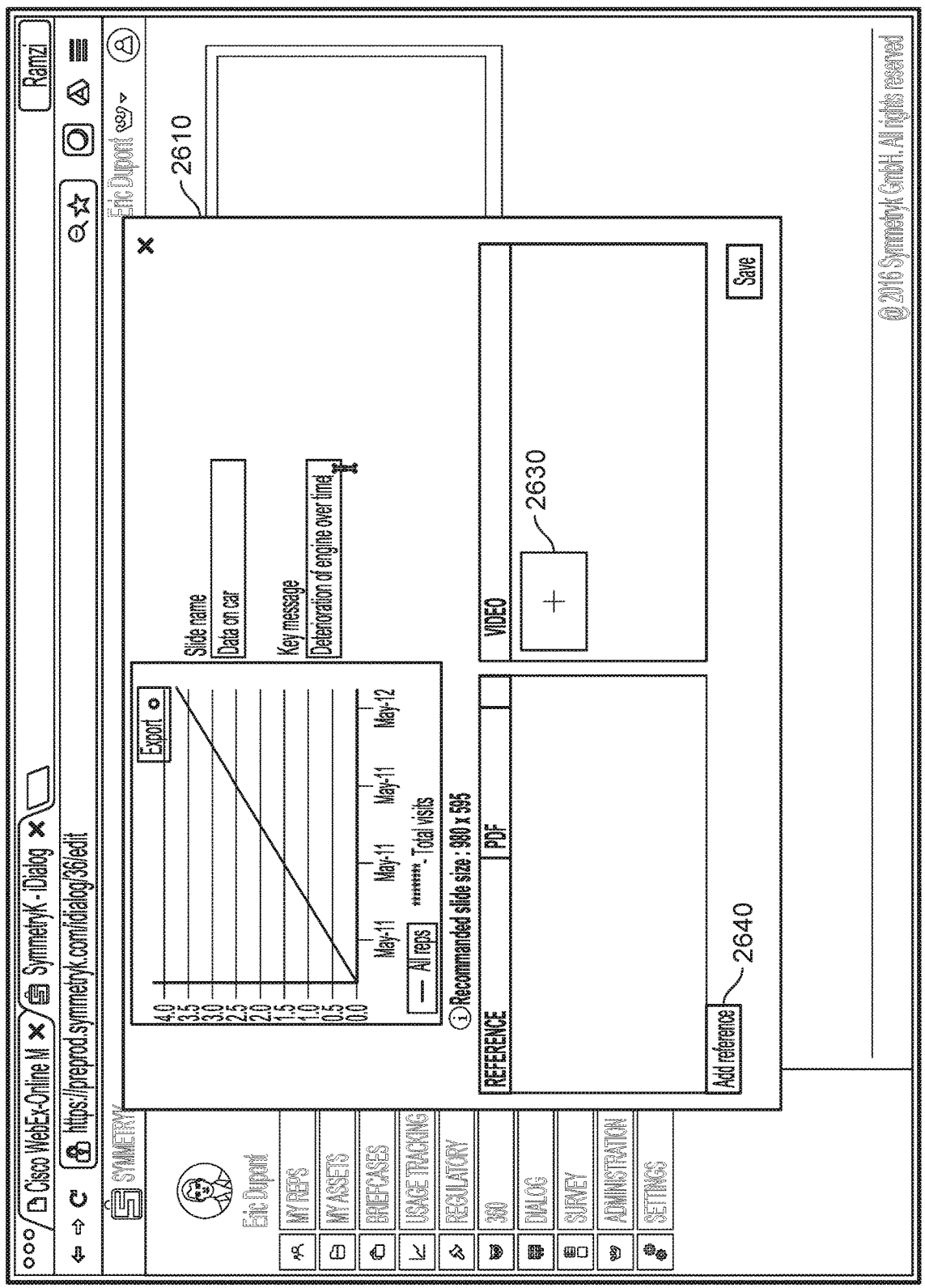

The computing device may next present the dialog box 2610 that is shown in FIG. 26. Through user interaction with this interface, a user is able to add a video (e.g., by selecting the element 2620) or a new reference (e.g., by selecting the element 2630). The videos and references from which a user is able to select to be presented as part of a slide may be those specified in the assets user interface of FIG. 24.

Figure 27:
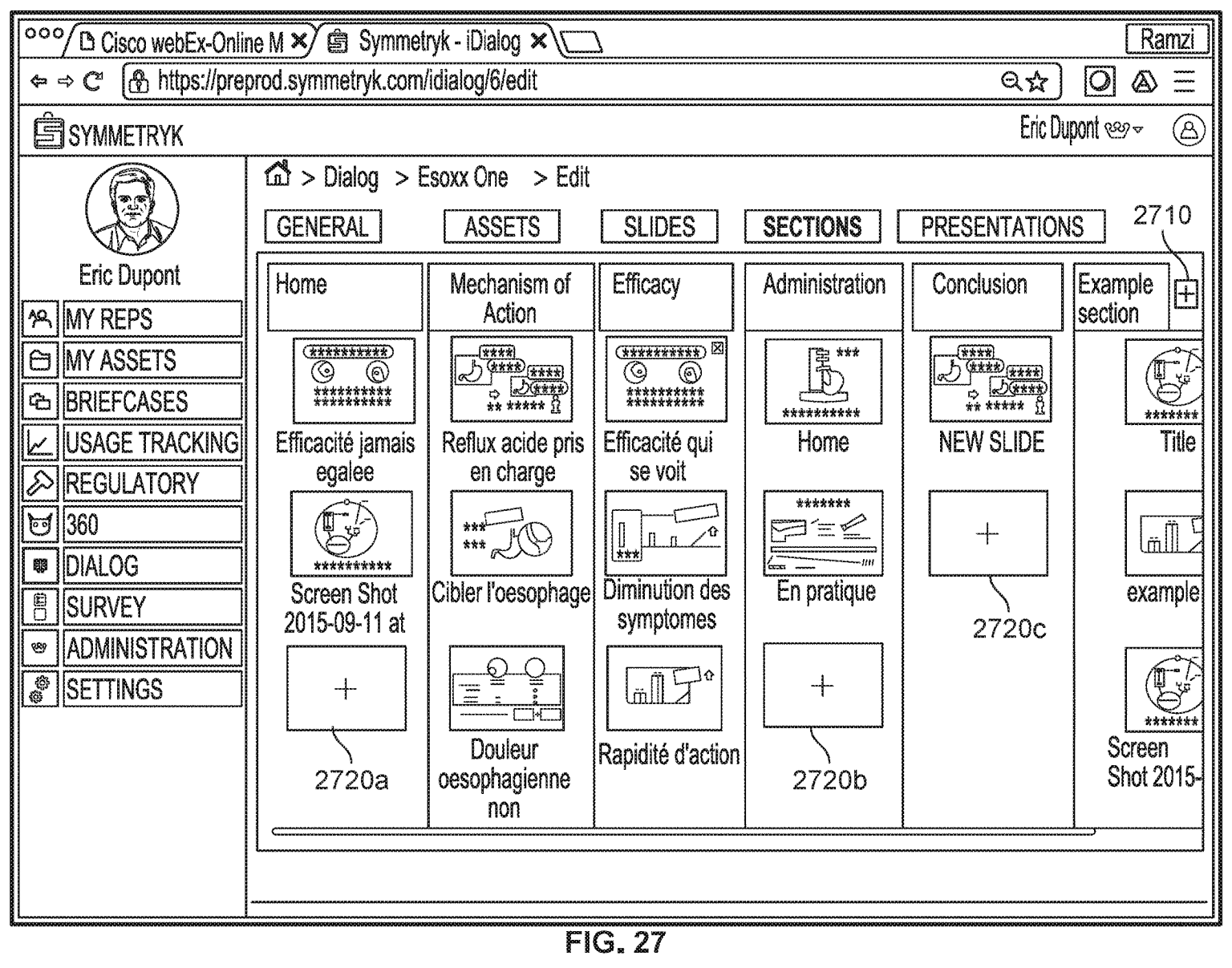

FIG. 27 shows a "Sections" user interface page for a particular, presentation-creation product. With this interface, a user may create a "section" for slides, and add one or more slides to any given section. For example, a user may select the "+" element 2710 to create a new section and then may assign a name to the section. Each section may include a different "+" element (e.g., element 2720a-c), and user input may select such an element to cause a dialog box to appear, from which a user can select any of the slides that were created and are presented in the slides user interface (see FIG. 26).

Figure 28:
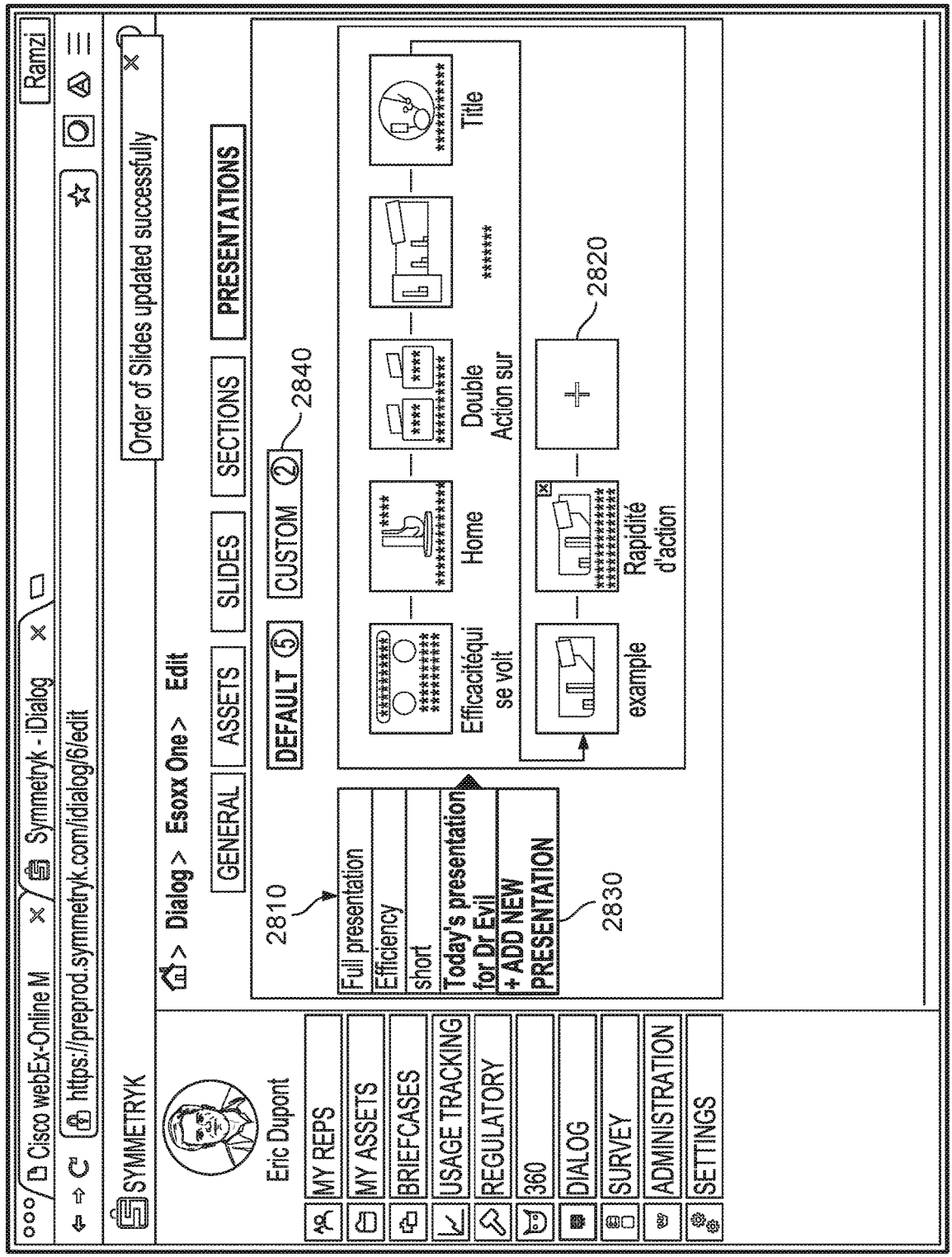

FIG. 28 shows a presentations user interface with which a user is able to view presentations that have been created for a particular presentation-creation product, and is able to create a new presentation. In this example, the user has provided input to select the presentation "Today's presentation for Dr. Evil" from the list 2810 of presentations. That presentation includes seven slides, that are to be presented in the order illustrated on the page (e.g., from left to right in the top row, and then down to the next row). The computing device may receive user input that drags and drops the slides into different orders, and may receive user input selecting the element 2820 to add a new slide to the presentation. The newly-added slide may be selectable from among a presentation of slides, as they are presented in the slides user interface (FIG. 25) or the sections user interface (FIG. 26).

Alternatively or additionally, a user may select the "Add new presentation" element 2830 to create a new presentation. The user may be able to provide input to specify a name for the new presentation and input to identify a collection of slides to comprise the presentation. A user may also select the "Custom" element 2840 to view a list of custom presentation that were created on client devices 130a-c rather than on computing device 110, as described in, additional detail below.

Figure 29:
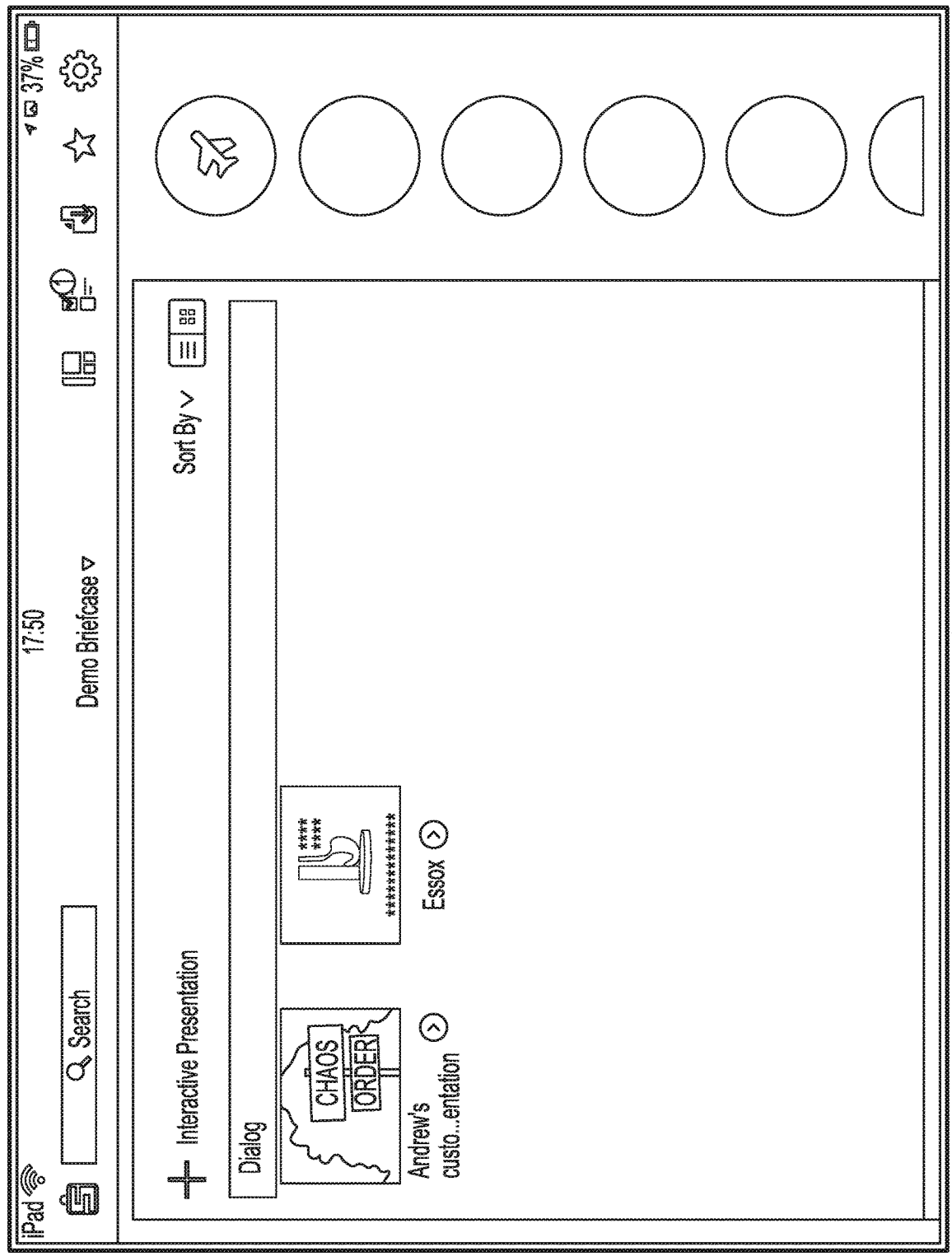
Figure 30:
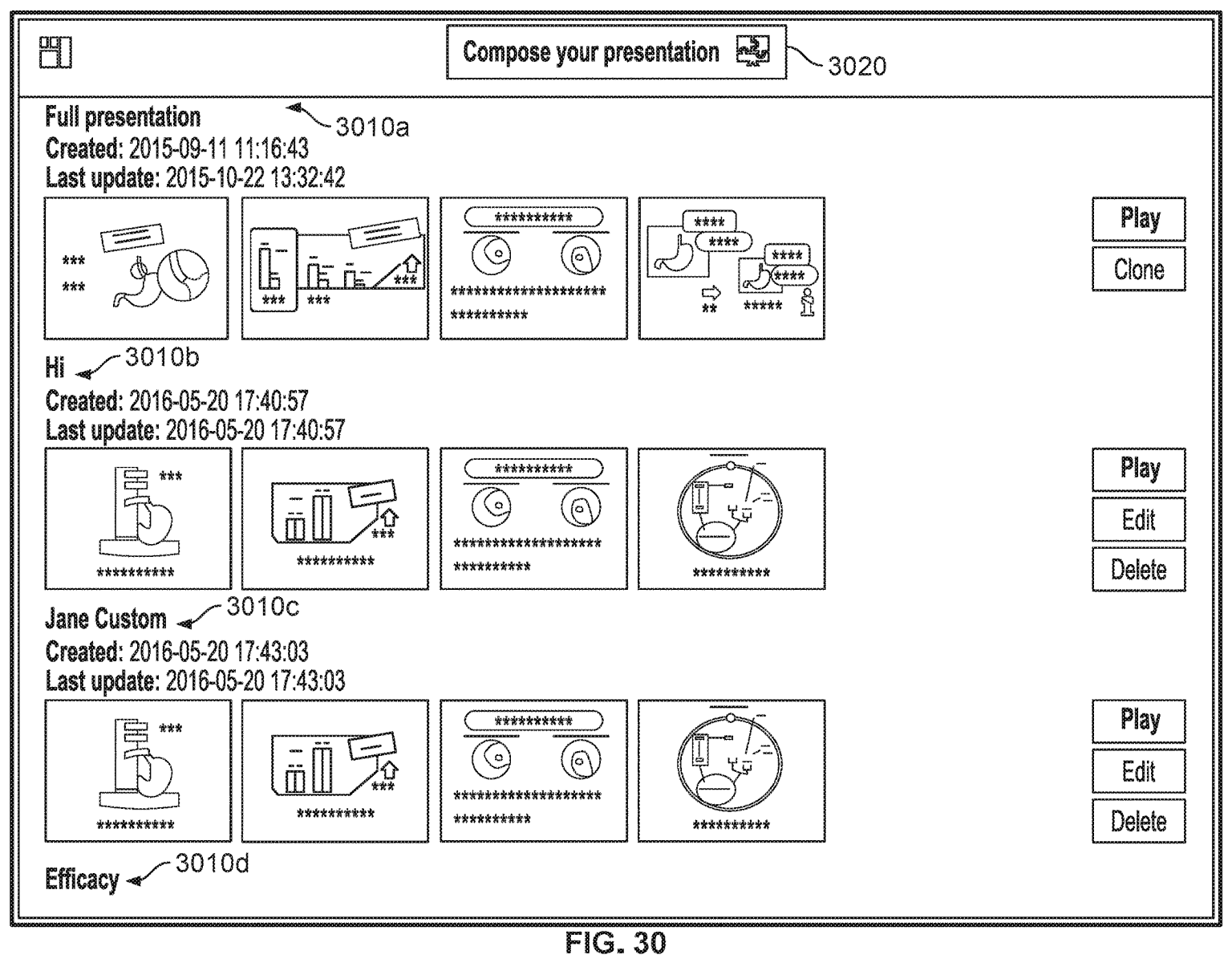

A user may add a presentation-creation product to the list of assets (see FIG. 3), and may be added to a tile-as an asset that is to be presented on the subpage for that tile FIG. 29 shows one such sub-page, which shows two presentation-creation products, including a presentation titled "Essox." User selection of the graphical element for the Essox presentation may cause the client device to navigate to the display that is presented in FIG. 30.

FIG. 30 shows a user interface that presents multiple presentations created for a particular presentation-creation product. In this example, the user interface presents at least four presentations 3010a-d, entitled "Full presentation," "Hi," "Jane Custom," and "Efficacy." Each presentation is shown with its creation date, its last update, and at least some of the slides from the presentation. A user may provide input to play the presentation through user selection of a "Play" element. A user can edit a presentation (e.g., by adding or removing slides, or changing an order of slides) by selecting an "Edit" element. A user can delete a presentation from display on their client device by selecting a "Delete" element.

Figure 31:
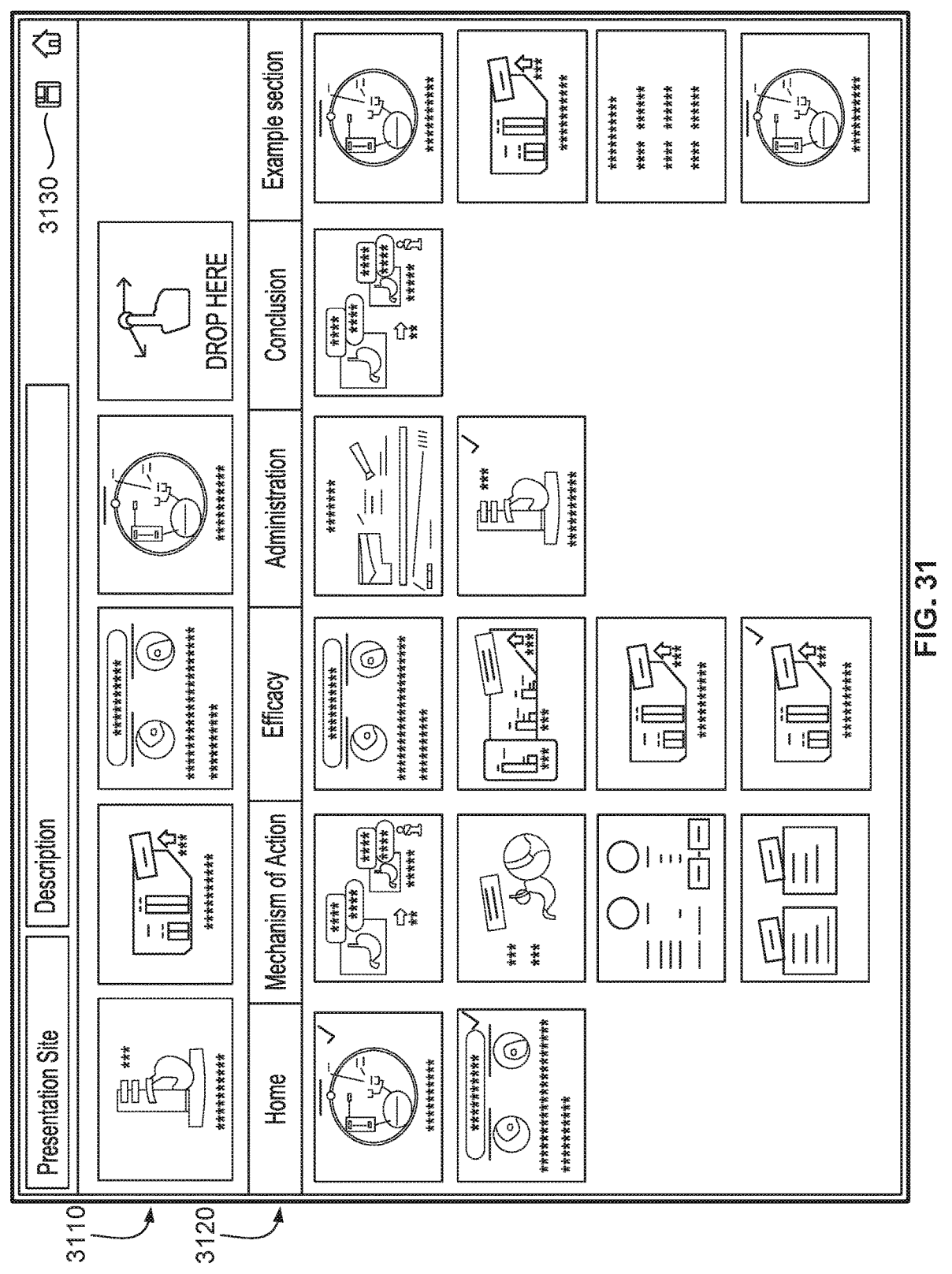

FIG. 31 shows a user interface for creating a presentation using a client device. This user interface may appear in response to receiving user input that selected the "Compose your presentation" element 3020 in FIG. 30. The user interface may first appear with certain slides already included at the top region 3110 of the page. This region may specify which slides are to be included in the custom presentation, end some of the slides may be mandatory, due to user selection of an element that indicates that the slide is mandatory when creating the slide (e.g., through user interaction a "mandatory" element presented by the user interface of FIG. 25 or 26). The bottom portion 3120 of the page includes multiple section headers (e.g., "Home" and "Mechanism" pf action) with the slides that are assigned to that section shown below that respective section header. A user can select a slide from the bottom portion 3120 and drag it to the top portion 3110 to add it to the custom presentation. Upon adding a slide to the presentation, the slide may appear checked in the bottom portion 3120. A user may also add a presentation title and description by selecting text boxes at the top of the page and entering appropriate text. A user can save the presentation by selecting the save element 3130. Upon saving, the custom presentation may appear in the list of presentations that are shown in FIG. 30, and the custom presentation (or data from which the presentation can be generated) is transmitted for receipt by the computing system 120, and the custom presentation is displayed in the list of custom presentations that are accessible through the user interface of FIG. 28.

Figure 32:
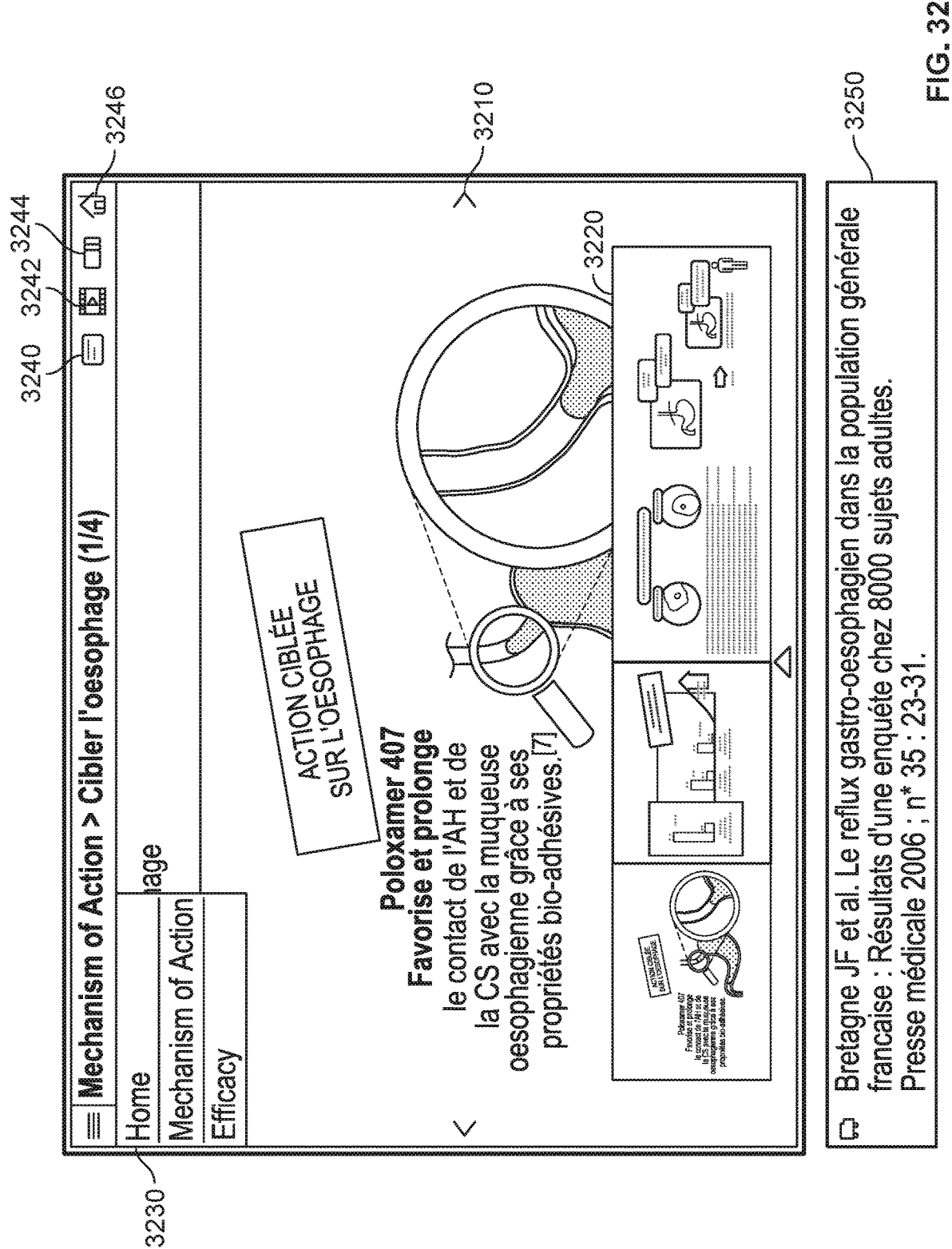

FIG. 32 shows a playing of a presentation. In this example, a user has provided input to play the "Full presentation" 3010a through interaction with, the user interface that is shown in FIG. 30. A user may navigate from one page to another in this presentation, in the order defined by user input when the presentation was made, for example, by selecting a back user interface element (not shown in FIG. 31 because the slide is the first slide), or a forward user interface element 3210. User contact with a bottom of the display (e.g., a triangle icon at the bottom or a sliding input that starts at the bottom and swipes toward the middle) may cause the computing device to present the slide preview dialog box 3220. This dialog box may include a graphical preview of each of the slides, and may allow a user to select a corresponding preview to cause navigation to that slide. As such, a user may view the slides that are in the presentation and quickly jump to a desired slide.

A user may also filter the slides to show only slides that are assigned to a particular section by selecting a graphical element at the top left of the page to cause presentation of the sections list 3230, which is populated with the title of each section of slides. User selection of an element in the sections list 3230 that identifies a particular section may cause the client device to show only the slides from that selected section. If a slide from another section is being presented, the client device may switch to the first slide from the selected section that appears in the list. Regardless, the slide preview dialog box 3220 may still present all slides from the presentation.

User selection of reference element 3240 may cause the bottom of the display to present any one or more references that were previously assigned to that slide. The reference may appear in a reference dialog box 3250 at the bottom of the slide (in this example it is shown below the presentation of the slide because dialog box 3220 is already being presented, for illustrative purposes).

User selection of the movie element 3242 may cause the client device to overlay the presentation of the slide with a movie that was previously assigned to the slide. User selection of the backup slide element 3244 may cause the client device to overlay the presentation of the slide with a presentation of a backup slide that was assigned to the slide. User selection of the home element 3248 may cause user navigation to either the overview page of the respective navigation user interface or the subpage to which the presentation-creation product is assigned.

Figure 33A:
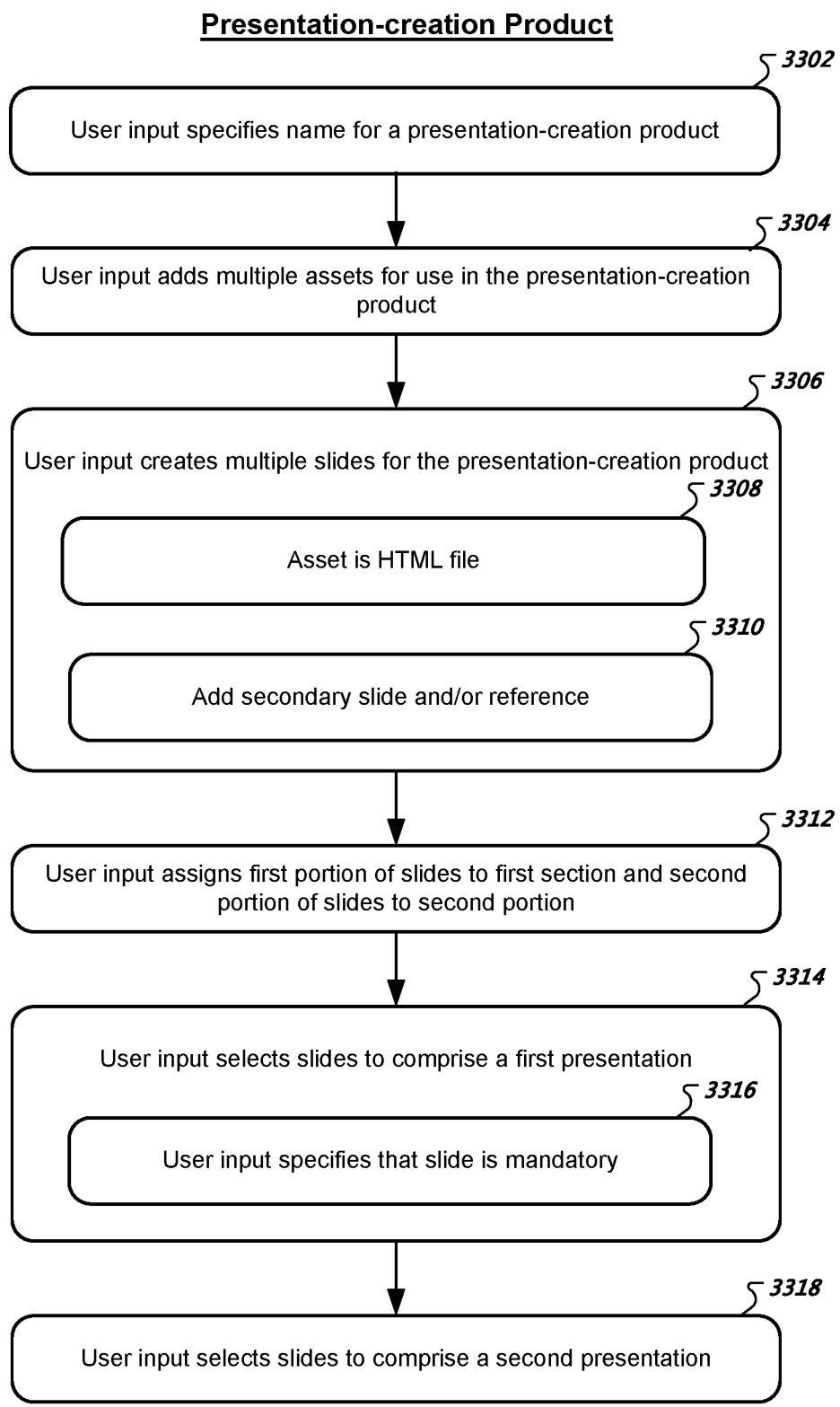
FIGS. 33A-B show flowcharts of a process for creating and using a presentation-creation product.
Figure 33B:
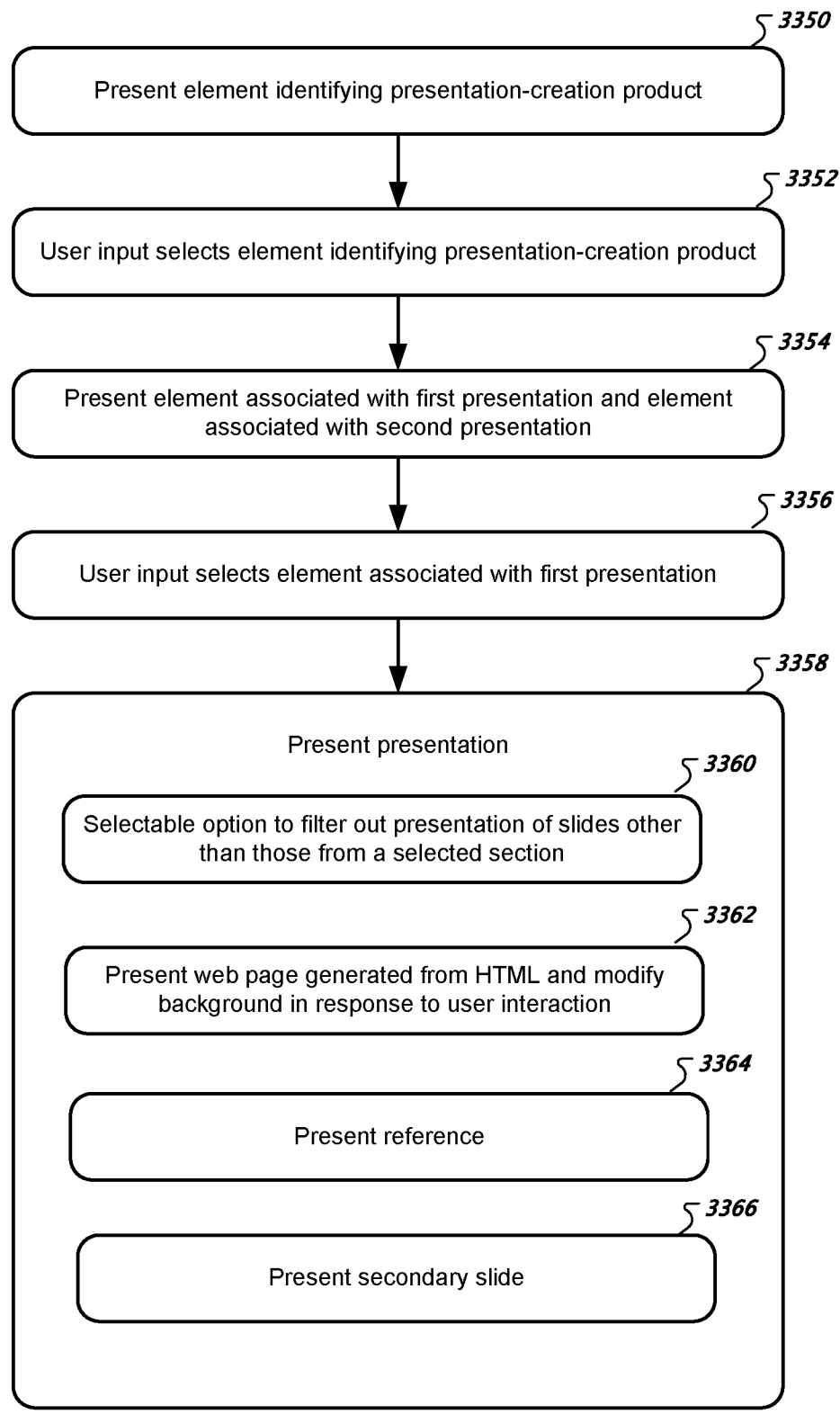

FIGS. 33A-B show flowcharts of a process for creating and using a presentation-creation product.

At box 3302, a computing device (e.g., device 110) receives user input that specifies a name for a first presentation-creation product. For example, user input may interact with the display of FIG. 23 to provide a name for a presentation-creation product. As described throughout this document, indications of actions that are performed by the computing device 110 may be provided to computing system 120. As such, portions of this disclosure may refer to the computing system receiving an indication that the first computing device received user input to specify a name for the presentation-creation product.

At box 3304, the computing device receives user input that adds multiple assets for use in the presentation-creation product. For example, user input may add images, HTML files, PDFs, videos, and references through interaction with the user interfaces that are shown in FIG. 24 and described therewith.

At box 3306, the computing device receives user input that creates multiple slides for the presentation-creation product. For example, user input may interact with the user interfaces in FIGS. 25 and 26 to add an image to the slide (e.g., as a background or main content of the slide), or an HTML file for the slide (box 3308). If the content is an HTML file, that HTML file may be rendered by a web browser rendering engine at the client device when the slide is displayed by the client device and the HTML file may be interactive, such that user interaction with links and buttons on the web page may cause the display to navigate to another page, all while staying on the same slide with the same list of references and other assets that are associated with the slide.

At box 3310, user input adds a secondary slide and/or a reference to the slide. For example, through user interaction with element 2640 (FIG. 26), the user may add a reference to the slide. Through user interaction with the same user interface (or another user interface) a user may add a slide that is considered a backup slide and that is shown overlaid its parent slide upon user selection at a client device of an appropriate interface element.

At box 3312, user input assigns a first portion of slides to a first section and a second portion of slides to a second section. For example, user interaction with the interface that is shown in FIG. 27 can assign various slides to various sections, and create new sections. Slides may be assigned to more than one section in some examples.

At box 3314, user input selects slides to comprise a first presentation. For example, user interaction with the interface that is shown in FIG. 28 assigns slides to existing or new presentations, and can arrange an order of those slides.

At box 3316, user input can specify that a slide is mandatory. The user input may be provided when the slide is created or when that slide is later edited (e.g., through interaction with the interfaces shown in FIGS. 25 and 26).

At box 3318, user input selects slides to comprise a second presentation, similar to what was done at box 3314 but for a different presentation.

At box 3350, a client device presents an element identifying a presentation-creation product. For example, the client device 330e may present the graphical element that previews the "Essox" presentation-creation product in the user interface of FIG. 29.

At box 3352, the client device receives user input that selects an element identifying a presentation-creation product. For example, user input at the client device 330a may select the "Essox" presentation-creation product element.

At box 3354, the client device, in response, presents elements associated with a first presentation and a second presentation that belong to the presentation-creation product. For example, the client-device may present the interface of FIG. 30, which shows elements that are associated with at least four different presentations.

At box 3356, user input selects the element that is associated with the first presentation. For example, user input may select the title, slide representation, or "Play" elements for the "Full presentation."

At box 3358, the client device presents the selected presentation. For example, the client device 330 may present the user interface that is illustrated in FIG. 32. Through interaction with this user interface, a user is able to filter out presentation of slides other than those from a selected section (box 3360), for example, by selecting a section from menu 3230 to cause the main display to cause navigation through only slides in that section (e.g., even though only the first, fifth, and sixth slides may be from a section, after filtering, those slides may appear first, second, and third in order, with no other slides being navigable through the previous and next elements).

In some examples, the slide may present its background as a web page that was generated from an HTML file rather than an image (box 3362). The background may modify in response to user interaction with the HTML file that, for example, selects a link that causes navigation to another web page.

In some examples, the slide may present a reference (box 3364). For example, the reference 3250 (FIG. 32) may appear in response to user selection of element 3240.

In some examples, the slide may present a secondary slide (box 3366). For example, the secondary slide may appear over a majority or all of the slide that is shown in FIG. 32 in response to user selection of element 3244.

Figure 34A:
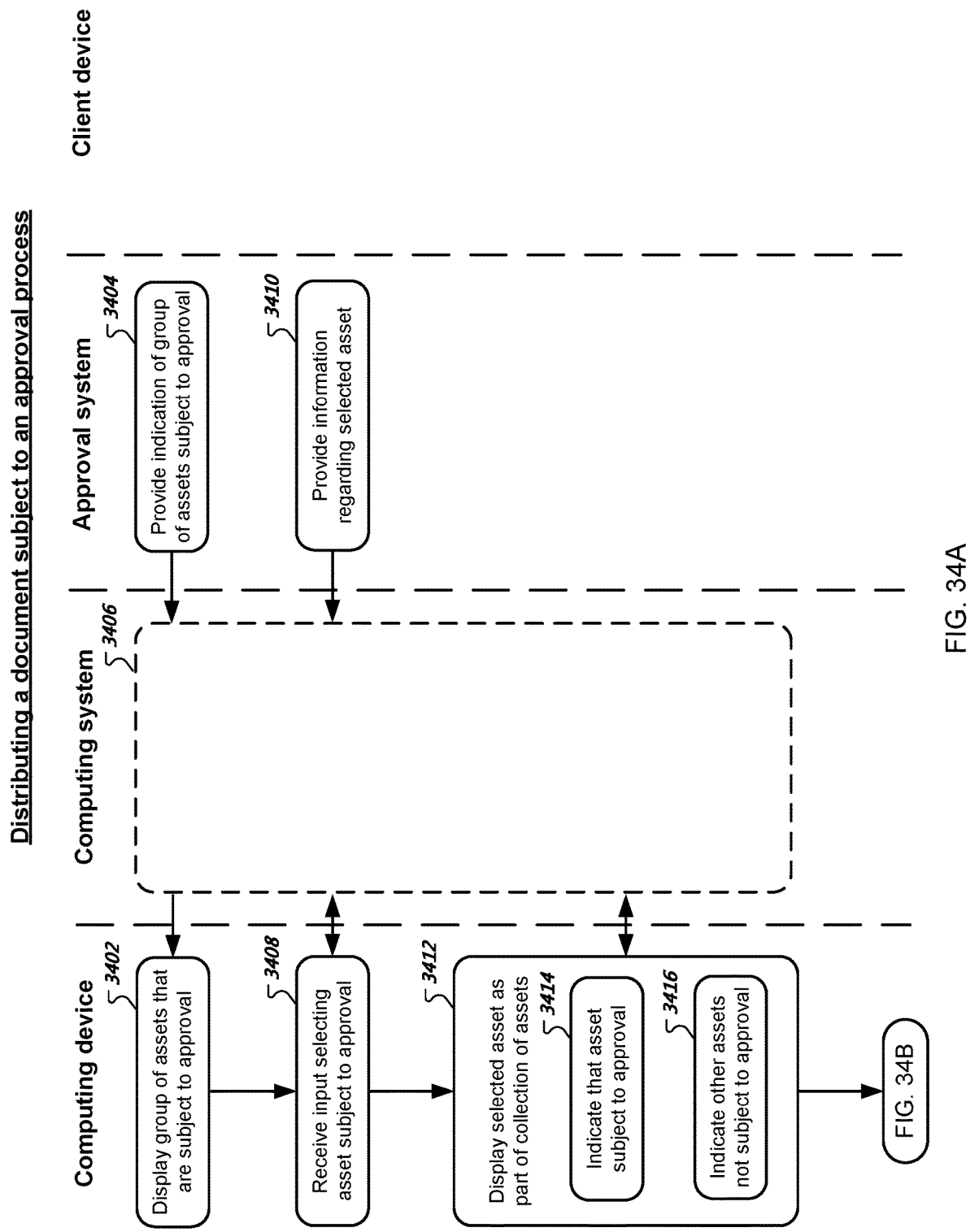
FIGS. 34A-C show a swim-lane diagram of a process for distributing a document subject to an approval process.
Figure 34B:
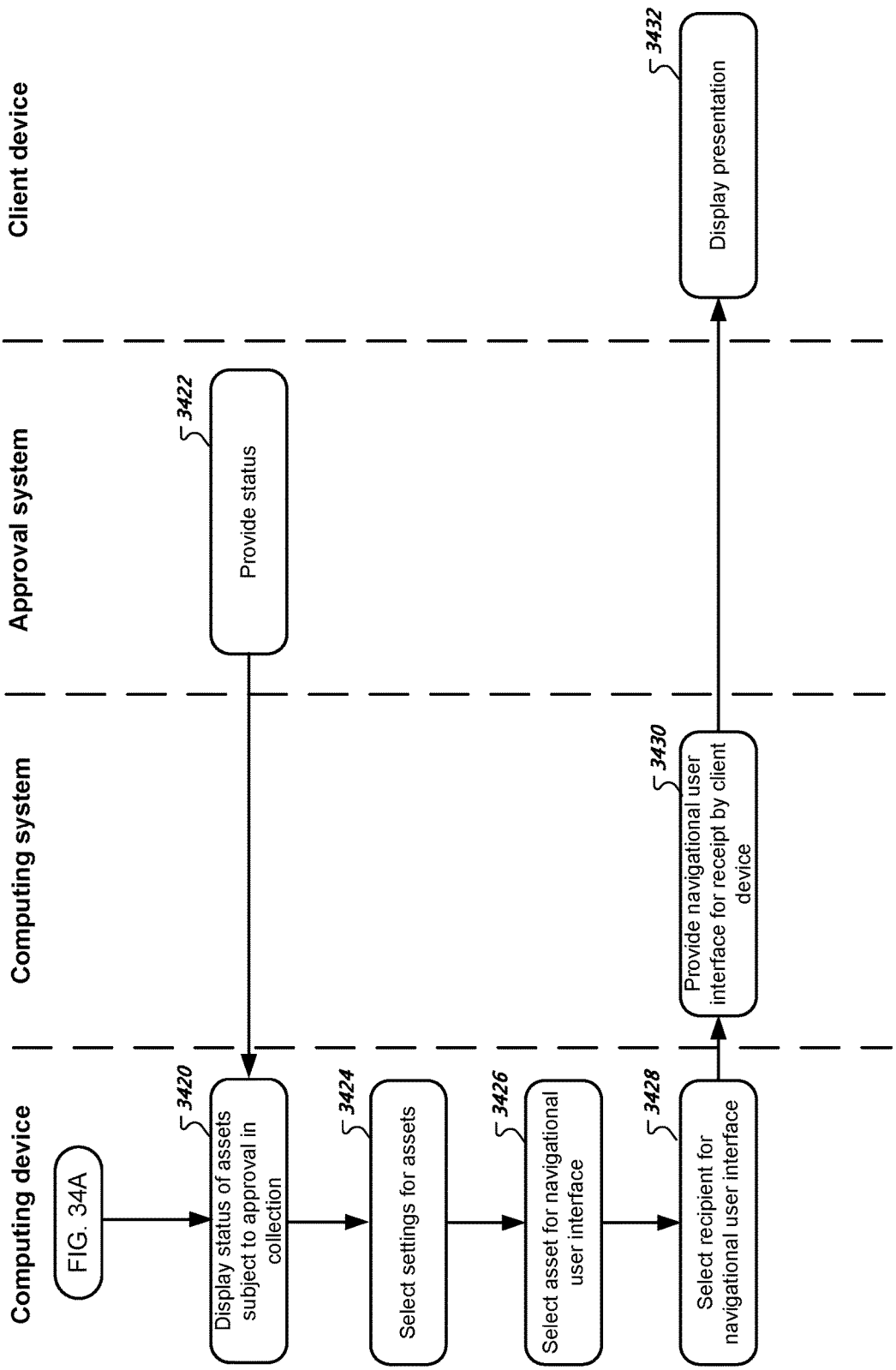
Figure 34C:
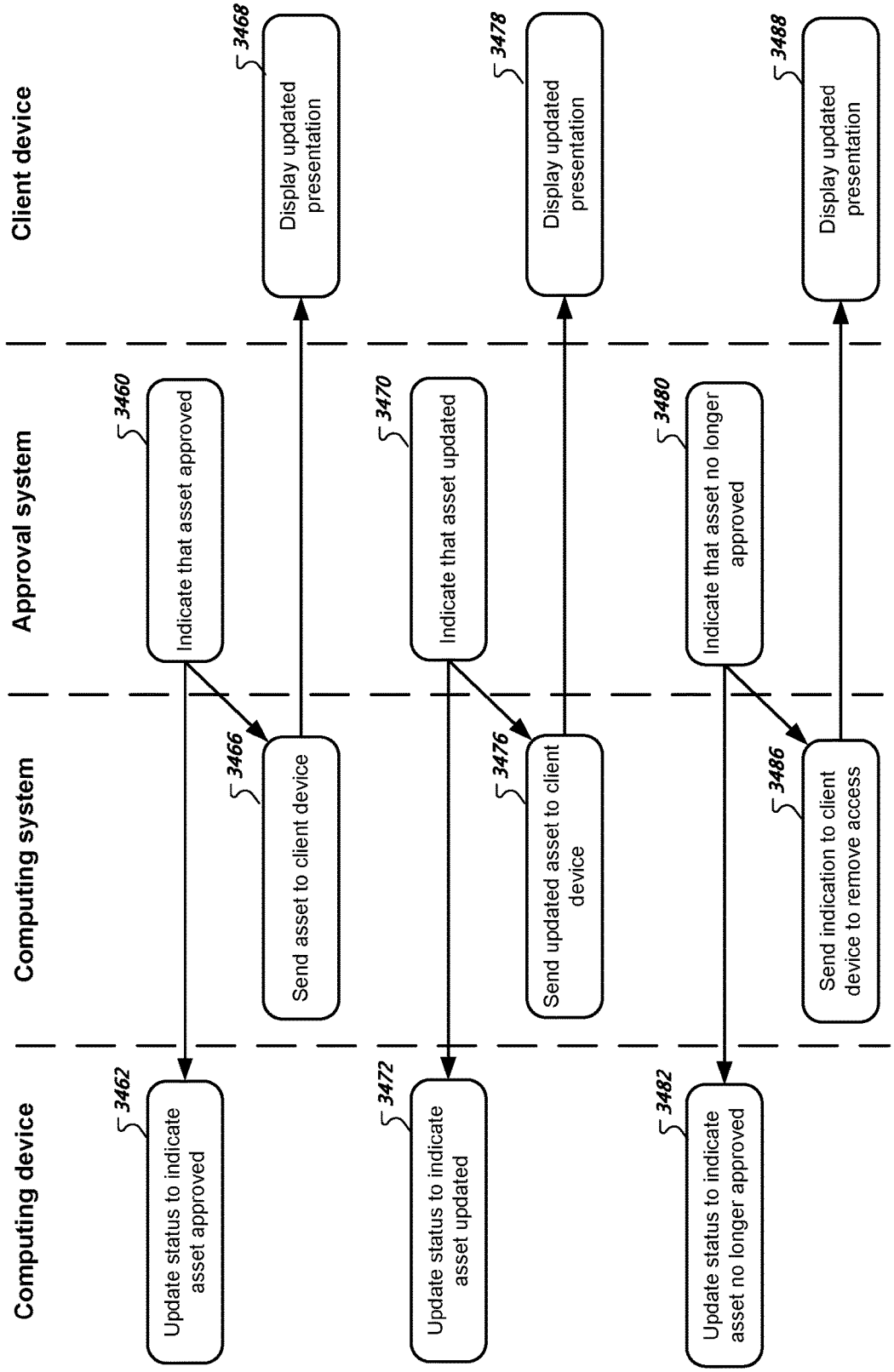

FIGS. 34A-C show a swim-lane diagram of a process for distributing a document subject to an approval process.

At box 3402, the computing device (e.g., computing device 110) displays a group of assets that are subject to approval. For example, a user may have navigated to the user interface that is displayed in FIG. 5, which shows the user's asset library and allows a user to add files to that library. The user may have selected the "Import from Zinc" element 506, and in response the computing system may have presented a dialog box or navigated to another display to allow a user to select one or more of multiple assets that are subject to an approval process.

As a general overview, a remote system (here coined with the name 'Zinc') may serve as a single source of truth for certain documents that may require approval by one or more people, and that may be occasionally updated. As an example, an image that displays information on a medication may involve the collaboration of multiple people, and one or more people may have the ability to "approve" the image for distribution to another service, which in this example is the service for creating navigation user interfaces. During the collaborative project, the image (or any other asset subject to the approval process, such as PDF documents, videos, and HTML documents) may be presented in the user interface with other assets that are subject to the approval process (and therefore may be awaiting approval or already approved). One or more of these assets may be selected for inclusion in a library of assets, even though they have yet to be approved.

At box 3404, the approval computing system (e.g., the system that manages the collaborative effort to modify the asset and accept user input that approves the asset) may provide a list of assets that are subject to the approval process for receipt by a requesting device. In this example, the approval system is shown as providing the list of assets that are subject to approval to the computing system at box 3406, which provides it to the computing device, or alternatively directly to the computing device.

At box 3408, the computing device receives user input that selects one of the assets from the list of assets that are subject to approval. The computing device communicates this selection to either the computing system (illustrated by optional box 3406) or to the approval system.

At box 3410, the approval system 3410 provides information regarding the selected asset for receipt by the computing system. This information may include an approval status of the selected asset (e.g., approved or not approved), along with a name of the selected asset, and a type of the selected asset.

At box 3412, the computing device displays the selected asset as part of a collection of assets. For example, the user interface of FIG. 5 that displays the library of assets may display an indication of a document 512 titled "symmetryk-zinc-test.pdf" along with several other assets.

At box 3414, the computing device indicates that the selected asset is subject to approval. For example, the indication of the document 512 may include a "Z" next to the document to indicate that the document is one that is subject to approval (regardless whether that document may yet be approved). In other examples, the indication of the document may be shaded a different color or have a different font to indicate that the document is subject to approval.

At box 3416, the computing device indicates that other assets are not subject to approval. For example, other indications of assets in the list of assets may not include a "Z" next their respective names.

In this illustration, the computing device is illustrated as communicating with the computing system at box 3406 for various actions. The presence of box 3406 is presented to illustrate that some or all of the operations provided by the computing device are processed and provided under a client/server model, as described throughout this document. Each interaction is not described in detail with reference to this diagram for simplicity, but it should be understood that each user input at the computing device could be reported to the computing system, which could provide responsive assets back to the computing device for display.

At box 3420, the computing device displays the status of assets that are subject to approval. For example, the user interface that is presented in FIG. 35 may present a listing of those assets in the library of assets and that are subject to approval. In this illustration, assets 3502 and 3504 represent files that have been added to the library. The user interface indicates the status of each asset (here both are listed as being "Approved," but an alternative status may be "Awaiting Approval"). The user interface also includes a "Briefcases" icon to the right for each icon, which when selected may cause the computing device to present a list of one or more briefcases to which the asset has been assigned.

At box 3422, the approval system provides the status of the assets that are subject to approval and that are in the asset library. For example, the above-described indication in FIG. 35 regarding whether each asset is Approved or Awaiting Approval may be provided by the approval system. This indication may be provided to the computing system, which then provides the information for receipt by the computing device, but this piecewise description of client/server functioning is omitted for simplicity.

At box 3424, the computing device receives user input that selects settings for assets. Again with reference to FIG. 35, user selection of element 3512 may cause the computing device to replace items displayed at portion 3513 with the display illustrated at section 3514 (a user may navigate back to the display of portion 3513 by selecting element 3510). Portion 3514 may include an element for enabling/disabling auto import 3518, an element for enabling disabling auto resync 3520, and an element for enabling/disabling auto remove 3522. Enabling auto import may cause client devices to automatically receive a newly-approved file upon the client device connecting to the computing system (although newly-approved files may not be provided after client device connection to the computing, such as 30 minutes after logging in or otherwise connecting). Enabling auto resync may cause client devices to automatically receive newly-approved files at any time when they are logged in. As such, a device that has been logged in or otherwise connected to the computing system for 30 minutes may suddenly receive a newly-approved file. Enabling auto remove may cause client devices to automatically delete assets or remove access to assets that have lost their authorization.

At box 3426, the computing device selects an asset for a navigation user interface. For example, as discussed with respect to FIG. 9, a user may add to a tile an asset that is subject to an approval process. The asset may also be added as a background image for a tile, or in some examples as a background image, video, or file for a slide of a presentation created through a presentation-creation product. In some examples, the asset may be added even if that asset has not yet been approved. In some examples, the asset may be added only after it has been approved.

At box 3428, the computing device receives user input that selects one or more recipients for a navigation user interface (and by inference selects recipients for the asset that is subject to the approval process). For example, a user of the computing device interacts with the user interface of FIG. 10 to designate recipients for the navigation user interface that includes the asset that is subject to approval.

At box 3430, the computing system provides the navigation user interface for receipt by one or more client devices that correspond to user accounts for the designated recipients, for example, in response to user input that selects the "Add" buttons in FIG. 10.

At box 3432, the client device displays the presentation. For example, the client device may receive from the computing system information from which to generate a display of the navigation user interface. Should an asset that is subject to approval not yet be approved, the client device may not display an indication of that asset, or may display it in a non-selectable state (e.g., as plain text rather than as a selectable link) when the asset is presented on a subpage for a tile. If the asset was to be a background image for a tile or a slide, but the asset is not yet approved, the client device may display a default image or no image as the background image for the tile or slide.

At box 3460, the approval system may have received user input approving a particular asset, and may provide an indication that the asset was approved to the computing system. The computing system may forward this approval to the computing device which may (at box 3462) update the status for the particular asset to indicate that the asset is now approved (e.g., in the user interface of FIG. 35).

At box 3466, the computing system sends the approved asset to the client device. In other examples, the computing system sends information to the client device that indicates to the client device that the asset is approved and that the client device is able to access the asset, even though the client device may obtain the asset from another source (e.g., over the internet from a different computer). This operation may be performed without user input that specifies that the asset is to be provided to the client device, at least after the computing system received the indication that the asset was approved. In other words, the computing system may automatically perform operations to cause the client device to automatically update its user interfaces to provide access to the asset once that asset is approved by the approval system.

At box 3468, the computing system may display an updated presentation, for example, by listing the asset in a list of assets for a subpage of a tile.

At box 3470, the approval system may indicate that the asset has been updated. For example, the computing system may effectively be "subscribed" to an asset, and the collaboration on that asset may be ongoing such that the approval system may occasionally issue an indication that there is an updated version of the asset available upon user receipt of same by the approval system.

Figure 35:
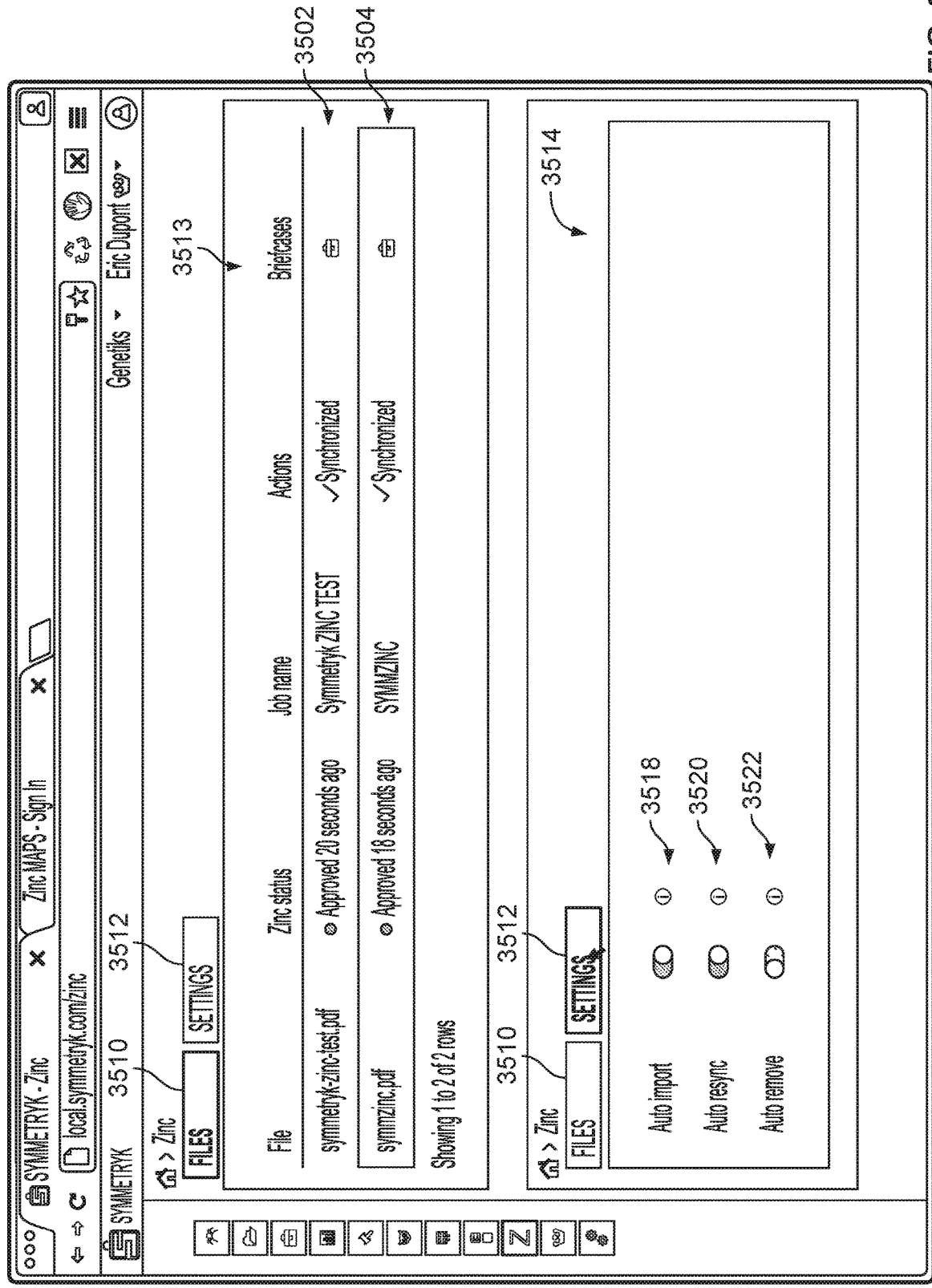
FIG. 35 shows a user interface for displaying assets that are subject to approval.

At box 3472, the computing device may update its status to indicate that the asset has been updated (e.g., the user interface of FIG. 35 may update to list a new version number for the asset, although the user interface may still indicate that the asset is approved).

At box 3476, the computing system sends the updated asset to the client device. For example, much as with the operations of box 3466, the computing system may provide the client device with an updated version of the asset.

At box 3478, the computing system may display an updated presentation. For example, the previous version of the asset may be replaced with the new version of the asset, such that when a user selects the link for the asset, the presented asset may be different.

At box 3480, the approval system may send out an indication that the asset is no longer approved, for example, because a user of the approval system determined that the document was out of date or not in compliance with regulations and that the document should not be shown on client devices anymore.

At box 3482, the computing device may update the status for the respective asset to indicate that the asset is no longer approved, for example, by updating the status for an asset in the user interface of FIG. 35 to indicate that "Not Approved" or "Approval Removed."

At box 3486, the computing system may send the recipient client device an indication that the device is to remove access to the asset.

At box 3488, the client device may receive the indication to remove access, and may display an updated presentation. For example, should the asset have been listed on a subpage for a tile, the client device may remove the indication of that asset on that subpage, or may cause the indication of that asset on the subpage to change from a link to non-selectable text. In some examples, the client device may remove the asset from its memory.

FIG. 36 shows a user interface for creating a survey. In this user interface, a user can add a new survey through selection of element 3610. The interface also shows a list of existing surveys, with each survey in the list indicating a start date, and end date, a time zone, a state of the survey (e.g., either pending, running, or completing), and a participation or number of users in the survey.

Figure 37:
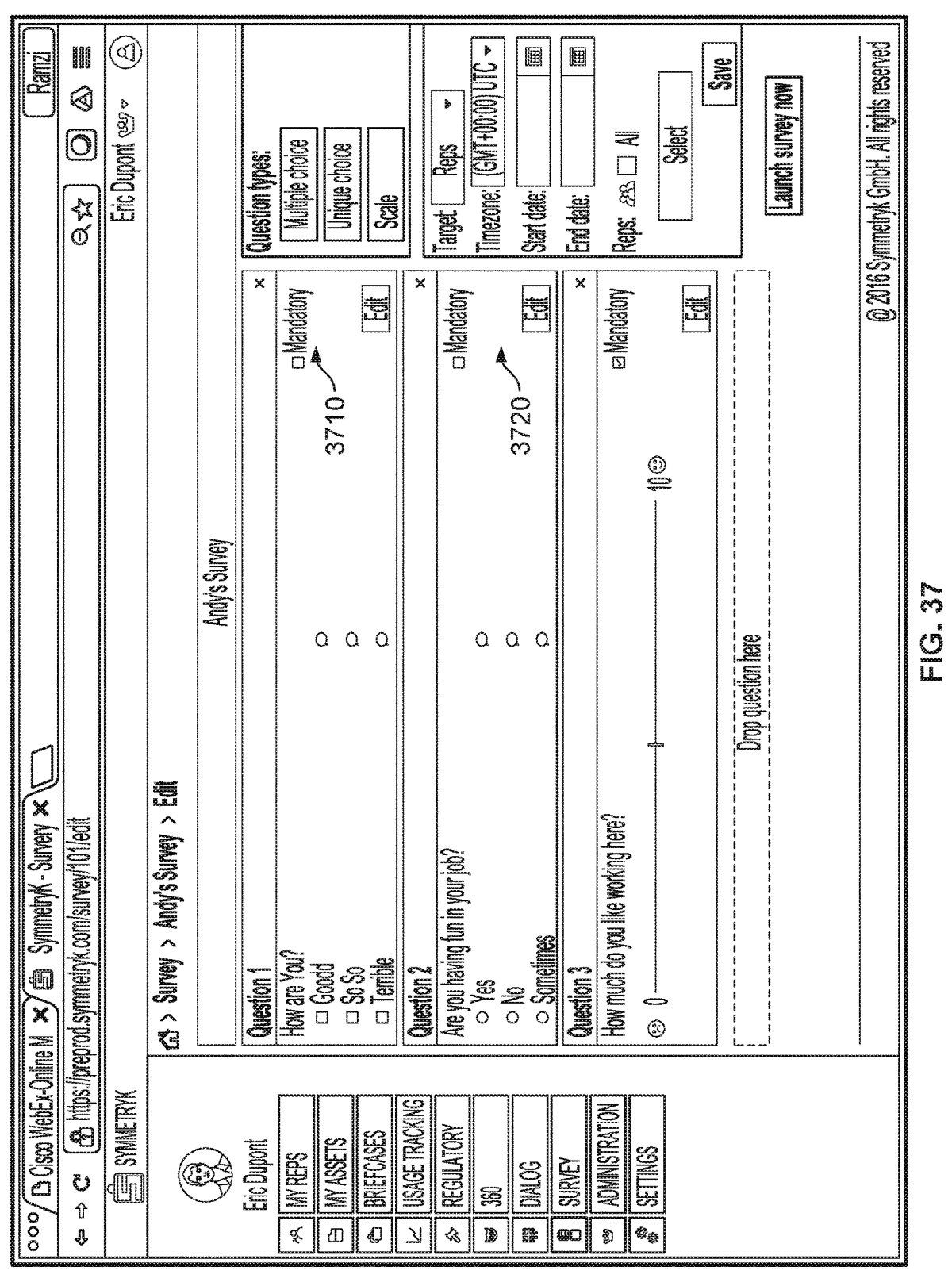

FIG. 37 shows a user interface for creating a survey. This user interface may be presented in response to user selection of element 3610 (FIG. 36). With this interface, a user may use elements 3710 to select a new question type (e.g., by dragging and dropping it to the "Drop question here" element), which causes the question to then be added to the left side of the display and for which a user can then edit various fields for the question. In this example, Question 1 is a multiple choice question, Question 2 is a unique choice question, and Question 3 is a scale question. A user may use elements 3720 to specify the representatives to which the survey is to be distributed, and the start date and end date for the survey. A user may also select the "Launch survey now" button to cause the computing system 120 to transmit information to the appropriate client devices for displaying the survey.

Figure 38:
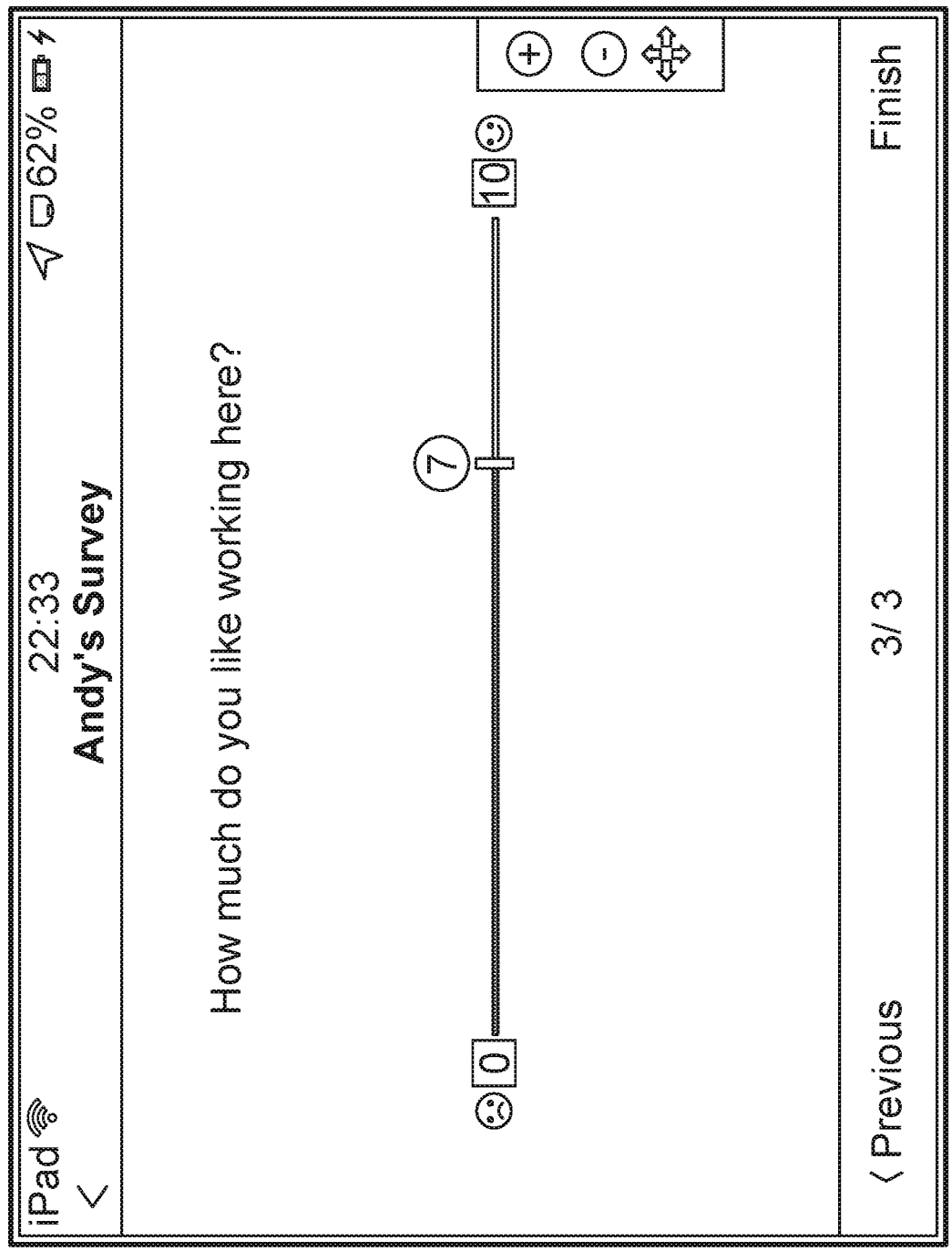
FIG. 38 shows how the survey appears on client devices.

FIG. 38 shows what a single question of a survey looks like on a client device, in this example, Question 3. As an example, the survey may be defined on the computing device 110, information identifying that definition may be provided to the computing system 120, and the computing system may provide information for receipt by designated recipients on their respective client devices to cause those device to present a sequence of interfaces like that shown in FIG. 38.

Figure 39:
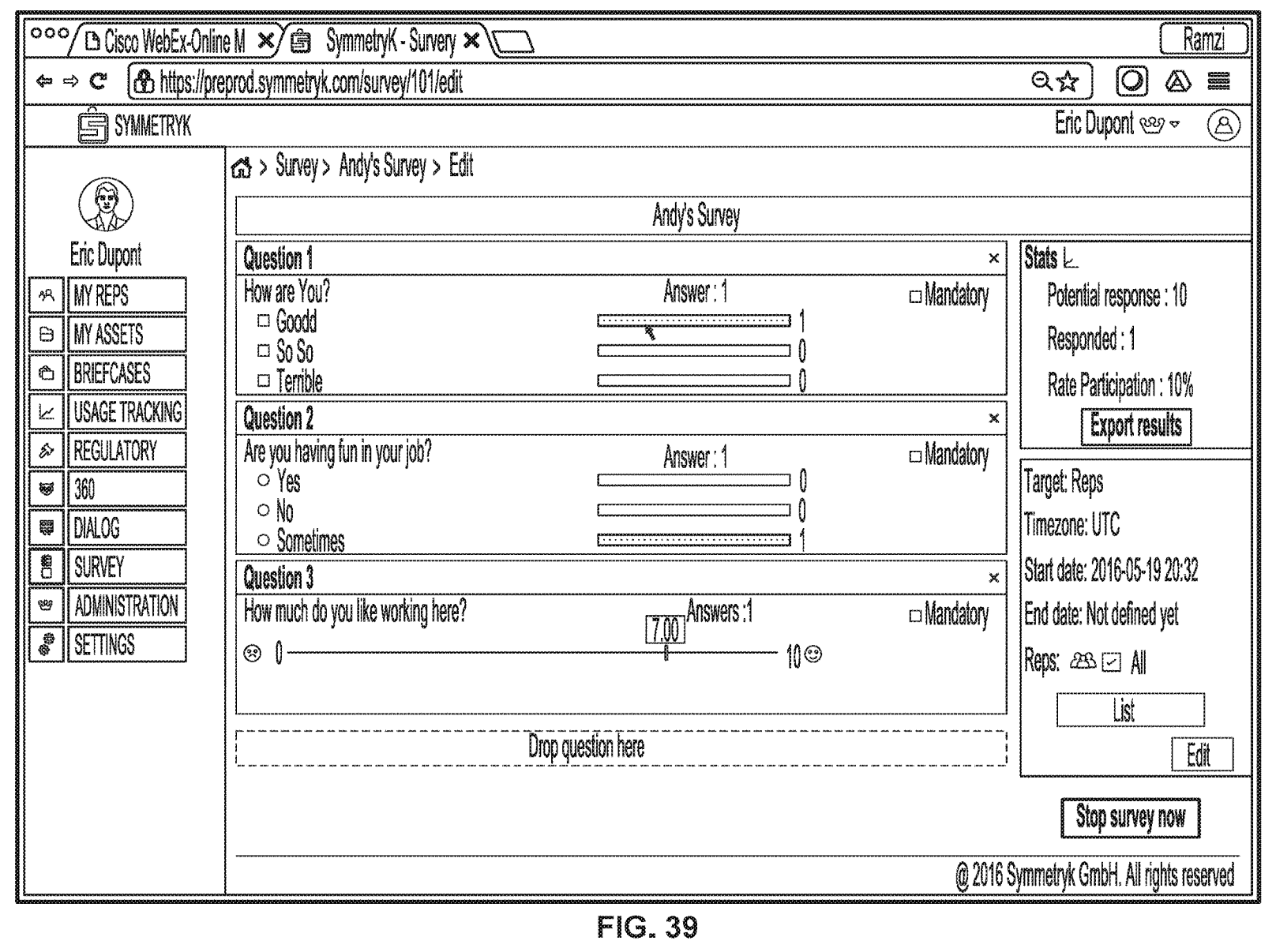

FIG. 39 shows how the results of the survey are presented after the survey questions are distributed to the client devices and users take the surveys. For example, this interface shows that a single person answered "Good" to the question "How are you?" and a single person answered "Sometimes" to the question "Are you having fun in your job?" This interface indicates, at the top right, that the survey was distributed to 10 people and 1 had responded for a participation rate of 10%. A user is able to stop the survey so that it is no longer accessible on the client devices to which it was distributed by selecting the "Stop survey now" button.

Figure 40:
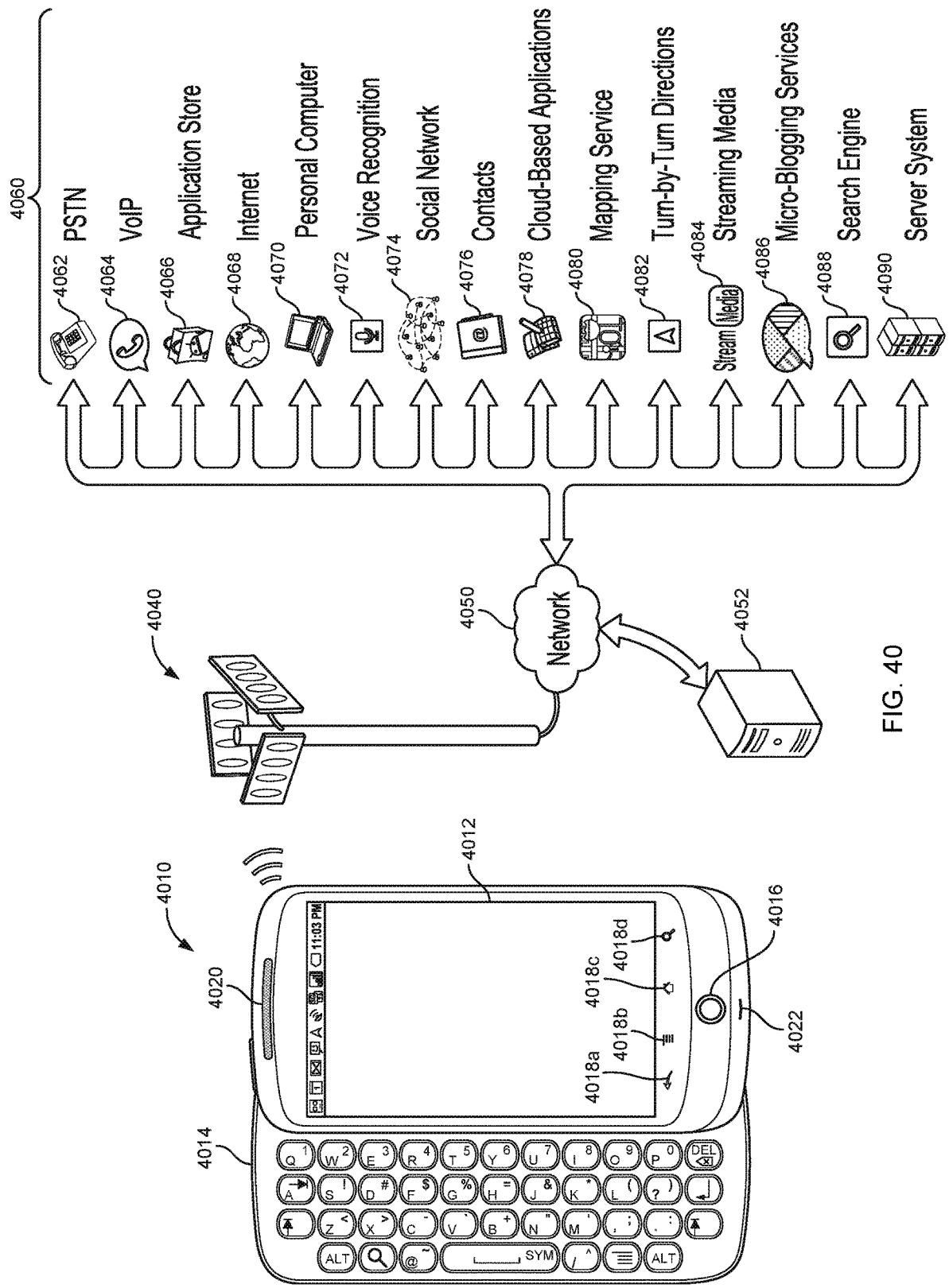
FIG. 40 is a conceptual diagram of a system that may be used to implement the systems and methods described in this document.

Referring now to FIG. 40, a conceptual diagram of a system that may be used to implement the systems and methods described in this document is illustrated. In the system, mobile computing device 4010 can wirelessly communicate with base station 4040, which can provide the mobile computing device wireless access to numerous hosted services 4060 through a network 4050.

In this illustration, the mobile computing device 4010 is depicted as a handheld mobile telephone (e.g., a smartphone, or an application telephone) that includes a touchscreen display device 4012 for presenting content to a user of the mobile computing device 4010 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 4014, physical buttons, trackballs, accelerometers, gyroscopes, and magnetometers).

Example visual output mechanism in the form of display device 4012 may take the form of a display with resistive or capacitive touch capabilities. The display device may be for displaying video, graphics, images, and text, and for coordinating user touch input locations with the location of displayed information so that the device 4010 can associate user contact at a location of a displayed item with the item. The mobile computing device 4010 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 4014, which may be a full qwerty keyboard or a traditional keypad that includes keys for the digits '0-9', '*', and '#.' The keyboard 4014 receives input when a user physically contacts or depresses a keyboard key. User manipulation of a trackball 4016 or interaction with a track pad enables the user to supply directional and rate of movement information to the mobile computing device 4010 (e.g., to manipulate a position of a cursor on the display device 4012).

The mobile computing device 4010 may be able to determine a position of physical contact with the touchscreen display device 4012 (e.g., a position of contact by a finger or a stylus). Using the touchscreen 4012, various "virtual" input mechanisms may be produced, where a user interacts with a graphical user interface element depicted on the touchscreen 4012 by contacting the graphical user interface element. An example of a "virtual" input mechanism is a "software keyboard," where a keyboard is displayed on the touchscreen and a user selects keys by pressing a region of the touchscreen 4012 that corresponds to each key.

The mobile computing device 4010 may include mechanical or touch sensitive buttons 4018a-d. Additionally, the mobile computing device may include buttons for adjusting volume output by the one or more speakers 4020, and a button for turning the mobile computing device on or off. A microphone 4022 allows the mobile computing device 4010 to convert audible sounds into an electrical signal that may be digitally encoded and stored in computer-readable memory, or transmitted to another computing device. The mobile computing device 4010 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 4010 may present a graphical user interface with the touchscreen 4012. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 4004. User-selection of the button may invoke the pre-defined action.

In some examples, the operating system provides a "desktop" graphical user interface that is displayed after turning on the mobile computing device 4010, after activating the mobile computing device 4010 from a sleep state, after "unlocking" the mobile computing device 4010, or after receiving user-selection of the "home" button 4018*c*. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 4010 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 4012 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 4010 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 4010 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 4010. The mobile device 4010 may include a digital camera sensor, and corresponding image and video capture and editing software. An internet browser may enable the user to view content from a web page by typing in an addresses corresponding t the web page or selecting a link to the web page.

The mobile computing device 4010 may include an antenna to wirelessly communicate information with the base station 4040. The base station 4040 may be one of many base stations in a collection of base stations (e.g., a mobile telephone cellular network) that enables the mobile computing device 4010 to maintain communication with a network 4050 as the mobile computing device is geographically moved. The computing device 4010 may alternatively or additionally communicate with the network 4050 through a Wi-Fi router or a wired connection (e.g., ETHERNET, USB, or FIREWIRE). The computing device 4010 may also wirelessly communicate with other computing devices using BLUETOOTH protocols, or may employ an ad-hoc wireless network.

A service provider that operates the network of base stations may connect the mobile computing device 4010 to the network 4050 to enable communication between the mobile computing device 4010 and other computing systems that provide services 4060. Although the services 4060 may be provided over different networks (e.g., the service provider's internal network, the Public Switched Telephone Network, and the Internet), network 4050 is illustrated as a single network. The service provider may operate a server system 4052 that routes information packets and voice data between the mobile computing device 4010 and computing systems associated with the services 4060.

The network 4050 may connect the mobile computing device 4016 to the Public Switched Telephone Network (PSTN) 4062 in order to establish voice or fax communication between the mobile computing device 4010 and another computing device. For example, the service provider server system 4052 may receive an indication from the PSTN 4062 of an incoming call for the mobile computing device 4010. Conversely, the mobile computing device 4010 may send a communication to the service provider server system 4052 initiating a telephone call using a telephone number that is associated with a device accessible through the PSTN 4062.

The network 4050 may connect the mobile computing device 4010 with a Voice over Internet Protocol (VoIP) service 4064 that routes voice communications over an IP network, as opposed to the PSTN. For example, a user of the mobile computing device 4010 may invoke a VoIP application and initiate a call using the program. The service provider server system 4052 may forward voice data from the call to a VoIP service, which may route the call over the internet to a corresponding computing device, potentially using the PSTN for a final leg of the connection.

An application store 4066 may provide a user of the mobile computing device 4010 the ability to browse a list of remotely stored application programs that the user may download over the network 4050 and install on the mobile computing device 4010. The application store 4066 may serve as a repository of applications developed by third-party application developers. An application program that is installed on the mobile computing device 4010 may be able to communicate over the network 4050 with server systems that are designated for the application program. For example, a VoIP application program may be downloaded from the Application Store 4066, enabling the user to communicate with the VoIP service 4064.

The mobile computing device 4010 may access content on the internet 4068 through network 4050. For example, a user of the mobile computing device 4010 may invoke a web browser application that requests data from remote computing devices that are accessible at designated universal resource locations. In various examples, some of the services 4060 are accessible over the internet.

The mobile computing device may communicate with a personal computer 4070. For example, the personal computer 4070 may be the home computer for a user of the mobile computing device 4010. Thus, the user may be able to stream media from his personal computer 4070. The user may also view the file structure of his personal computer 4070, and transmit selected documents between the computerized devices.

A voice recognition service 4072 may receive voice communication data recorded with the mobile computing device's microphone 4022, and translate the voice communication into corresponding textual data. In some examples, the translated text is provided to a search engine as a web query, and responsive search engine search results are transmitted to the mobile computing device 4010.

The mobile computing device 4010 may communicate with a social network 4074. The social network may include numerous members, some of which have agreed to be related as acquaintances. Application programs on the mobile computing device 4010 may access the social network 4074 to retrieve information based on the acquaintances of the user of the mobile computing device. For example, an "address book" application program may retrieve telephone numbers for the user's acquaintances. In various examples, content may be delivered to the mobile computing device 4010 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 4010 may access a personal set of contacts 4076 through network 4050. Each contact may identify an individual and include information about that individual (e.g., a phone number, an email address, and a birthday). Because the set of contacts is hosted remotely to the mobile computing device 4010, the user may access and maintain the contacts 4076 across several devices as a common set of contacts.

The mobile computing device 4010 may access cloud-based application programs 4078. Cloud-computing provides application programs (e.g., a word processor or an email program) that are hosted remotely from the mobile computing device 4010, and may be accessed by the device 4010 using a web browser or a dedicated program. Example cloud-based application programs include GOOGLE DOCS word processor and spreadsheet service, GOOGLE GMAIL webmail service, and PICASA picture manager.

Mapping service 4080 can provide the mobile computing device 4010 with street maps, route planning information, and satellite images. An example mapping service is GOOGLE MAPS. The mapping service 4080 may also receive queries and return location-specific results. For example, the mobile computing device 4010 may send an estimated location of the mobile computing device and a user-entered query for "pizza places" to the mapping-service 4080. The mapping service 4080 may return a street map with "markers" superimposed on the map that identify geographical locations of nearby "pizza places."

Turn-by-turn service 4082 may provide the mobile computing device 4010 with turn-by-turn directions to a user-supplied destination. For example, the turn-by-turn service 4082 may stream to device 4010 a street-level view of an estimated location of the device, along with data for providing audio commands and superimposing arrows that direct a user of the device 4010 to the destination.

Various forms of streaming media 4084 may be requested by the mobile computing device 4010. For example, computing device 4010 may request a stream for a pre-recorded video file, a live television program, or a live radio program. Example services that provide streaming media include YOUTUBE and PANDORA.

A micro-blogging service 4086 may receive from the mobile computing device 4010 a user-input post that does not identify recipients of the post. The micro-blogging service 4086 may disseminate the post to other members of the micro-blogging service 4086 that agreed to subscribe to the user.

A search engine 4088 may receive user-entered textual or verbal queries from the mobile computing device 4010, determine a set of internet-accessible documents that are responsive to the query, and provide to the device 4010 information to display a list of search results for the responsive documents. In examples where a verbal query is received, the voice recognition service 4072 may translate the received audio into a textual query that is sent to the search engine.

These and other services may be implemented in a server system 4090. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 41:
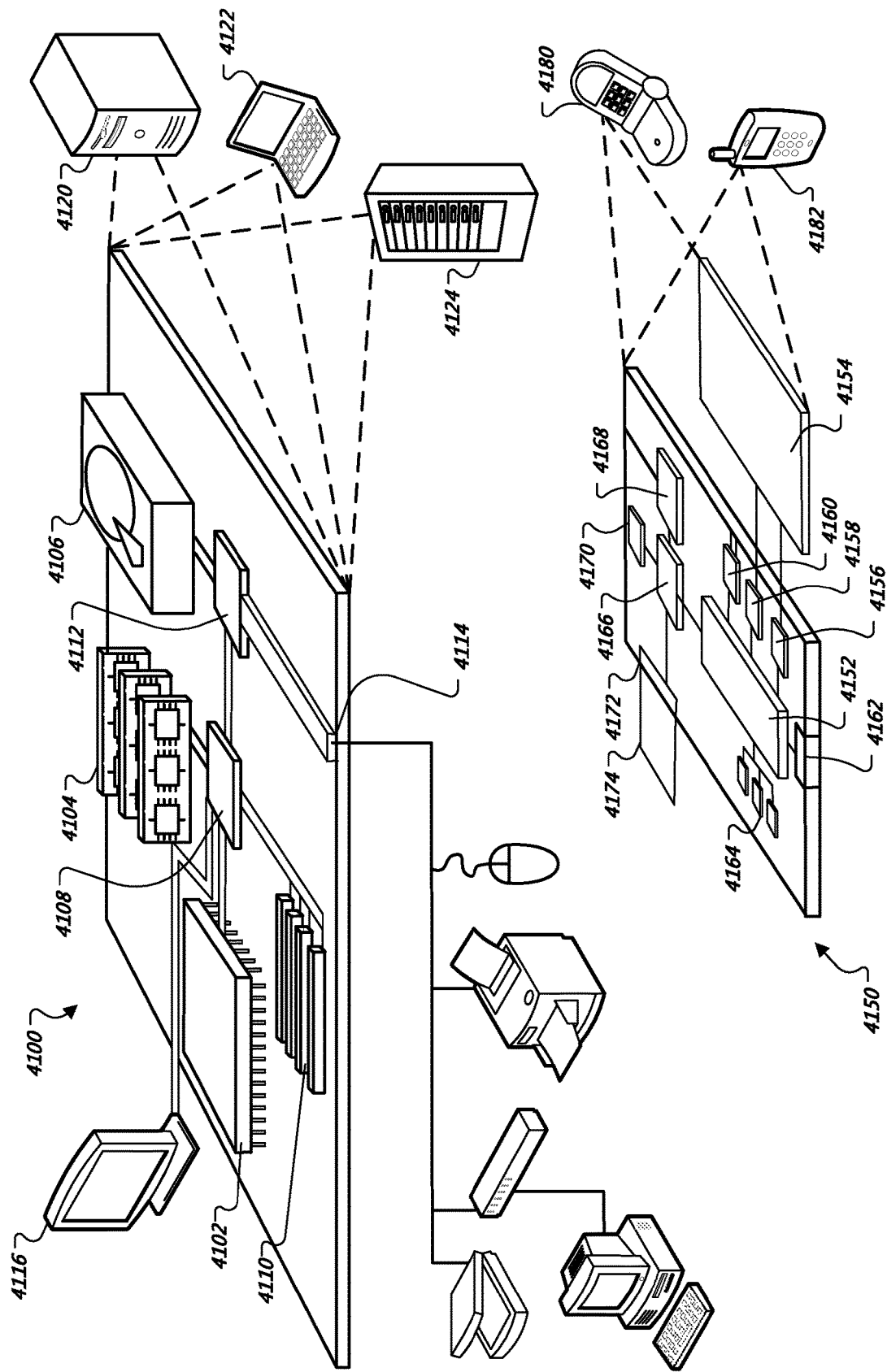
FIG. 41 is a block diagram of computing devices that may be used to implement the systems and methods described in this document, as either a client or as a server or plurality of servers.

FIG. 41 is a block diagram of computing devices 4100, 4150 that may be used to implement the systems and methods described in this document, as either a client or as a server or plurality of servers. Computing device 4100 is intended to represent various forms of digital computers, such as laptops, desktops, workstations, personal digital assistants, servers, blade servers, mainframes, and other appropriate computers. Computing device 4150 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 4100 includes a processor 4102, memory 4104, a storage device 4106, a high-speed interface 4108 connecting to memory 4104 and high-speed expansion ports 4110, and a low speed interface 4112 connecting to low speed bus 4114 and storage device 4106. Each of the components 4102, 4104, 4106, 4108, 4110, and 4112, are interconnected using various busses, and may be mounted on a common motherboard or in other manners as appropriate. The processor 4102 can process instructions for execution within the computing device 4100, including instructions stored in the memory 4104 or on the storage device 4106 to display graphical information for a GUI on an external input/output device, such as display 4116 coupled to high-speed interface 4108. In other implementations, multiple processors and/or multiple buses may be used, as appropriate, along with multiple memories and types of memory. Also, multiple computing devices 4100 may be connected, with each device providing portions of the necessary operations (e.g., as a server bank, a group of blade servers, or a multi-processor system).

The memory 4104 stores information within the computing device 4100. In one implementation, the memory 4104 is a volatile memory unit or units. In another implementation, the memory 4104 is a non-volatile memory unit or units. The memory 4104 may also be another form of computer-readable medium, such as a magnetic or optical disk.

The storage device 4106 is capable of providing mass storage for the computing device 4100. In one implementation, the storage device 4106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 4104, the storage device 4106, or memory on processor 4102.

The high-speed controller 4108 manages bandwidth-intensive operations for the computing device 4100, while the low speed controller 4112 manages lower bandwidth-intensive operations. Such allocation of functions is an example only. In one implementation, the high-speed controller 4108 is coupled to memory 4104, display 4116 (e.g., through a graphics processor or accelerator), and to high-speed expansion ports 4110, which may accept various expansion cards (not shown). In the implementation, low-speed controller 4112 is coupled to storage device 4106 and low-speed expansion port 4114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 4100 may be implemented in a number of different forms, as shown in the figure. For example, it may be implemented as a standard server 4120, or multiple times in a group of such servers. It may also be implemented as part of a rack server system 4124. In addition, it may be implemented in a personal computer such as a laptop computer 4122. Alternatively, components from computing device 4100 may be combined with other components in a mobile device (not shown), such as device 4150. Each of such devices may contain one or more of computing device 4100, 4150, and an entire system may be made up of multiple computing devices 4100, 4150 communicating with each other.

Computing device 4150 includes a processor 4152, memory 4164, an input/output device such as a display 4154, a communication interface 4166, and a transceiver 4168, among other components. The device 4150 may also be provided with a storage device, such as a microdrive or other device, to provide additional storage. Each of the components 4150, 4152, 4164, 4154, 4166, and 4168, are interconnected using various buses, and several of the components may be mounted on a common motherboard or in other manners as appropriate.

The processor 4152 can execute instructions within the computing device 4150, including instructions stored in the memory 4164. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 4150, such as control of user interfaces, applications run by device 4150, and wireless communication by device 4150.

Processor 4152 may communicate with a user through control interface 4158 and display interface 4156 coupled to a display 4154. The display 4154 may be, for example, a TFT (Thin-Film-Transistor Liquid Crystal Display) display or an OLED (Organic Light Emitting Diode) display, or other appropriate display technology. The display interface 4156 may comprise appropriate circuitry for driving the display 4154 to present graphical and other information to a user. The control interface 4158 may receive commands from a user and convert them for submission to the processor 4152. In addition, an external interface 4162 may be provide in communication with processor 4152, so as to enable near area communication of device 4150 with other devices. External interface 4162 may provided, for example, for wired communication in some implementations, or for wireless communication in other implementations, and multiple interfaces may also be used.

The memory 4164 stores information within the computing device 4150. The memory 4164 can be implemented as one or more of a computer-readable medium or media, a volatile memory unit or units, or a non-volatile memory unit or units. Expansion memory 4174 may also be provided and connected to device 4150 through expansion interface 4172, which may include, for example, a SIMM (Single In Line Memory Module) card interface. Such expansion memory 4174 may provide extra storage space for device 4150, or may also store applications or other information for device 4150. Specifically, expansion memory 4174 may include instructions to carry out or supplement the processes described above, and may include secure information also. Thus, for example, expansion memory 4174 may be provide as a security module for device 4150, and may be programmed with instructions that permit secure use of device

4150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 4164, expansion memory 4174, or memory on processor 4152 that may be received, for example, over transceiver 4168 or external interface 4162.

Device 4150 may communicate wirelessly through communication interface 4166, which may include digital signal processing circuitry where necessary. Communication interface 4166 may provide for communications under various modes or protocols, such as GSM voice calls, SMS, EMS, or MMS messaging, CDMA, TDMA, PDC, WCDMA, CDMA2000, or GPRS, among-others. Such communication may occur, for example, through radio-frequency transceiver 4168. In addition, short-range communication may occur, such as using a Bluetooth, WiFi, or other such transceiver (not shown). In addition, GPS (Global Positioning System) receiver module 4170 may provide additional navigation- and location-related wireless data to device 4150, which may be used as appropriate by applications running on device 4150.

Device 4150 may also communicate audibly using audio codec 4160, which may receive spoken information from a user and convert it to usable digital information. Audio codec 4160 may likewise generate audible sound for a user, such as through a speaker, e.g., in a handset of device 4150. Such sound may include sound from voice telephone calls, may include recorded sound (e.g., voice messages, music files, etc.) and may also include sound generated by applications operating on device 4150.

The computing device 4150 may be implemented in a number of different forms, as shown in the figure. For example, it may be implemented as a cellular telephone 4180. It may also be implemented as part of a smartphone 4182, personal digital assistant, or other similar mobile device.

Additionally computing device 4100 or 4150 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions fora programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail-above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   receiving, by a computing system, an indication that user input at a user computing device added a first document that is locally stored by the user computing device to a collection of assets that the computing system maintains as candidate assets that are available for distribution to remote client devices;
   receiving, by the computing system, an indication that user input at the user computing device interacted with a presentation of multiple assets that are subject to an approval process by an approval computing system to add a second document that is subject to the approval process to the collection of assets that the computing system maintains as candidate assets that are available for distribution to remote client devices;

providing, by the computing system and for receipt by the user computing device, first information that is configured to cause the user computing device to visually identify assets in the collection of assets that the computing system maintains as candidate assets that are available for distribution to remote client devices, including:
  (i) a visual indication that the collection of assets includes the first document, the first document not being subject to the approval process by the approval computing system, and
  (ii) a visual indication that the collection of assets includes the second document that is subject to the approval process by the approval computing system;

receiving, by the computing system, an indication that user input at the user computing device specified a design of a user interface for distribution to remote client devices, including that the user interface is to provide user access at such remote client devices to the first document and the second document;

receiving, by the computing system, an indication that user input at the user computing device selected a user account to which the computing system is to provide the user interface and therefore access to the first document and the second document via the user interface;

providing, by the computing system and for receipt by a remote client device assigned to the user account before any approval of the second document by the approval computing system, information to cause the remote client device to present the user interface and provide access via the user interface to the first document, without providing access via the user interface to the second document due to the second document not yet having been approved by the approval computing system;

receiving, by the computing system after the computing system provided the user interface for receipt by the remote client device, an indication that the second document has been approved by the approval computing system; and providing, by the computing system and for receipt by the remote client device, in response to the computing system receiving the indication that the second document has been approved by the approval computing system, an indication that the second document is to be user accessible at the remote client device, to cause the remote client device to provide access via the user interface to both the first document and the second document.

2. The computer-implemented method of claim 1, wherein:
  the first information that the computer system sends for receipt by the user computing device is configured to cause the user computing device to visually indicate that the second document is not yet approved; and
  the method further comprises providing, by the computing system and for receipt by the user computing device in response to the computing system receiving the indication that the second document has been approved by the approval computing system, second information that is configured to cause the user computing device to change from visually indicating that the second document is not yet approved to visually indicating that the second document is approved.

3. The computer-implemented method of claim 1, wherein the remote client device providing access via the user interface to the first document without providing access via the user interface to the second document includes:
  (i) the user interface presenting a visual indication of the first document in a selectable state, and
  (ii) the user interface presenting a visual indication of the second document in a non-selectable state.

4. The computer-implemented method of claim 1, wherein the remote client device providing access via the user interface to the first document without providing access via the user interface to the second document includes:
  (i) the user interface presenting a visual indication of the first document, and
  (ii) the user interface not presenting a visual indication of the second document.

5. The computer-implemented method of claim 1, wherein the computing system provided the indication that the second document is to be user accessible at the remote client device automatically without receipt of user input after the computing system received the indication that the second document has been approved by the approval computing system, that specifies that the computing system is to provide the indication that the second document is to be user accessible at the remote client device.

6. The computer-implemented method of claim 1, further comprising:
  receiving, by the computing system after the second document has been approved by the approval computing system and the computing system has provided to the remote client device the indication that the second document is to be user accessible at the remote client device, an indication that a new version of the second document has been approved by the approval computing system; and
  automatically providing, by the computing system and for receipt by the remote client device in response to the computing system having received the indication that the new version of the second document has been approved by the approval computing system an indication that the remote client device is to update the second document with the new version of the second document.

7. The computer-implemented method of claim 6, further comprising:
  receiving, by the computing system, an indication that the new version of the second document is no longer approved by the approval computing system; and
  providing, by the computing system and for receipt by the remote client device in response to the computing system receiving the indication that the new version of the second document is no longer approved by the approval computing system, information that is configured to cause the remote client device to remove user access to the new version of the second document.

8. The computer-implemented method of claim 7, further comprising:
  receiving, by the computing system and from the user computing device, an indication that user input at the user computing device selected automated deletion from remote client devices of documents that transition from being approved to being no longer approved,
  wherein the computing system provides the information that is configured to cause the remote client device to remove gr access to the new version of the second document as a result of the computing system having previously received the indication that the user input at the user computing device selected automated deletion from client devices of documents that transition from being approved to being no longer approved, wherein the computing system is configured to not cause the remote client device to remove access to the new version of the second document responsive to receiving from the approval computing system the indication that the new version of the second document is no longer approved, as a result of the computing system having previously received an indication that user input at the user computing device did not select automated deletion from client devices of documents that transition from being approved to being no longer approved.

9. The computer-implemented method of claim 1, further comprising:
receiving, by the computing system, an indication that user input at the user computing device interacted with the presentation of multiple assets subject to the approval process by the approval computing system to add a third document that is subject to the approval process to the collection of assets that the computing system maintains as candidate assets that are available for distribution to remote client devices; and
providing, by the computing system and for receipt by the user computing device, second information that is configured to cause the user computing device to visually identify assets in the collection of assets that the computing system maintains as candidate assets that are available for distribution to remote client devices, including:
(i) a visual indication that the collection of assets includes the first document,
(ii) a visual indication that the collection of assets includes the second document, and
(iii) a visual indication that the collection of assets includes the third document, the third document having been approved by the approval computing system;
providing, by the computing system and for receipt by the user computing device before the computing system receives the indication that the second document has been approved, third information that is configured to cause the user computing device to present a status of assets that are subject to the approval process and that have been added to the collection of assets that the computing system maintains as candidate assets that are available for distribution to remote client devices, including:
(i) an indication that the second document is currently unapproved by the approval computing system, and
(ii) an indication that the third document is currently approved by the approval computing system.

10. The computer-implemented method of claim 1, wherein:
the computing system provides the first document for receipt by the remote client device so that the remote client device can provide access via the user interface to the first document; and
the computing system provides the second document for receipt by the remote client device so that the remote client device can provide access via the user interface to the second document.

11. The computer-implemented method of claim 1, wherein: the computing system provides information to the remote client device that is configured to cause the remote client device to request the second document from the approval computing system.

12. The computer-implemented method of claim 1, wherein providing the indication that the second document is to be user accessible at the remote client device causes the remote client device to concurrently present a selectable link to the first document and a selectable link the second document.

13. A computing system, comprising:
one or more processors; and one or more computer-readable devices including instructions that, when executed by the one or more processors, cause performance of operations, including:
receiving, by a computing system, an indication that user input at a user computing device added a first document that is locally stored by the user computing device to a collection of assets that the computing system maintains as candidate assets that are available for distribution to remote client devices;
receiving, by the computing system, an indication that user input at the user computing device interacted with a presentation of multiple assets that are subject to an approval process by an approval computing system to add a second document that is subject to the approval process to the collection of assets that the computing system maintains as candidate assets that are available for distribution to remote client devices;
providing, by the computing system and for receipt by the user computing device, first information that is configured to cause the user computing device to visually identify assets in the collection of assets that the computing system maintains as candidate assets that are available for distribution to remote client devices, including:
(i) a visual indication that the collection of assets includes the first document, the first document not being subject to the approval process by the approval computing system, and
(ii) a visual indication that the collection of assets includes the second document that is subject to the approval process by the approval computing system;
receiving, by the computing system, an indication that user input at the user computing device specified a design of a user interface for distribution to remote client devices, including that the user interface is to provide user access at such remote client devices to the first document and the second document;
receiving, by the computing system, an indication that user input at the user computing device selected a user account to which the computing system is to provide the user interface and therefore access to the first document and the second document via the user interface;
providing, by the computing system and for receipt by a remote client device assigned to the user account before any approval of the second document by the approval computing system, information to cause the remote client device to present the user interface and provide access via the user interface to the first document, without providing access via the user interface to the second document due to the second document not yet having been approved by the approval computing system;
receiving, by the computing system after the computing system provided the user interface for receipt by the remote client device, an indication that the second document has been approved by the approval computing system; and providing, by the computing system and for receipt by the remote client device, in response to the computing system receiving the indication that the second document has been approved by the approval computing system, an indication that the second document is to be user accessible at the remote client device, to cause the remote client device to provide access via the user interface to both the first document and the second document.

14. The computing system of claim 13, wherein:
the first information that the computer system sends for receipt by the user computing device is configured to cause the user computing device to visually indicate that the second document is not yet approved; and
the operations further comprise providing, by the computing system and for receipt by the user computing device in response to the computing system receiving the indication that the second document has been approved by the approval computing system, second information that is configured to cause the user computing device to change from visually indicating that the second document is not yet approved to visually indicating that the second document is approved.

15. The computing system of claim 13, wherein the remote client device providing access via the user interface to the first document without providing access via the user interface to the second document includes:
  (i) the user interface presenting a visual indication of the first document in a selectable state, and
  (ii) the user interface presenting a visual indication of the second document in a non-selectable state.

16. The computing system of claim 13, wherein the remote client device providing access via the user interface to the first document without providing access via the user interface to the second document includes:
  (i) the user interface presenting a visual indication of the first document, and
  (ii) the user interface not presenting a visual indication of the second document.

17. The computing system of claim 13, wherein the computing system provided the indication that the second document is to be user accessible at the remote client device automatically without receipt of user input, after the computing system received the indication that the second document has been approved by the approval computing system, that specifies that the computing system is to provide the indication that the second document is to be user accessible at the remote client device.

18. The computing system of claim 13, wherein the operations further comprise:
  receiving, by the computing system after the second document has been approved by the approval computing system and the computing system has provided to the remote client device the indication that the second document is to be user accessible at the remote client device, an indication that a new version of the second document has been approved by the approval computing system; and
  automatically providing, by the computing system and for receipt by the remote client device in response to the computing system having received the indication that the new version of the second document has been approved by the approval computing system, an indication that the remote client device is to update the second document with the new version of the second document.

19. The computing system of claim 18, wherein the operations further comprise:
  receiving, by the computing system, an indication that the new version of the second document is no longer approved by the approval computing system; and
  providing, by the computing system and for receipt by the remote client device in response to the computing system receiving the indication that the new version of the second document is no longer approved by the approval computing system, information that is configured to cause the remote client device to remove user access to the new version of the second document.

20. The computing system of claim 19, wherein the operations further comprise:
  receiving, by the computing system and from the user computing device, an indication that user input at the user computing device selected automated deletion from remote client devices of documents that transition from being approved to being no longer approved,
  wherein the computing system provides the information that is configured to cause the remote client device to remove user access to the new version of the second document as a result of the computing system having previously received the indication that the user input at the user computing device selected automated deletion from client devices of documents that transition from being approved to being no longer approved,
  wherein the computing system is configured to not cause the remote client device to remove access to the new version of the second document responsive to receiving from the approval computing system the indication that the new version of the second document is no longer approved, as a result of the computing system having previously received an indication that user input at the user computing device did not select automated deletion from client devices of documents that transition from being approved to being no longer approved.

21. The computing system of claim 13, wherein the operations further comprise:
  receiving, by the computing system, an indication that user input at the user computing device interacted with the presentation of multiple assets subject to the approval process by the approval computing system to add a third document that is subject to the approval process to the collection of assets that the computing system maintains as candidate assets that are available for distribution to remote client devices; and
  providing, by the computing system and for receipt by the user computing device, second information that is configured to cause the user computing device to visually identify assets in the collection of assets that the computing system maintains as candidate assets that are available for distribution to remote client devices, including:
    (i) a visual indication that the collection of assets includes the first document,
    (ii) a visual indication that the collection of assets includes the second document, and
    (iii) a visual indication that the collection of assets includes the third document, the third document having been approved by the approval computing system;
  providing, by the computing system and for receipt by the user computing device before the computing system receives the indication that the second document has been approved, third information that is configured to cause the user computing device to present a status of assets that are subject to the approval process and that have been added to the collection of assets that the computing system maintains as candidate assets that are available for distribution to remote client devices, including:
- (i) an indication that the second document is currently unapproved by the approval computing system, and
- (ii) an indication that the third document is currently approved by the approval computing system.

22. The computing system of claim 13, wherein providing the indication that the second document is to be user accessible at the remote client device causes the remote client device to concurrently present a selectable link to the first document and a selectable link the second document.

\* \* \* \* \*